United States Patent

Arai et al.

[11] Patent Number: 5,833,344
[45] Date of Patent: *Nov. 10, 1998

[54] SURFACE LIGHT SOURCE DEVICE OF DUAL LIGHT FLUX GENERATION

[75] Inventors: Takayuki Arai, Kasukabe; Hiromi Sasako, Tokyo, both of Japan

[73] Assignee: Enplas Corporation, Kawaguchi, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 576,921

[22] Filed: Dec. 20, 1995

[30] Foreign Application Priority Data

Dec. 28, 1994 [JP] Japan .................................. 6-337702
Mar. 28, 1995 [JP] Japan .................................. 7-094396

[51] Int. Cl.$^6$ ....................................................... F21V 5/02
[52] U.S. Cl. ........................... 362/31; 362/330; 362/331; 362/339
[58] Field of Search .................................. 362/26, 31, 27, 362/330, 339, 308, 331, 311

[56] References Cited

U.S. PATENT DOCUMENTS

| | | | |
|---|---|---|---|
| 4,542,449 | 9/1985 | Whitehead | 362/339 |
| 5,126,882 | 6/1992 | Oe et al. | 359/619 |
| 5,193,899 | 3/1993 | Oe et al. | 362/224 |
| 5,381,309 | 1/1995 | Borchardt | 362/31 |
| 5,467,208 | 11/1995 | Kokawa et al. | 362/26 |
| 5,467,417 | 11/1995 | Nakamura et al. | 362/31 |
| 5,550,657 | 8/1996 | Tanaka et al. | 362/31 |
| 5,598,280 | 1/1997 | Nishio et al. | 362/31 |
| 5,659,410 | 8/1997 | Koike et al. | 362/31 |
| 5,711,589 | 1/1998 | Oe et al. | 362/31 |

*Primary Examiner*—Thomas M. Sember
*Attorney, Agent, or Firm*—Staas & Halsey

[57] ABSTRACT

A method of generating a dual light flux, and a surface light source device for use in a display with a dual preferential viewing direction. Light of a fluorescent lamp is introduced from a light incidence surface to inside of a wedge shape light scattering guide with exiting directivity. While this light is led toward an end surface, it is emitted from a light outgoing surface as an illuminating light flux with exiting directivity to reach a prism sheet as a primary light flux. V-shape grooves giving a prism vertical angle of 90° are formed to face inward and perpendicular to the lamp on the inner surface of the prism sheet, while V-shape grooves giving a prism vertical angle 64° are formed parallel to the lamp on the outer surface of the prism sheet.

14 Claims, 47 Drawing Sheets

ANGULAR OUTGOING CHARACTERISTICS
OVER 360° IN PLANE 30° TO NORMAL

ANGULAR OUTGOING CHARACTERISTICS
OVER 360° IN PLANE 30° TO NORMAL

ANGULAR OUTGOING CHARACTERISTICS
OVER 360° IN PLANE 30° TO NORMAL

ANGULAR OUTGOING CHARACTERISTICS
OVER 360° IN PLANE 30° TO NORMAL

ANGULAR OUTGOING CHARACTERISTICS
OVER 360° IN PLANE 60° TO NORMAL

ANGULAR OUTGOING CHARACTERISTICS
OVER 360° IN PLANE 60° TO NORMAL

ANGULAR OUTGOING CHARACTERISTICS
OVER 360° IN PLANE 30° TO NORMAL

ANGULAR OUTGOING CHARACTERISTICS
OVER 360° IN PLANE 30° TO NORMAL

ANGULAR OUTGOING CHARACTERISTICS
OVER 360° IN PLANE 60° TO NORMAL

ANGULAR OUTGOING CHARACTERISTICS
OVER 360° IN PLANE 60° TO NORMAL

ANGULAR OUTGOING CHARACTERISTICS
OVER 360° IN PLANE 30° TO NORMAL

ANGULAR OUTGOING CHARACTERISTICS
OVER 360° IN PLANE 30° TO NORMAL

ANGULAR OUTGOING CHARACTERISTICS
OVER 360° IN PLANE 60° TO NORMAL

ANGULAR OUTGOING CHARACTERISTICS
OVER 360° IN PLANE 60° TO NORMAL

SURFACE LIGHT SOURCE DEVICE OF DUAL LIGHT FLUX GENERATION

BACKGROUND OF THE INVENTION

1. Field of the Invention

This invention relates to a method of generating a dual light flux with a dual especially preferential propagation direction (hereinafter, called a dual light flux) by utilizing a plate shape element with a prism action and a surface light source device generating a dual light flux according to the method.

The method and the devices according to the invention can be applied to a light source for a backlight of a liquid crystal display device advantageously. More particularly, the invention can be advantageously applied to a liquid crystal display device of a type to be viewed from two preferential directions. Such liquid crystal display devices, for example, may be installed in the two-player type game machine, the personal computer to be used for the presentation of information to the customers or the like and the car navigation system to be accessed from both the driver's seat and the seat next to the driver's seat or the like.

2. Description of the Related Art

An optical element called a prism sheet, is generally known. A light flux (hereinafter, called a primary light flux) provided from a surface of a prism sheet is emitted from the other surface of the prism sheet as a secondary light flux with its main propagation direction (hereinafter, called a preferential propagation direction) modified.

The prism sheet is provided with a surface (hereinafter, called a prism surface) on which a V-shape repeated concave and convex array is formed. This element provided with a function of modifying the preferential propagation direction of a light flux having a sectional area corresponding to the dimensions of the prism surface so that the elements are used, for example, in order to adjust the preferential propagation direction of an illuminating light of a backlight of a surface light source device installed in the liquid crystal display device.

An arrangement of the surface light source device in which the prism sheet is used in an well known basic form is shown in FIG. 1. Referring to FIG. 1, a plate shape light scattering guide with an wedge shape section is indicated by a reference character 1. The light scattering guide 1 is constituted of a matrix consisting of, for example, polymethylmethacrylate (PMMA) in which matters with different refractive indexes are mixed and dispersed uniformly. A thicker side of the light scattering guide 1 serves as a light incident surface 2, and a light source element (a fluorescent lamp) is disposed in the vicinity thereof.

A reflector 3 comprising a regular reflective silver film or a white sheet for diffused reflection is disposed along a surface (a backside 6) of the light scattering guide 1. The other surface 5 of the light scattering guide 1 is a light exiting surface 5 for taking out light provided from the light source element L.

The prism sheet 4 is disposed outside a light exiting surface 5. The prism sheet 4 is provided with a V-shape prism surface 4a, 4b and a flat surface 4e. Moreover, a conventional liquid crystal display device (a liquid crystal display panel) may be disposed outside the prism sheet 4 in order to constitute a liquid crystal display device.

In such surface light source devices, the thickness of the light scattering guide 1 is reduced as it is away from the light incidence surface so that the surface light source devices have the superior performance in light utilization efficiency and uniformity of luminance due to the repeated reflection effect of an inclined surface. A description of such effect based on the shape of the light scattering guide is disclosed in Laid-open Patent Application Ser. No. 7-198956.

Light which is sent from the light source element L into the light scattering guide 1 is emitted gradually from the light exiting surface 5, while light is guided toward an end surface 7 of the thinner side as exerted by scattering and reflection in the light scattering guide 1.

As will be mentioned later, light emitted from the light exiting surface 5 has the distinct preferential propagation direction under the condition that a particle diameter (generally, a correlation distance respect to ununiformity structure with different refractive indexes) mixed and dispersed into the light scattering guide 1 is not small excessively. In another expression, the parallelized flux can be taken out from the light exiting surface 5. Such nature is called "an exiting directivity" hereinafter.

The preferential propagation direction (the principal axis direction of the parallelized flux) rises at an angle of approximately 25° to 30° from the light exiting surface when viewing from the light incidence surface 2 side (the reason will be described later). In consideration of this, a function of modifying the preferential propagation direction of the prism sheet 4 in a conventionally used way is illustrated by referring to FIG. 2 and FIG. 3.

FIG. 2 illustrates the behavior of light in the section perpendicular to the lamp L in the arrangement shown in FIG. 1. In this case, "perpendicular to the lamp L" means "perpendicular to the direction of the principal axis of the lamp L", that is, "perpendicular to the light incidence surface 2". This is named "perpendicular to the lamp" simply. Similarly, "Parallel to the direction of the principal axis of the lamp L", that is, "Parallel to the light incidence surface 2" is named "the direction parallel to the lamp".

As shown in FIG. 2, the prism sheet 4 is disposed along the light exiting surface 5 of the light scattering guide 1 so that its prism surface faces inward. Each prism vertical angle ø3 may be about 60°. As will be described later, another action will be caused, when the vertical angle ø3 exceeds 60° by over 10°.

The preferential propagation direction ø2 of the flux emitted from the light exiting surface 5 of the light scattering guide 1 with an exiting directivity becomes ø2=60° approximately to the normal line respective to the light exiting surface 5, when light is provided at the direction of an reference character arrow L'.

For example, an incident angle ø1 to the light exiting surface 5 giving ø2=60° becomes approximately ø1=35°, when PMMA (the refractive index 1.492) is utilized as the matrix of the light scattering guide 1. The ray of light corresponding to the preferential propagation direction is called a typical ray of light, and is indicated by a reference character B1 here.

The typical ray of light B1 impinges on the prism surface 4a of the prism sheet 4 approximately perpendicular (ø3= approximately 60°) after going straight in air layer AR. The refractive index n0 of the air layer AR is approximately 1.0 (n0=1.0). It should be noted that the rate at which this light impinges on the prism surface 4b of an opposite side is relatively small.

After the typical ray of light B1, moreover, goes to the prism surface 4b in the prism sheet 4 approximately straightly, the ray of light is reflected regularly, and impinges on the flat plane 4e at approximately perpendicular and is emitted out of the prism sheet 4. Through such processes, the preferential propagation direction of the light emitted from the light exiting surface 5 is modified so that the illuminating light approximately perpendicular to the light exiting surface 5 can be obtained.

It must be noted, however, that the modified preferential propagation direction is not limited to the direction perpendicular to the light exiting surface 5. The modified preferential propagation direction depends on the prism vertical angle ø3, material (the refractive index) of the prism sheet 4 and material (the refractive index) of the light scattering guide 1, so that it can be adjusted over the relatively wide angle range by selecting these factors.

FIG. 3 is a sectional view showing the behavior of light in the case that the prism sheet 4 is disposed so that its prism surface directs outwardly by modifying the arrangement shown in FIG. 1 or FIG. 2. In this arrangement, the prism vertical angle ø4 of the prism surface is equal to 70° approximately.

When light is provided at the direction shown by an arrow L', the ray of light B2 corresponding to the preferential propagation direction impinges on the light exiting surface 5 at an angle of approximately 35° (ø1=about 35°) like the case of FIG. 2, and most of it is emitted to the air layer AR (the refractive index n0=1.0). In this case, the exiting angle ø2 is approximately 60°.

After the typical ray of light B2 goes straightly in the air layer AR, it impinges on the flat plane 4e obliquely and passes through the reflection path as shown in the figure and is emitted out of the prism surface 4c subsequently (the rate emitted from the prism surface 4c is relatively small).

The path of light after impinging on the flat surface 4e of the prism sheet 4 depends on the refractive index n2 and the vertical angle ø4, so that the preferential propagation direction can be adjusted by selecting these factors.

FIG. 6 to FIG. 9 are graphs showing the measured examples corroborating the modification effect of the preferential propagation direction in a conventional method using such prism sheet. A summary of the measurement conditions in these graphs is shown in FIG. 4 and FIG. 5. The measurement conditions also apply to a number of measurements in the embodiments.

Referring to FIG. 4, a similar arrangement shown in FIG. 1 is shown. The light scattering guide 1 with wedge-shaped sectional form consists of material in which silicone-base resin material (particle diameter 2.0 μm, the refractive index 1.4345) is mixed and dispersed in a rate of 0.08 wt percent as a different index matter uniformly into a matrix consisting of polymethylmethacrylate (PMMA; the refractive index 1.492), and its dimension is as shown in the illustration.

An end surface of the thinner side opposed the thicker end portion 7 of the light scattering guide 1 was used as the light incident surface and a long tubular fluorescent lamp L (dia. 3 mm) was disposed apart 1.0 mm therefrom. In order to prevent the dispersion of light, a reflection sheet R comprising a silver film was disposed at the back of the fluorescent lamp L. A silver film was utilized as a reflector 3 along the back surface 6 of the light scattering guide 1.

With the above diameter of the particles having a different index, as the light scattering guide 1 has an exiting directivity, the flux with the preferential propagation direction (the parallelized flux) shown by reference character 5e is emitted from the light exiting surface 5. The measurement was carried out under the condition that only a first prism sheet PS1 was disposed or the condition that a second prism sheet PS2 was disposed on the first prism sheet PS1. In the latter arrangement, a thin air layer AR exists between the prism sheets PS1 and PS2. In the measurement for the results of FIG. 6 and FIG. 7, only one prism sheet was disposed. The prism sheet arrangement in each measured example is mentioned respectively hereinafter.

A reference character M shows a luminancemeter (LS 110 by Minolta, the measurement viewing angle ⅓°, with close-up lens mounted). The measurement of luminance was carried out by changing the direction of a collimation axis b with respect to a central point P as the center, while maintaining a condition that the luminancemeter M views the central point P of an outer surface "a" of the prism sheets PS1 or PS2 at a distance of 203 mm. An angle of the collimation axis b in the section perpendicular to the fluorescent lamp L is shown by ø. The angle ø corresponds to the generic inscription of ø2 given in FIG. 2 and FIG. 3.

FIG. 5 is a figure illustrating, more particularly a description manner of the direction of the collimation axis b with respect to the point P of the luminancemeter M including the definition of an angle ø in three-dimensions. In this figure, a plane "c" is a plane in which the direction of a collimation axis b viewing the central point P exists and is parallel to the lamp L. An angle between the plane C and a perpendicular line "d" to the surface a is represented by ø as described above. And θ shows an angle between the collimation axis b and a straight line "e" passing the central point P and perpendicular to the parallel direction of the lamp on the plane "c". An angle between a normal line f with respect to the central point P and the collimation axis is shown by β. An angle between the direction perpendicular to the lamp and a projection of the collimation axis b on the surface a is shown by ζ. The angles β and ζ are quoted repeatedly in the examples described hereinafter.

Next, the names of the arrangement condition (the arrangement form) of the prism sheets PS1 and PS2 are defined as follows;

(1) The arrangement that the prism surface formed with V-shape grooves is disposed toward the light scattering guide is named "the grooves inward" as shown in FIG. 1 and FIG. 2.

On the other hand, the arrangement that the prism surface formed with V-shape grooves is disposed outward from the light scattering guide is named "the grooves outward" as shown in FIG. 3.

(2) The arrangement that the prism surface is disposed so that the direction of the V-shape grooves forming the prism surface becomes parallel to the fluorescent lamp L (or the light incidence surface 2) is named "parallel to the lamp".

On the other hand, the arrangement that the prism sheet is disposed so that the direction of the V-shape grooves which form the prism surface becomes perpendicular to the fluorescent lamp L (or the light incidence surface 2) is named "perpendicular to the lamp".

Moreover, the vertical angle of the prism sheets PS1 and PS2 is shown by a reference character ψ (the generic inscription of ø3 and ø4 in FIG. 2 and FIG. 3). The measured data will be described in the form of an itemized statement hereinafter.

[The graph of FIG. 6]

(1) The vertical angle of the prism sheet ψ=64°; the arrangement of the grooves inward parallel to the lamp.

(2) Scanning ø within the range of −80° to +80° under the condition of θ=0°.

(3) Showing luminance on the vertical axis by the 1000 nt (nt=cd/m², the same, hereinafter) unit.

(4) Description: as is seen from the graph, a high luminance is measured at the direction of ø=approximately 0°, that is, at the frontal direction of the surface light source device. A gentle peak which is guessed to be a direct effect of an exiting directivity of the light scattering guide is recognized at the direction of ø=65°, too.

[The graph of FIG. 7]

(1) The vertical angle of the prism sheet ψ=64°; the arrangement of the grooves parallel to the lamp (the same as FIG. 6).

(2) Scanning θ within the range of −80° to +80° under the condition of ø=0°.

(3) Showing luminance on a vertical axis by the 1000 nt unit.

(4) Description: as is seen from the graph, a peak is measured at the direction of θ=approximately 0°, that is, at the frontal direction of the surface light source device. The figure of the graph is a regular symmetrical shape with the peak at θ=0°.

From both FIG. 6 and FIG. 7, it is definitely understood that the modifying function of the preferential propagation direction is functioned clearly under the condition of "the vertical angle of the prism sheet ψ=64°; the arrangement of the grooves inward parallel to the lamp". This fact is matched with the description in FIG. 2. However, a phenomenon (the dual light flux generation phenomena) that the preferential propagation direction is separated clearly into two directions is not recognized with respect to either the surface perpendicular to the lamp or the surface parallel to the lamp.

[The graph of FIG. 8]

(1) The vertical angle of the prism sheet ψ=70°; the arrangement of the grooves outward parallel to the lamp.

(2) Scanning ø within the range of −80° to +80° under the condition of θ=0°.

(3) Showing luminance on the vertical axis by the 1000 nt unit.

(4) Description: as is seen from the graph, a high luminance is observed at the direction of ø=approximately 17°, that is, at a slightly frontal direction than the front of the surface light source device.

[The graph of FIG. 9]

(1) The vertical angle of the prism sheet ψ=70°; the arrangement of the grooves outward parallel to the lamp (the same as FIG. 8).

(2) Scanning θ within the range of −80° to +80° under the condition of ø=0°.

(3) Showing luminance on the vertical axis in 1000 nt unit.

(4) Description: as is seen from the graph, a light flux with a gentle luminance peak is obtained at the direction of θ=approximately ±30°, while at θ=approximately 0°, the luminance is reduced slightly (approximately 2800 nt to the peak of 4000 nt).

From both FIG. 8 and FIG. 9, it is clearly understood that the function of modifying the preferential propagation direction is functioned clearly under the condition of "the vertical angle of the prism sheet ψ=70°; the arrangement with the grooves outward parallel to the lamp". This fact is matched with the description in association with FIG. 3. However, a dual light flux generation phenomenon that the preferential propagation direction is separated clearly into two directions is not recognized in the surface perpendicular to the lamp. In the surface parallel to the lamp, the preferential propagation direction looks separated into two directions, but the decrease of the luminance at θ=approximately 0° is small and dual light flux generation appears barely.

The function of modifying the preferential propagation direction shown by the measured examples above were known as a function of the prism sheet. And the function was used in the surface light source device or the like for supplying the illuminating light to liquid crystal display devices for the purpose of gathering the light emitted from the surface light source device into a single direction (a single preferential propagation direction).

However, since surface light source devices are used more widely, especially in a back light type liquid crystal display, such action gathering the emitted light into a single preferential direction is undesirable in some cases.

For example, in a display such as (1) a display for the 2-player type game machine, (2) a display for the presentation of information to customers, (3) a display for a car navigation system to be viewed from both a driver's seat and the next to driver's seat, there are two preferential viewing directions. Accordingly, in displays of this kind, the backlight only gathering the light flux into a single direction together can not meet the needs. In other words, when the illuminating light of the backlight is gathered in a single direction, energy of light cannot be distributed efficiently so that a bright display is obtained in each of the two separate directions.

In order to meet such needs, it is necessary to provide a wide light flux with a preferential propagation direction. However, it has never been known at all that such needs can be satisfied by using a single or a plurality of prism sheets under a particular condition.

SUMMARY OF THE INVENTION

An object of the invention is to provide a method of generating a light flux with a dual preferential propagation direction (that is, a dual light flux) by using a single or a plurality of prism sheets under particular conditions. An another object of the invention is to provide a surface light source device generating an illuminating light flux produced by the method of generating a dual light flux according to the invention. A further object of the invention is to provide a technical means capable of being suitably applied to the illuminating light for the type of liquid crystal display of the type viewed from two preferential directions.

According to the method of the present invention, a dual light flux is generated by providing the primary light flux with the preferential propagation direction inclined to the prism sheet from the prism surface side of the prism sheet having a prism surface on which an array of V-shape grooves is formed and by emitting the illuminating light flux from the prism sheet to the dual preferential propagation direction. The prism vertical angle on the prism surface of the prism sheet is defined so that a dual light flux can be generated effectively. A practical range of vertical angle of the prism is from 70° to 110°. The range of the prism vertical angle which gives the more preferred results is from 80° to 100°.

A surface light source employing a light scattering guide is suitably used as a providing source of a primary light flux. Another prism sheet may additionally be disposed between the light exiting surface of the light scattering guide and the prism sheet as illustrated in an embodiment shown in FIG. 1 to FIG. 3. In this manner, a primary light flux with a modified preferential propagation direction is provided, whereby the dual preferential propagation direction of the dual light flux is adjusted. In this case, the range from 60° to 70° can be added as a range of prism vertical angle of the prism sheet which is disposed outside.

A prism sheet which is disposed for generating the dual light flux is named "a main prism sheet", and a prism sheet which is disposed for modifying the preferential propagation direction is named "a sub-prism sheet".

In another embodiment, an adjustment of the two preferential propagation directions of the dual light flux is performed after generating the dual light flux by the prism sheet. In this case, the sub-prism sheet is disposed outside the primary prism sheet.

The invention provides a surface light source device for generating a dual light flux according to the method mentioned above. Its basic components comprise "a plate shape light scattering guide with the exiting directivity", "a light supply means which is disposed facing at least a side end surface of the light scattering guide" and "a prism sheet which is disposed along the light exiting surface of the light scattering guide". The prism sheet may have a prism surface on which a vertical angle is within the range from 70° to 110°. The range of the prism vertical angle which gives the more preferred results is from 80° to 100°. The prism sheet is disposed so that the prism surface can be directed toward the light scattering guide.

In another embodiment according to the invention, a prism sheet for modifying the preferential propagation direction of the light emitted from the light exiting surface of the light scattering guide further is disposed. Therefore, the dual preferential propagation direction of the light flux emitted from the surface light source device is adjusted. In this case, the range from 60° to 70° can be added as a range of the prism vertical angle of the prism sheet which is disposed outside.

The prism sheet for modifying the preferential propagation direction of the light flux emitted from the surface light source device may be disposed outside of the prism sheet for the dual light flux generation.

In a further variation, a prism sheet on which another prism surface for modifying the preferential propagation direction of the dual light flux emitted from the prism sheet is formed is disposed on the opposite side of the prism surface on which the vertical angle of 70° to 110° is formed for the dual light flux generation. This is equivalent to a unified assembly consisting of the prism sheet for the dual light flux generation and the prism sheet for modifying the preferential propagation direction which is disposed outside the prism sheet.

The invention is based on a new principle that the dual light flux is generated by providing a primary light flux obliquely from the prism surface of the prism sheet having a prism surface on which an array of V-shape grooves is formed so that the required vertical angle condition can be satisfied. The vertical angle condition (the range) is usually from 70° to 110°, more preferably from 80° to 100°. However, the range from 60° to 70° may also be permitted in the case of providing the primary light flux through the prism sheet for modifying the preferential propagation direction as will be described hereinafter.

In terms of the practical use, it is preferred that the primary light flux has a sectional area of a certain dimensions and the light intensity profile in the sectional area is flat. The surface light source device employing the light scattering guide is capable of filling such needs. Scattering characteristics, especially, the exiting directivity (light flux parallelizing function) of the light scattering guide can be described by quoting Debye's theory as follows;

When the light with intensity IO transmits in a medium (the light scattering guide) by y(cm) and the intensity is reduced to IO due to scattering during the transmission, an effective scattering irradiation parameter E is defined by the following equations (1) or (2);

$$E[cm^{-1}] = -[ln(I/IO)]/y \quad (1)$$

$$E[cm^{-1}] = -(1/I)dI/dy \quad (2)$$

The equations (1) and (2) are expressions in so-called integral form and differential form, and they are equivalent in physical meaning. This E is sometimes called turbidity.

On the other hand, in a usual case that the greater part of emitted light is vertical polarized light when vertically polarized light is scattered, a scattered light intensity due to ununiform structure distributed in the medium is expressed by following equation (3), $$Vv = [(4 <\eta^2> \pi^3)/\lambda_0^4]C \int_0^\infty \gamma(r)dr \quad (3)$$

Here, $$C = [r^2 \sin(vsr)]/vsr \quad (4)$$

In the case of natural light incidence, in consideration of Hh scattering, it is known that the following equation obtained by multiplying a right side of the equation (3) by $(1+\cos^2\phi)/2$ is considered as the scattered light intensity.

$$Ivh = Vv(1+\cos^2\phi)/2 \quad (5)$$

Here, $\lambda O$ is wave length of the incident light and $\upsilon = (2\pi n)/\lambda O$, $s = 2 \sin(\phi)/2$. And, n is a refractive index, $\phi$ is a scattering angle, $<\eta^2>$ is square mean of dielectric constant fluctuation ($\tau$ is used suitably as $<\eta^2> = \tau$, hereinafter). $\gamma(r)$ is a function called correlation function. This correlation function $\gamma(r)$ is represented by the following equation (6):

$$\gamma(r) = exp(-r/a) \quad (6)$$

According to Debye's theory, when the refractive index ununiform structure of the medium is dispersed into an A phase and B phase with a boundary surface separately, the following relative equations (7), (8) hold with respect to a correlation function $\gamma(r)$, a correlation distance a and dielectric constant fluctuation square mean $\tau$.

$$a [cm] = (4V/s) \cdot \phi A \phi B \quad (7)$$

$$\tau = \phi A \phi B (nA - nB^2)^2 \quad (8)$$

When it can be considered that the refractive index ununiform structure is constituted at the spherical boundary surface of the radius R, the correlation distance a is given by following equation:

$$a [cm] = (4/3)R(1-\phi A) \quad (9)$$

Upon calculating the effective scattering irradiation parameter $\gamma(r)$ by using the equation (6) according to the equation (5) for natural light incidence, the result becomes as follows;

$$E = [(32a^3 \tau \times \pi^4/\lambda_0^4)]f(b) \quad (10)$$

Here, $$f(b) = [\{(b+2)^2/b^2(b+1) - \}2(b+2)/b^3 ln(b+1)] \quad (11)$$

$$b = 4\upsilon^2 a^3 \quad (12)$$

In FIG. 10, a curve showing the condition that the effective scattering irradiation parameter E is held constant is illustrated by taking the correlation distance a on the horizontal axis and the dielectric constant fluctuation square mean value τ on the vertical axis for the cases of $E=50[cm^{-1}]$ and $E=100[cm^{-1}]$.

Light scattering guides with a large E, generally, have a tendency to have a large scattering power and light scattering guides with a small E have a tendency to have a small scattering power. $E=0[cm^{-1}]$ gives a transparent condition without scattering at all. Accordingly, a general principle holds that light scattering guides with a small E are suited for a surface light source device with a large ruminant area while light scattering guides with a large E are suited for a surface light source device with a small ruminant area. In consideration of this principle, a range of the value of the effective scattering irradiation parameter E which is preferable for the light source for a backlight with a usual size is from $E=0.45[cm^{-1}]$ to $E=100[cm^{-1}]$.

On the other hand, the correlation distance a is a quantity which is deeply related to the orientation characteristics in the respective scattering actions inside of the light scattering guide. That is, as will be guessed from the forms of the equation (3) to (5), the scattered light inside of the light scattering guide generally has the forward scattering tendency; however, the intensity of the forward scattering tendency varies depending on the correlation distance a.

A graph of FIG. 11 exemplifies this tendency as to these two values. In FIG. 11, the horizontal axis is a scattering angle φ (the transmission direction of the incident light is given as φ=0°). The scattering intensity in the case assuming natural light is shown by the value Vvh(F)/Vvh(0) is normalized with respect to φ=0° in the equation (5) described above.

As shown in addition in FIG. 11, in the case $a=0.13 \mu m$, that is, $2R=0.2 \mu m$ calculated by using the above equation (9), a graph of the normalized scattering intensity becomes a gentle reducing function. On the other hand, in the case $a=1.3 \mu m$, that is, $2R=2.0 \mu m$ calculated by using the above equation (9), a graph of the normalized scattering intensity becomes a suddenly reducing function within a narrow range of φ.

This fact means that the forward scattering due to a very small ununiform structure in the light scattering guide has a tendency to be weakened with decreasing value of the correlation distance a and has a tendency to be strengthed with increasing value of the correlation distance. That is, a scattering angle range in each scattering tends to expand under the condition of small correlation distance a and it tends to be made narrow under the condition of a large correlation distance a.

This discussion relates to the respective scattering phenomena themselves due to the refractive index ununiform structure distributed in the light scattering guide. In order to evaluate the directional characteristics of light actually emitted from the light exiting surface of the light scattering guide, it is necessary to consider both the total reflection phenomena in the light exiting surface and a transmission factor of the boundary surface upon emitting light (rate of escape from the light scattering guide).

As mentioned in the description in association with FIG. 2 and FIG. 3, when an incident angle upon impinging light from the light scattering guide on the light exiting surface exceeds a critical angle αc which is determined by the refractive indexes of the mediums of inner and outer side of the light scattering guide, emitting (escaping) to the outside (an air layer) can not occur.

It should be noted that the incident angle to the direction of the normal line perpendicular to the light exiting surface is represented by 0°.

In this case PMMA (the refractive index 1.492) as a typical material of the matrix of the light scattering guide according to the invention, αc=42°. The materials other than this material also have critical angles not differing so much from the value of the PMMA. A number of materials applicable to the matrix of the light scattering guide is listed in Tables 1 and 2.

TABLE 1

| Category | Name of Polymer | Refractive Index |
|---|---|---|
| MA | 1. PMMA [polymethyl methacrylate] | 1.49 |
|  | 2. PEMA [polyethyl methacrylate] | 1.483 |
|  | 3. Poly(nPMA) [poly-n-propyl methacrylate] | 1.484 |
|  | 4. Poly(nBMA) [poly-n-butyl methacrylate] | 1.483 |
|  | 5. Poly(nHMA) [poly-n-hexyl methacrylate] | 1.481 |
|  | 6. Poly(iPMA) [polyisopropyl methacrylate] | 1.473 |
|  | 7. Poly(iBMA) [polyisobutyl methacrylate] | 1.477 |
|  | 8. Poly(tBMA) [poly-t-butyl methacrylate] | 1.463 |
|  | 9. PCHMA [polycyclohexyl methacrylate] | 1.507 |
| XMA | 10. PBzMA [polybenzyl methacrylate] | 1.568 |
|  | 11. PPhMA [polyphenyl methacrylate] | 1.57 |
|  | 12. Poly(1-PhEMA) [poly-1-phenylethyl methacrylate] | 1.543 |
|  | 13. Poly(2-PhEMA) [poly-2-phenylethyl methacrylate] | 1.559 |
|  | 14. PFFMA [polyfurfuryl methacrylate] | 1.538 |
| A | 15. PMA [polymethyl acrylate] | 1.4725 |
|  | 16. PEA [polyethyl acrylate] | 1.4685 |
|  | 17. Poly(nBA) [poly-n-butyl acrylate] | 1.4535 |
| XA | 18. PBzMA [polybenzyl acrylate] | 1.5584 |
|  | 19. Poly(2-ClEA) [poly-2-chloroethyl acrylate] | 1.52 |

TABLE 2

| Category | Name of Polymer | Refractive Index |
|---|---|---|
| AC | 20. PVAc [polyvinyl acetate] | 1.47 |
| XA | 21. PVB [polyvinyl benzoate] | 1.578 |
|  | 22. PVAc [polyvinyl phenyl acetate] | 1.567 |
|  | 23. PVClAc [polyvinyl chloroacetate] | 1.512 |
| N | 24. PAN [polyacrylonitrile] | 1.52 |
|  | 25. Poly(αMAN) [poly-α-methyl acrylonitrile] | 1.52 |
| α-A | 26. PMA(2Cl) [polymethyl-α-chloracrylate] | 1.5172 |
| St | 27. Poly(o-ClSt) [poly-o-chlorostyrene] | 1.6098 |
|  | 28. Poly(p-FSt) [poly-p-fluorostyrene] | 1.566 |
|  | 29. Poly(o, p-FSt) [poly-o-, p-diflurostyrene] | 1.475 |
|  | 30. Poly(p-iPSt) [poly-p-isopropyl styrene] | 1.554 |
|  | 31. PSt [polystyrene] | 1.59 |
| C | 32. PC [polycarbonate] | 1.59 |

As mentioned above, in the case of the surface light source device supplying light from the side end surface (the light incidence surface 2) of the light scattering guide 1, it is rare that the critical angle condition described above can be satisfied with a primary scattered light generated as the light introduced into the light scattering guide 1 encounters the ununiform structure because the scattering in the light scattering guide, generally, shows the forward scattering.

In other words, the major part of light emitted from the light exiting surface after satisfying the critical angle condition is the light which has passed through a multiple scattering inside of the light scattering guide and reflections by the back surface 6 of the light scattering guide 1 and by the reflector 3 disposed therealong.

Thus, as far as the light satisfying the critical angle condition in the light exiting surface is concerned, the forward scattering tendency as an attribute of each scattering phenomenon is considerably weakened, as thus it can be inferred that the distribution of the propagation direction of the light is considerably expanded. Accordingly, the angle characteristics of light emitted from the light exiting surface 5 of the light scattering guide 1 is influenced strongly by an angle characteristic of the transmission factor of the boundary surface (an escaping rate) of light which satisfies the critical angle condition at the light exiting surface 5.

It is known that the transmission factor of the boundary surface under the condition satisfying the critical angle condition barely, generally, is very low. For example, in the case of acrylic resin to air boundary surface, the transmission factor is approximately 40 percent for a P polarized component and approximately 20 percent for an S polarized component. However, when an incident angle becomes smaller than the critical angle to a certain extent, the transmission factor of the boundary surface increases sharply, and the transmission factor of the boundary surface settles to a relatively large and almost constant value. For example, in the case of acrylic resin to air boundary surface, the transmission factor is 90 percent or more for a P polarized component and 85 percent or more for an S polarized component.

From the fact mentioned above, it is guessed that light of an incident angle approximately 35° at the light exiting surface 5 (an angle smaller by a few degrees than the critical angle $\alpha c$) contributes to the light emitting from the light exiting surface 5. As described in association with FIG. 2 and FIG. 3, the light impinging at an incident angle of approximately 35° on the light exiting surface 5 is refracted upon transmitting through the boundary and propagates in the direction approximately 35° to the normal line to the light exiting surface 5. It should be noted that the refractive index of the light scattering guide 1 is not deviated largely from 1.5. Finally, light emitted from the light exiting surface 5 of the light scattering guide 1 becomes light with the directivity in the direction raised up 30° approximately with respect to the light exiting surface 5 when estimated roughly.

However, what is important here is that the directivity of emitted light from the light exiting surface 5 is weakened under the condition such that the value of the correlation distance a is excessively small, because a very small correlation distance a gives a very faint forward scattering and light expands in a wide range only through the primary scattering. As a result, the emitted light from the light exiting surface 5 also expands in a wide range.

A practical condition of the correlation distance a which can prevent such phenomenon is a>0.01 $\mu$m and a specially preferred condition is a>0.05 $\mu$m. A light scattering guide with the exiting directivity is one satisfying such conditions.

According to the invention, the primary light flux which is provided through such light scattering guide with the exiting directivity is converted into a dual light flux.

According to the invention, the prism sheet (a main prism sheet) with the prism surface on which an array of V-shape grooves is formed is used for generating the dual light flux. In the utilizing forms of the main prism sheet, there are options as follows;

(1) The option whether the grooves are inward/the grooves are outward for the main sheet. In the invention, "the grooves inward" is employed in principle (the terms of "the grooves inward", "the grooves outward" or the like are defined in the description in association with the prior art).

(2) The option whether using the main prism sheet singly or using in combination with another prism sheet (the sub-prism sheet) having the function of modifying the preferential propagation direction. In the invention, either of these modes may be permitted. The latter mode includes both the case where the prisms are arranged in the order of the main prism sheet from the sub-prism sheet and the light incidence side and the case where the prisms are arranged in the order of the sub-prism sheet and the main prism sheet. In the case of a former mode, the sub-prism sheet is disposed between the main prism sheet and the light exiting surface of the light scattering guide for supplying the primary light flux.

(3) The option for the relation between the direction of V-shape grooves of the sub-prism sheet and the direction of the light incidence surface of the light scattering guide. Normally, the long tubular lamp is disposed along the light incidence surface, so that the direction of the arrangement is described in terms of the relation with the lamp. In the invention, this relation is generally free, but "the grooves parallel to the lamp" or "the grooves perpendicular to the lamp" is employed in usual modes (the terms of "the grooves inward", "the grooves outward" or the like are defined in the description in association with the prior art).

In the invention, the variation of the arrangement is permitted under the condition the vertical angle of the prism sheet is determined within the range in which dual light flux can be generated. In general, too small and too large angles tend to adversely affect the definite generation of two light fluxes. A practical range of the vertical angle is 70° to 110°, especially the range from 80° to 100° will produce more preferable result. However, in the case where the primary light flux is provided through the prism sheet for modifying the preferential propagation direction, the range of 60° to 70° also belongs to the practical range.

Primarily, dualyzing light flux phenomena in the invention is the phenomena resulting from a complex interaction among the reflection (total reflection and partial reflection) and transmission. Accordingly, the mechanism of the dual light flux generation in the variations of the invention described above is extremely complex, so that it is hard to theoretically analyze this mechanism. Therefore, according to the present invention, the range described above is selected by researching with many experiments the vertical angle conditions of the main prism sheet under which light flux can be dualized.

It is preferred that the various conditions (a value of the vertical angle of the main prism sheet, using or not using the sub-prism sheet, orientation of the main prism sheet and the sub-prism sheet and a value of the vertical angle of the sub-prism sheet or the like) upon applying the invention to the actual liquid crystal display or the like are determined in consideration of required degree of the dual light flux generation and the preferential propagation direction or others.

Referring to the accompanying drawings, the invention will be described in more detail based on actual measurements for many examples (the preferred embodiments and the references).

BRIEF DESCRIPTION OF THE DRAWINGS

FIG. 11 is a graph illustrating that the intensity of forward scattering of a light scattering guide varies depending on the correlation distance a.

DESCRIPTION OF THE PREFERRED EMBODIMENTS

For convenience of explanation, embodiments in which the vertical angle of 90° is adopted for the main prism sheet are divided into three types, [I] through [III]. The value of 90° is a preferred typical value which is common to all these types.

In any one of these type [I] to [III], the main prism sheet is disposed with "the grooves inward". Moreover, the type [III] corresponds to a modification (unifying of a main and a sub-prism sheet) of the type [II].

The type [I]; main prism sheet is used singly.

The type [II]; main prism sheet and sub-prism sheet are used. The main prism sheet is disposed with "the grooves inward". The sub-prism sheet is disposed outside or inside of the main prism sheet.

The type [III]; a prism sheet used both as a main prism sheet and a sub-prism sheet, obtained by unifying them. The prism sheet is disposed so that its prism surface suited for dual light flux generation faces inside.

Figure 1:
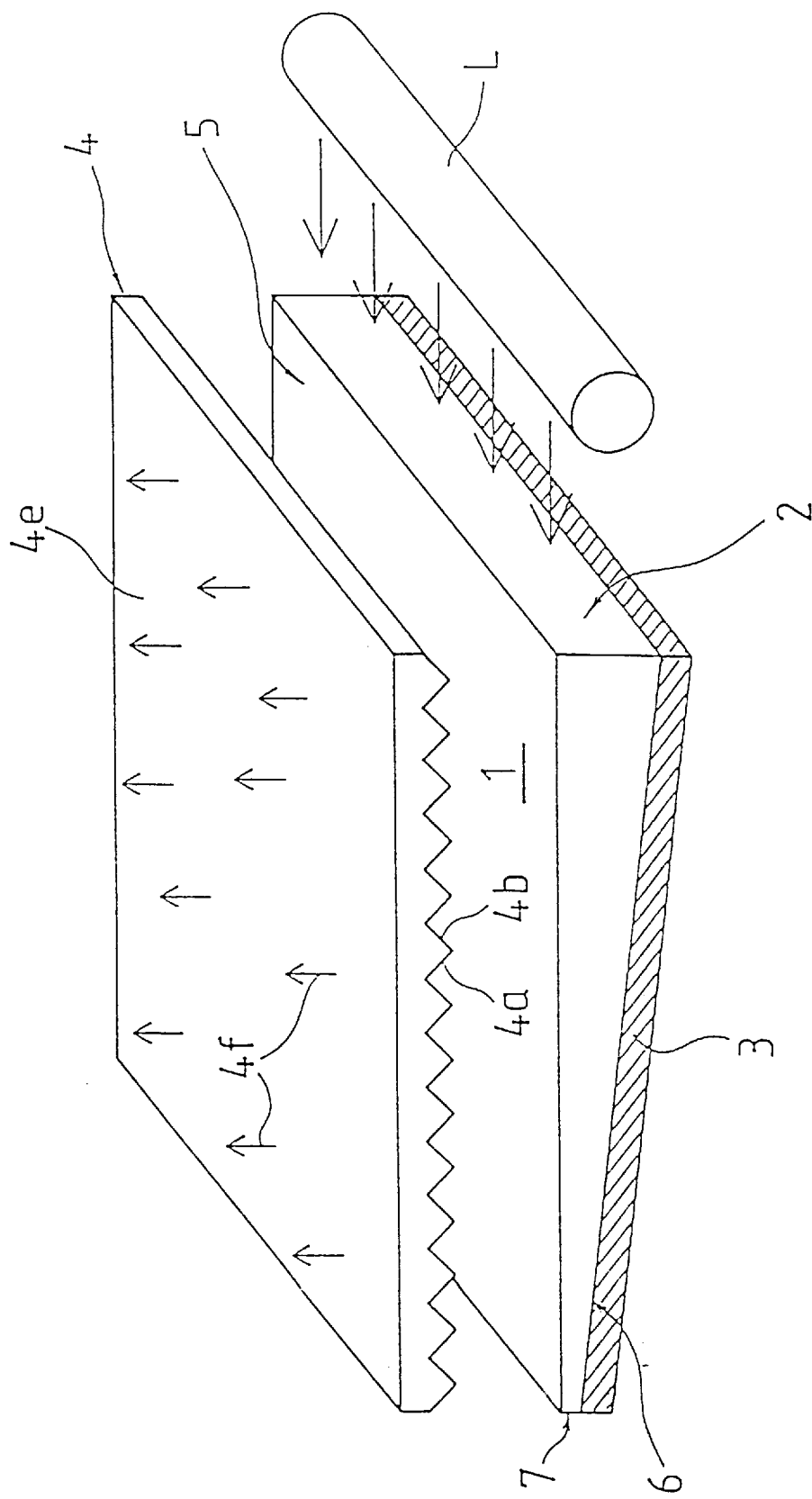
FIG. 1 schematically shows an arrangement of a surface light source device using the prism sheet in a conventional basic mode.
Figure 2:
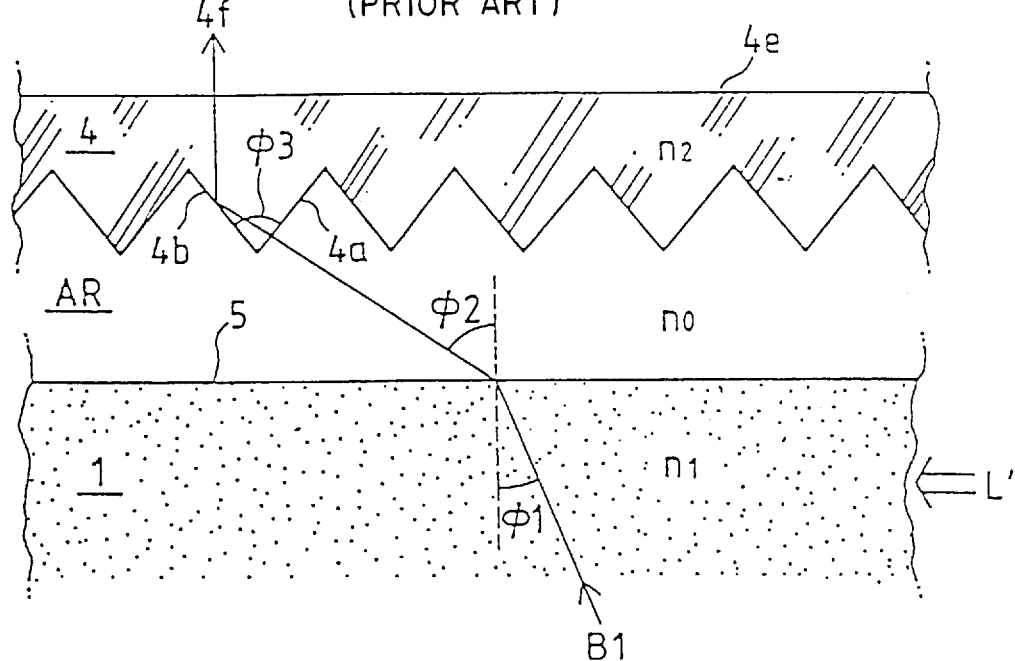
FIG. 2 illustrates the behavior of light in the section along the direction perpendicular to the lamp L shown in FIG. 1.
Figure 3:
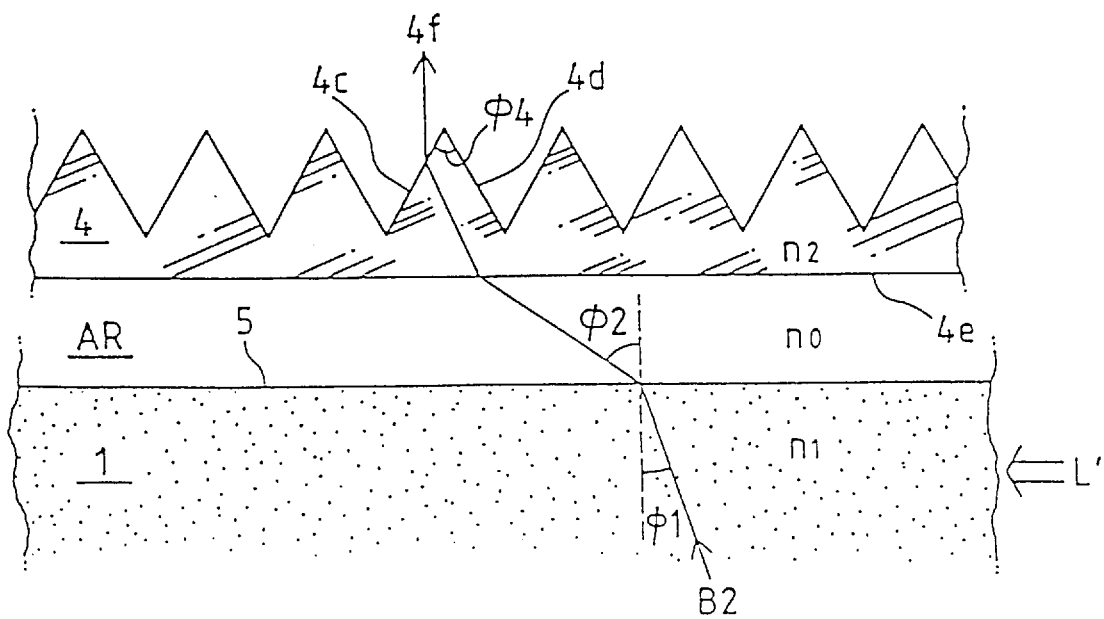
FIG. 3 illustrates the behavior of light in a case where a prism sheet is disposed so that the prism surface is directed outward by modifying the arrangement of FIG. 1 or FIG. 2.
Figure 4:
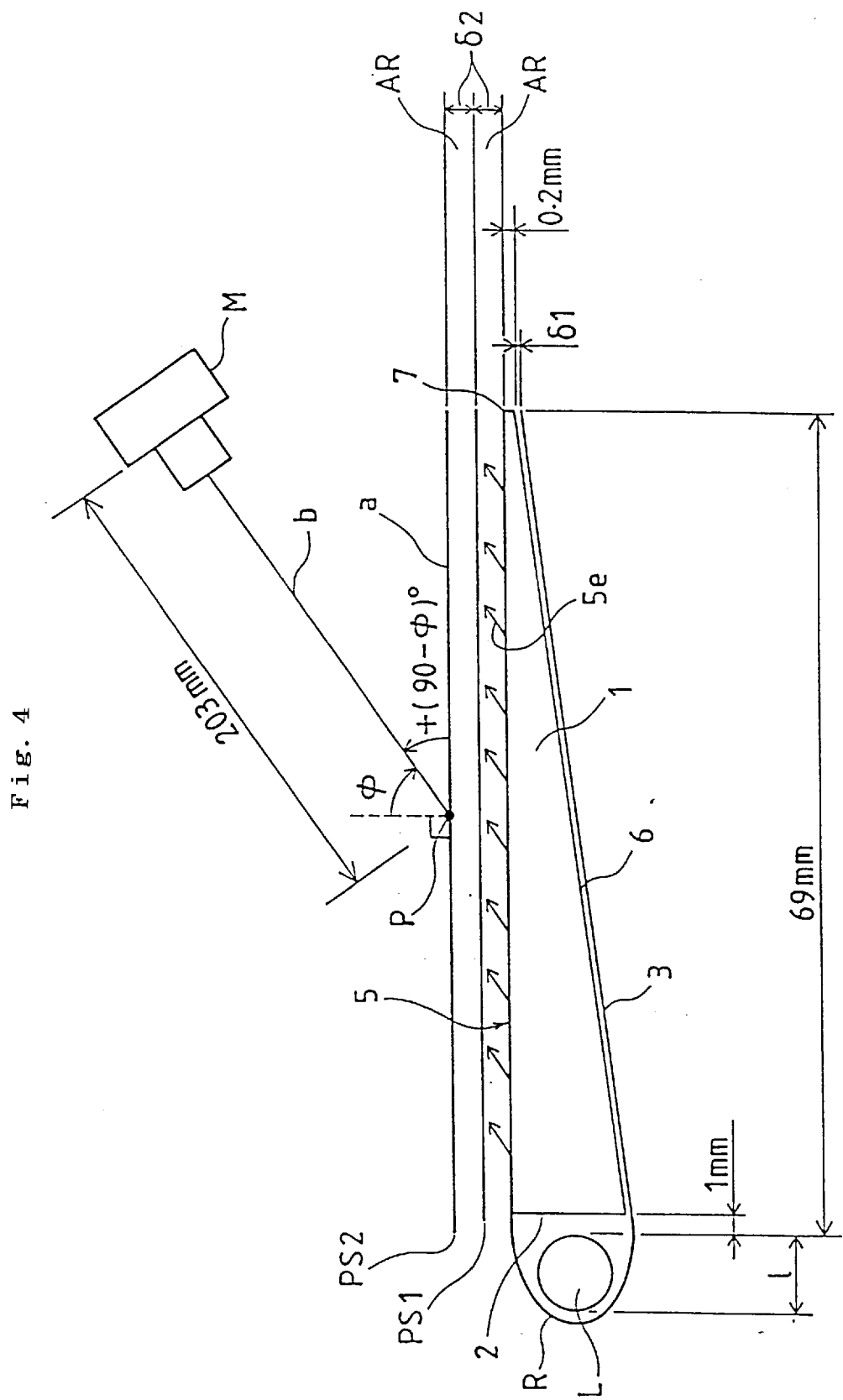
FIG. 4 is a sectional view illustrating an arrangement upon measurements for examples and references for the invention by the use of a luminancemeter.
Figure 5:
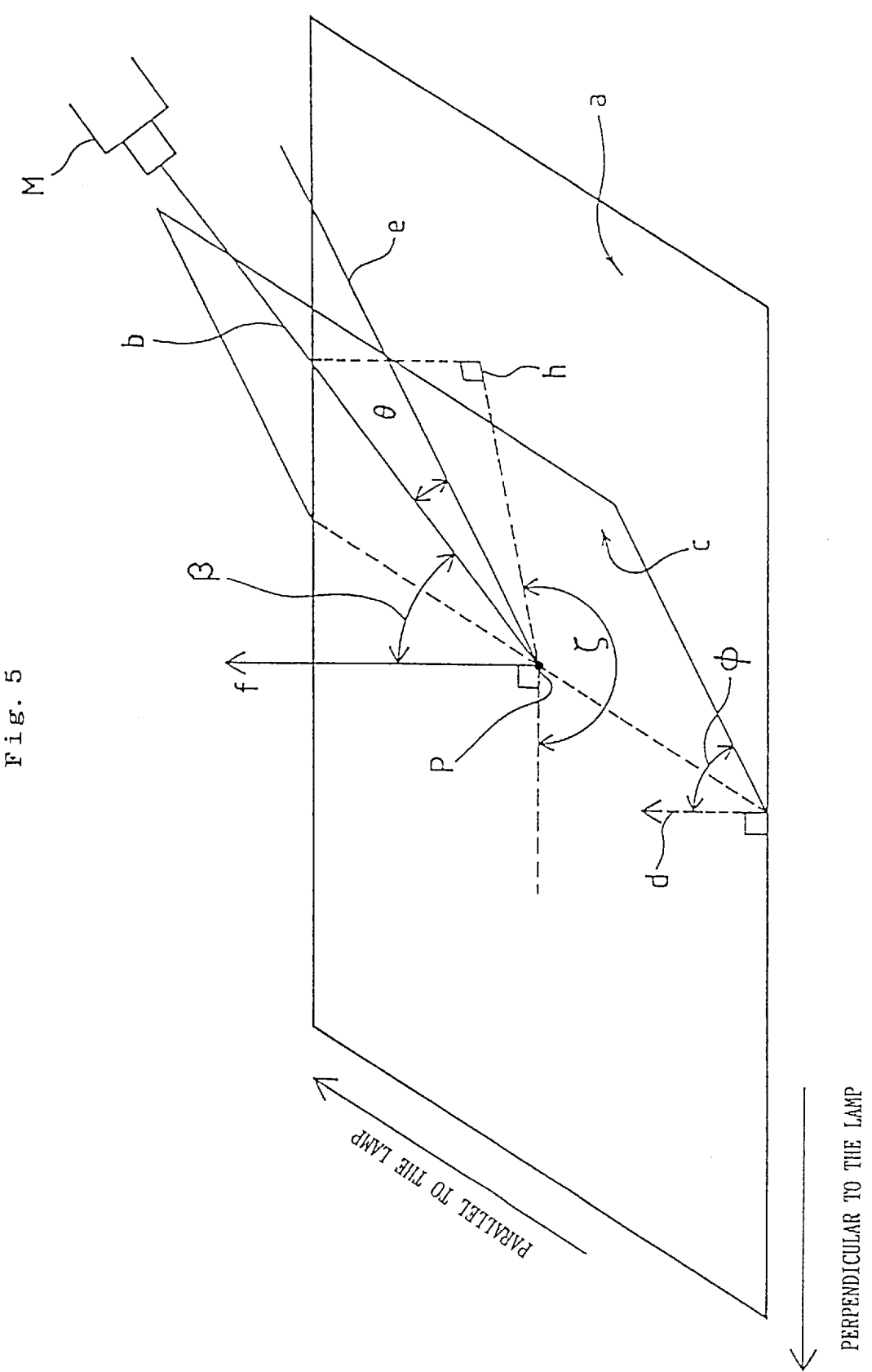
FIG. 5 illustrates more particularly in three-dimensions the arrangement upon measurements for the examples and the references in the invention by the use of luminancemeter.

The total arrangement, materials of the light scattering guide, the dimension, the measuring method and the method of defining angle or others described in FIG. 4 and FIG. 5 are applied in common to each embodiment. Moreover, the form of itemized statement utilized in the description of the graphs of FIG. 6 to FIG. 10 will be followed as occasion requires.

Figure 14:
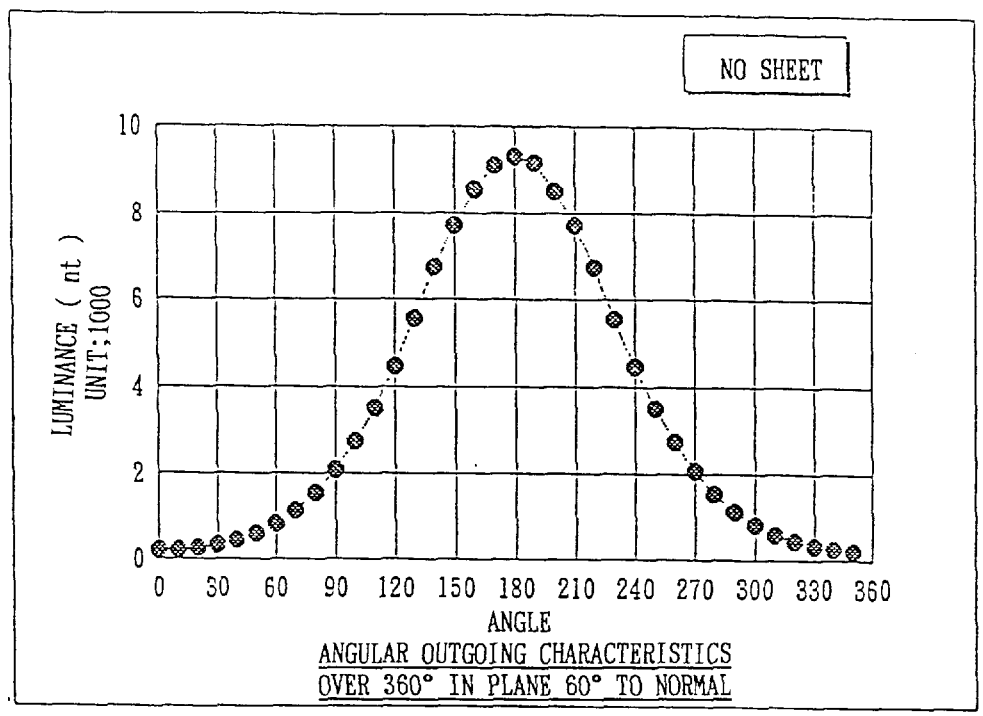
FIG. 14 is a graph showing a luminance change described by taking luminance on the vertical axis when scanning ζ in the range from 0° to +360° under the condition with no prism sheet; β=60.
Figure 15:
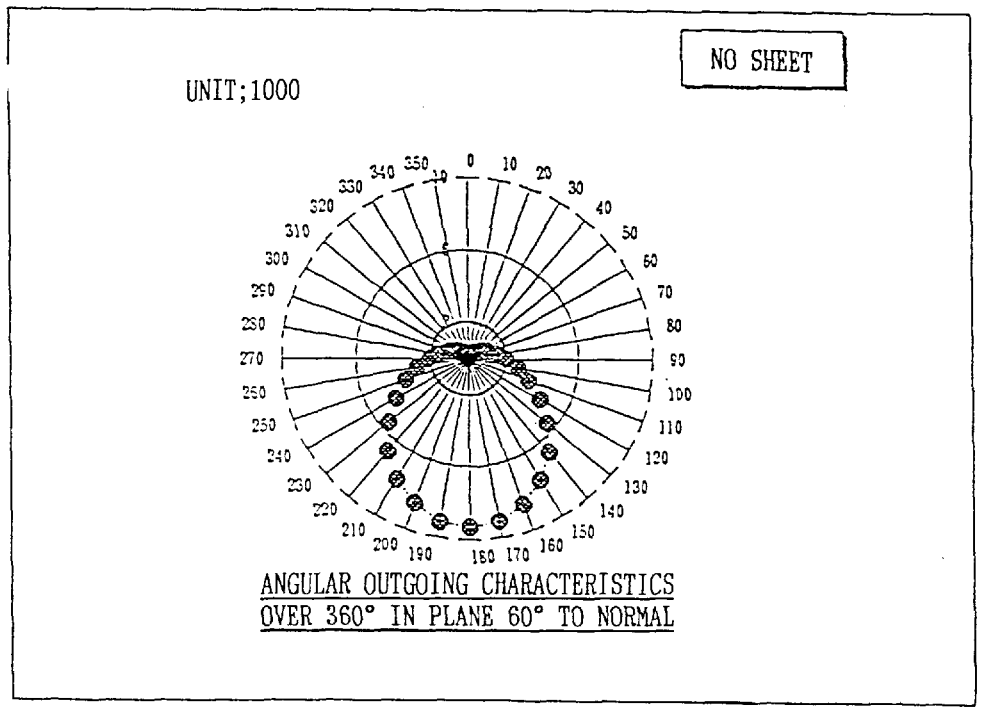
FIG. 15 is a graph showing the same data as FIG. 14 described by taking luminance on the radial direction axis.

[1] Various examples of the dual light flux generation in section perpendicular to the direction of the grooves on the main prism sheet realized by using a single main prism sheet with the vertical angle of 90° with "the grooves facing inward":

<Embodiment I-(1)>: prism vertical angle $\psi=90°$, grooves inward perpendicular to the lamp; the measured results are shown in the graphs of FIG. 12 to FIG. 13 and FIG. 16 to FIG. 19. The graphs of FIG. 14 and FIG. 15 are reference examples. These reference examples are given as <Reference Example 1>.

Figure 12:
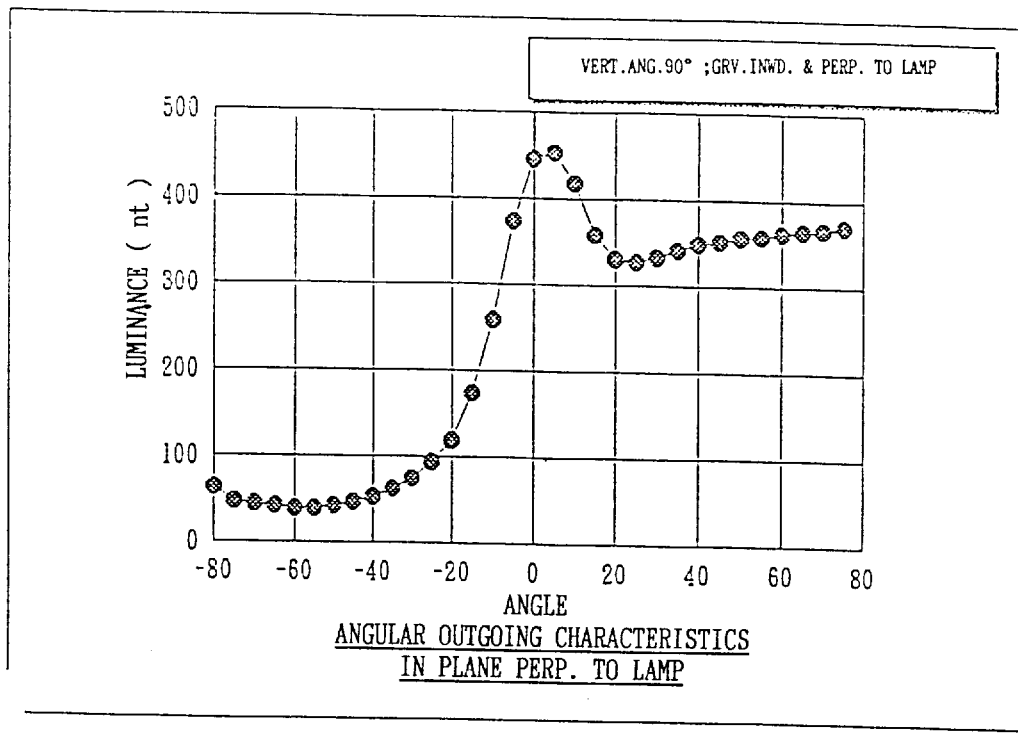
FIG. 12 is a graph showing a luminance change when scanning ø within the range from −80° to +80° under the condition of the prism vertical angle ψ=90°; the arrangement of the grooves inward perpendicular to the lamp; θ=0°.

[The graph of FIG. 12]
(1) Scanning ø within the range from −80° to +80° under the condition of $\theta=0°$.
(2) Showing luminance by the nt unit on the vertical axis.
(3) Description: as is seen from the graph, the light flux with a luminance peak appears at the direction of ø=approximately 0°, that is, at the frontal direction of the surface light source device. However, it should be noted that the luminance level is very low in general. Moreover, a little plateau region showing a relatively small drop of luminance from the luminance peak appears in a wide range of ø>0°.

Figure 13:
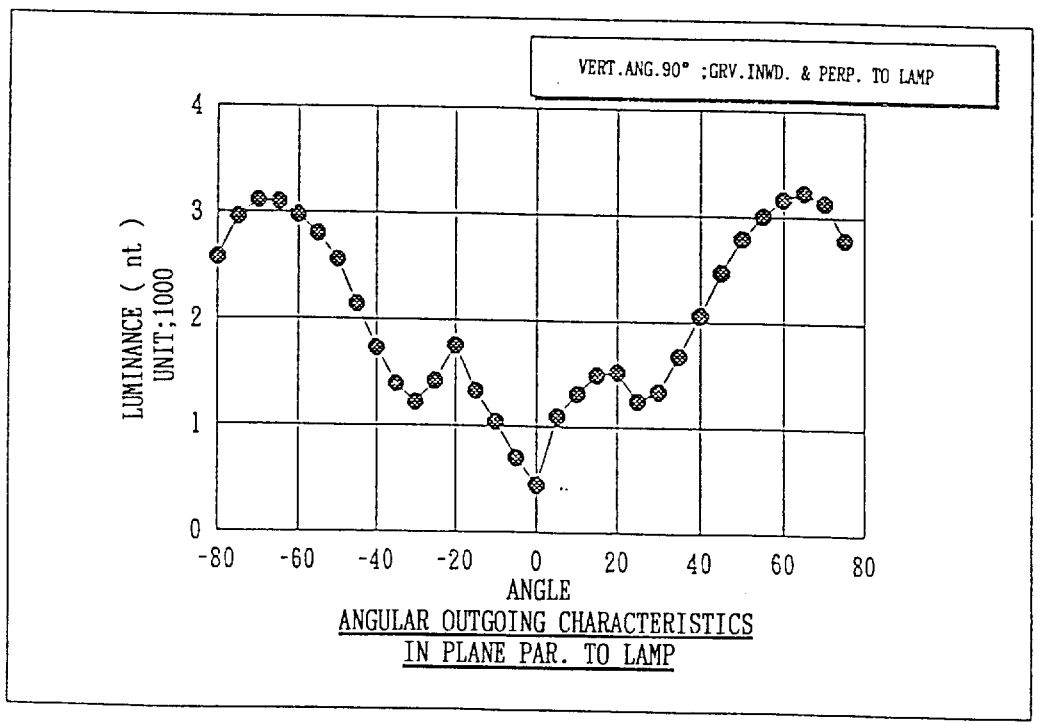
FIG. 13 is a graph showing a luminance change when scanning θ within the range from −80° to +80° under the condition of the prism vertical angle ψ=90°; the arrangement of the grooves inward perpendicular to the lamp; ø=0°.

[The graph of FIG. 13]
(1) Scanning $\theta$ within the range from −80° to +80° under the condition of ø=0°.
(2) Showing luminance by the 1000 nt unit on the vertical axis.
(3) Description: as is seen from the graph, the light flux with a luminance peak at the direction of $\theta$=approximately ±65° is obtained. There is a clear bottom near $\theta=0°$. This causes the luminance data of FIG. 12 to be at a very low level in general.

From the above two graphs, it is apparent that the dual light flux generation is accomplished in this embodiment. In order to understand this in three-dimensions, an angle $\zeta$ which is made by a projection of a collimation angle b on a surface a with respect to the direction perpendicular to the lamp is scanned over 360° for measurement, while holding angle $\beta$ between a collimation line and a normal line f with respect to a central point P in FIG. 5.

[The graphs of FIG. 14 and FIG. 15]
These graphs of <Reference Example 1> give a reference standard for evaluating the results of the various measurements of this type (scanning angle $\zeta$ over 360°). Luminance measurement was carried out as to the light flux emitted from the light exiting surface of the light scattering guide 1 in FIG. 4 without using a prism sheet. The range of scanning angle, the mode of graphic representation and the description of the results or the like as follows:

(1) scanning $\zeta$ in the range from 0° to +360° under the condition of $\beta=60°$.
(2) The scale of the vertical axis of FIG. 14 shows luminance by the 1000 nt unit. FIG. 15 is a graph showing the same data by taking luminance on the radial axis by the 1000 nt unit.
(3) Description: as will be read readily from the graph, an extremely bright light flux with a luminance peak at the direction of $\zeta=+180°$ is obtained. Although the graphic representation is omitted here, the luminance level drops drastically when the same measurement is made under the condition that angle $\beta$ deviates largely from 60° (for example $\beta=30°$). Thus difference of the luminance level is caused by the exiting directivity of the light scattering guide.

These graphs show a three dimensional distribution of the light intensity under the condition without a prism sheet. Accordingly, these graphs are useful to interpret the results of measurement of the same type in the examples hereinafter and to understand dual light flux generation in three dimensions.

The graphs of FIG. 16 to FIG. 19 shows the results under the two conditions of the angle $\beta$ in this embodiment according to the same form as FIG. 14 and FIG. 15.

Figure 16:
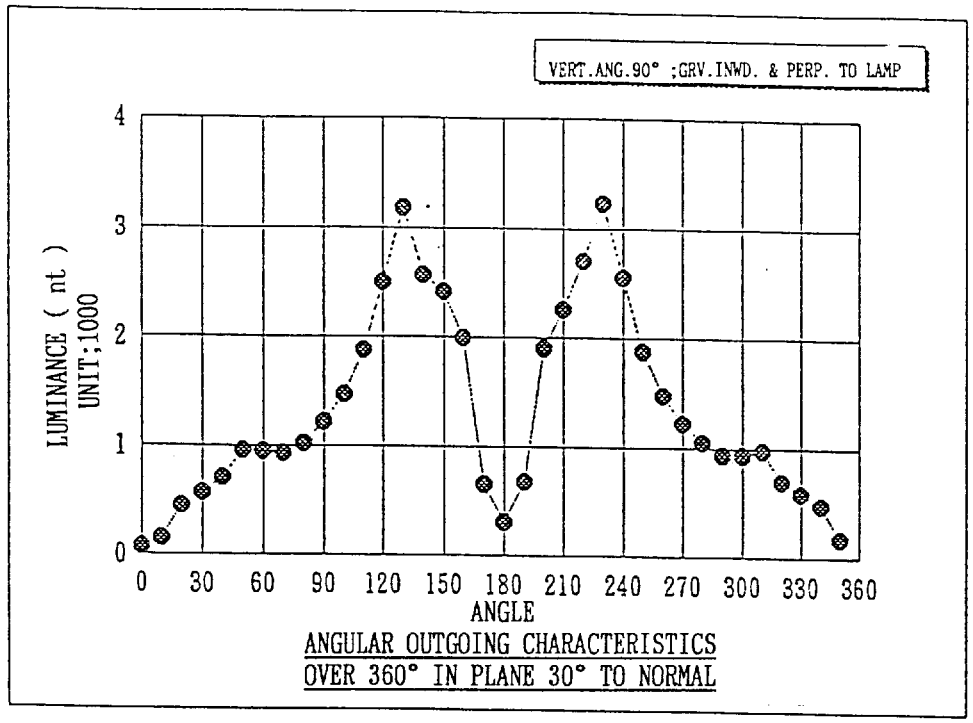
FIG. 16 is a graph showing a luminance change when scanning ζ in the range from 0° to +360° under the condition of the prism vertical angle ψ=90°; the arrangement of the grooves inward perpendicular to the lamp; β=30°.
Figure 17:
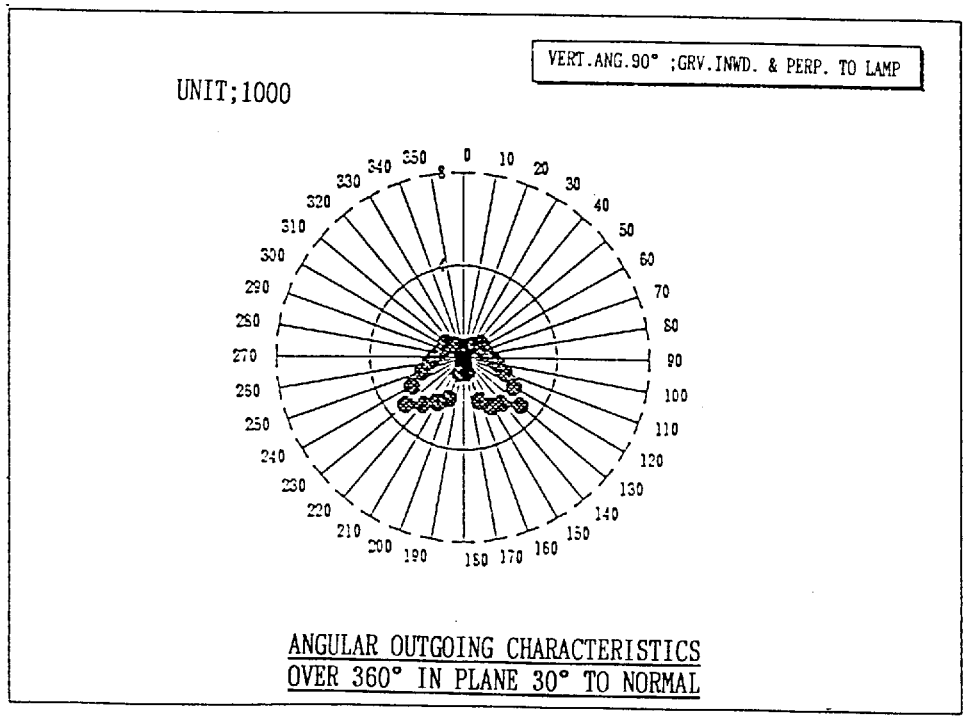
FIG. 17 is a graph showing the same data as FIG. 16 described by taking luminance on the radial direction axis.

[The graphs of FIG. 16 and FIG. 17]
(1) Scanning $\zeta$ within the range from −80° to +80° under the condition of $\beta=30°$.
(2) The graph of FIG. 16 shows luminance by taking luminance on the vertical axis by the 1000 nt unit. The graph of FIG. 17 shows the same data by taking luminance on the radial direction axis by the 1000 nt unit.
(3) Description: as is seen from both graphs, clear luminance peaks appears near the direction of $\zeta=+180°\pm50°$, respectively. However, the luminance level is low and 3000 nt at the highest.

Figure 18:
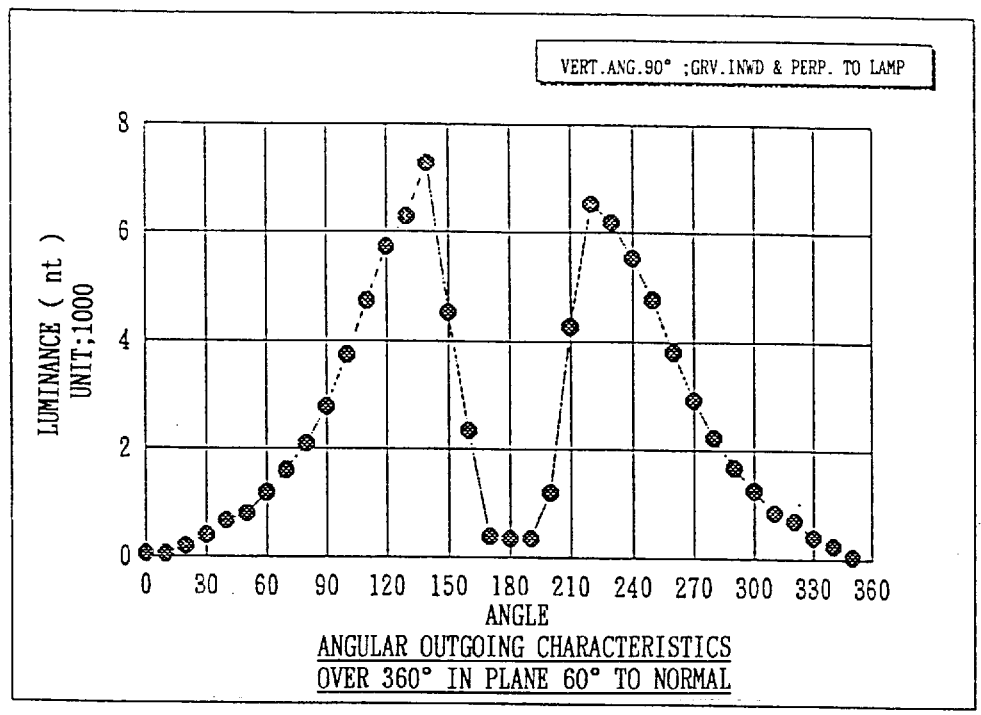
FIG. 18 is a graph showing a luminance change when scanning ζ in the range from 0° to +360° under the condition of the prism vertical angle ψ=90°; the arrangement of the grooves inward perpendicular to the lamp; β=60°.
Figure 19:
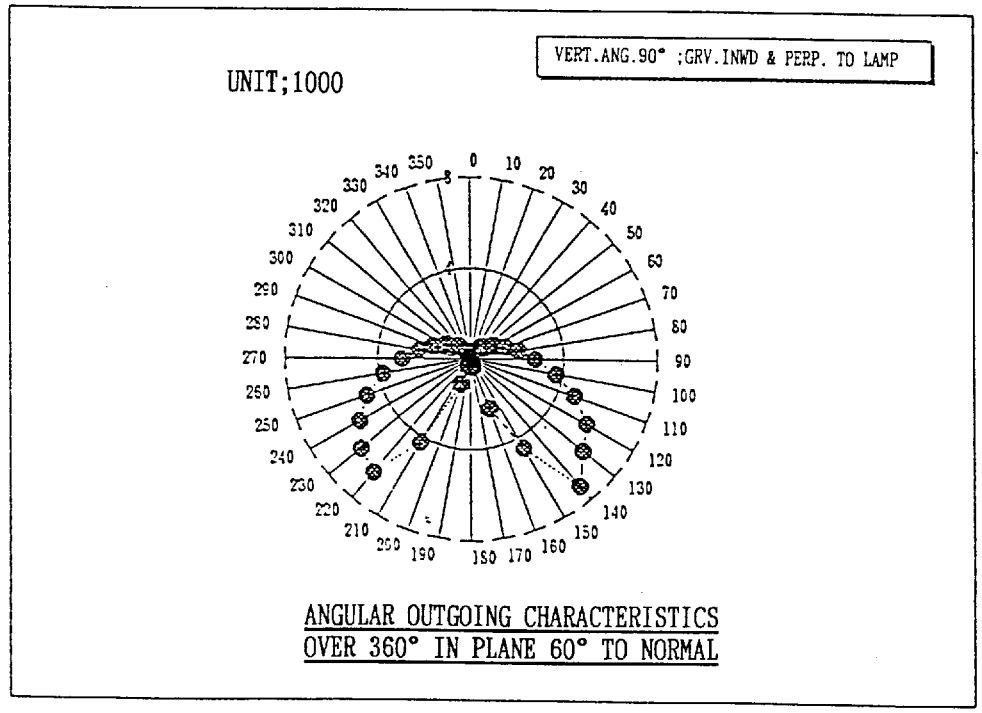
FIG. 19 is a graph showing the same data as FIG. 18 described by taking luminance on the radial direction axis.

[The graphs of FIG. 18 and FIG. 19]
(1) Scanning $\zeta$ in the range from 0° to +360° under the condition of $\beta=60°$.
(2) The graph of FIG. 18 illustrates luminance by taking luminance on the vertical axis by the 1000 nt unit. The graph of FIG. 19 shows the same data by taking luminance on the radial direction axis by the 1000 nt unit.
(3) Description: as is seen from the graph, a clear luminance peaks appear near the direction of $\zeta=+180°\pm40°$, respectively. The luminance level is extremely high and 7000 nt at the highest.

From the various graphs above, it is understood that the dual light flux was generated clearly at two directions upwardly left obliquely and right obliquely viewing from the lamp L side in the arrangement of <Embodiment I-(1)> (the prism vertical angle $\psi=90°$, the grooves inward perpendicular to the lamp).

<Embodiment I-(2)>; the prism vertical angle $\psi=90°$, the grooves inward parallel to the lamp; the measured results are shown in FIG. 20 to FIG. 27.

Figure 20:
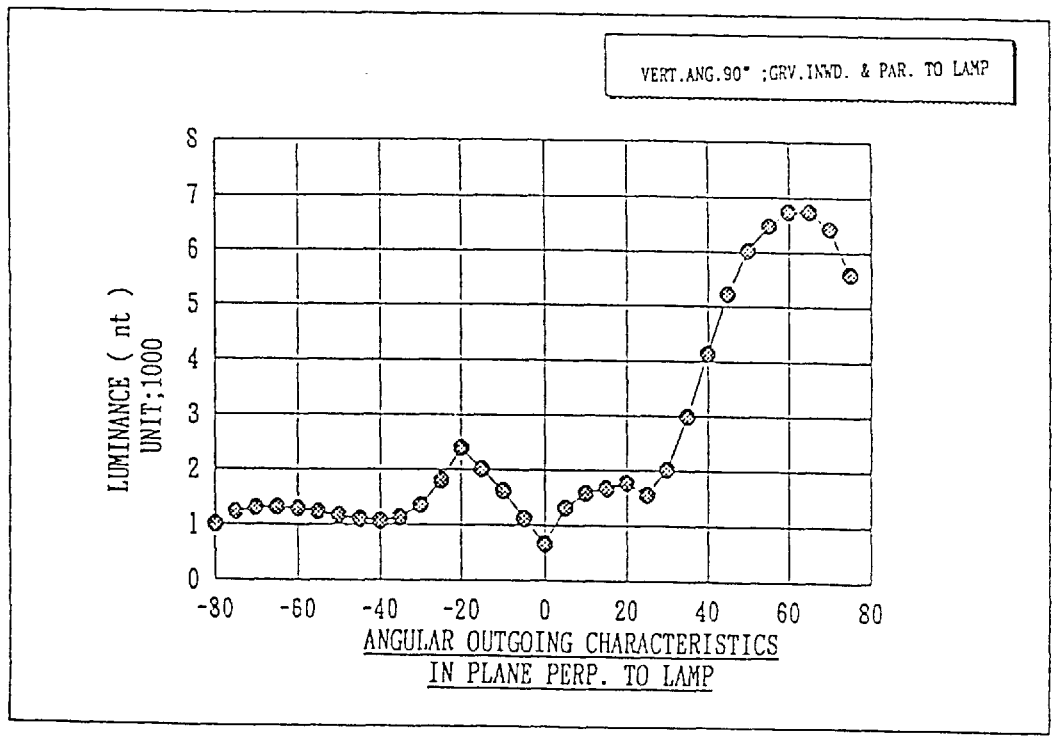
FIG. 20 is a graph showing a luminance change when scanning θ within the range from −80° to +80° under the condition of the prism vertical angle ψ=90°; the arrangement of the grooves inward parallel to a lamp; θ=0°.

[The graph of FIG. 20]
(1) Scanning ø within the range from −80° to +80° under the condition of $\theta=0°$.
(2) Showing luminance on the vertical axis by the 1000 nt unit.
(3) Description: as is seen from the graph, a conspicuous luminance peak appears the direction of ø=approximately +60° and the luminance peak comes up to 6800 nt. Moreover, there is another peak at the direction of ø=approximately −60°. This peak luminance is approximately 2400 nt and comes up to four times compared with the bottom value approximately 600 nt at the direction of ø=0°, although it is lower compared with the peak at ø=60°.

Figure 21:
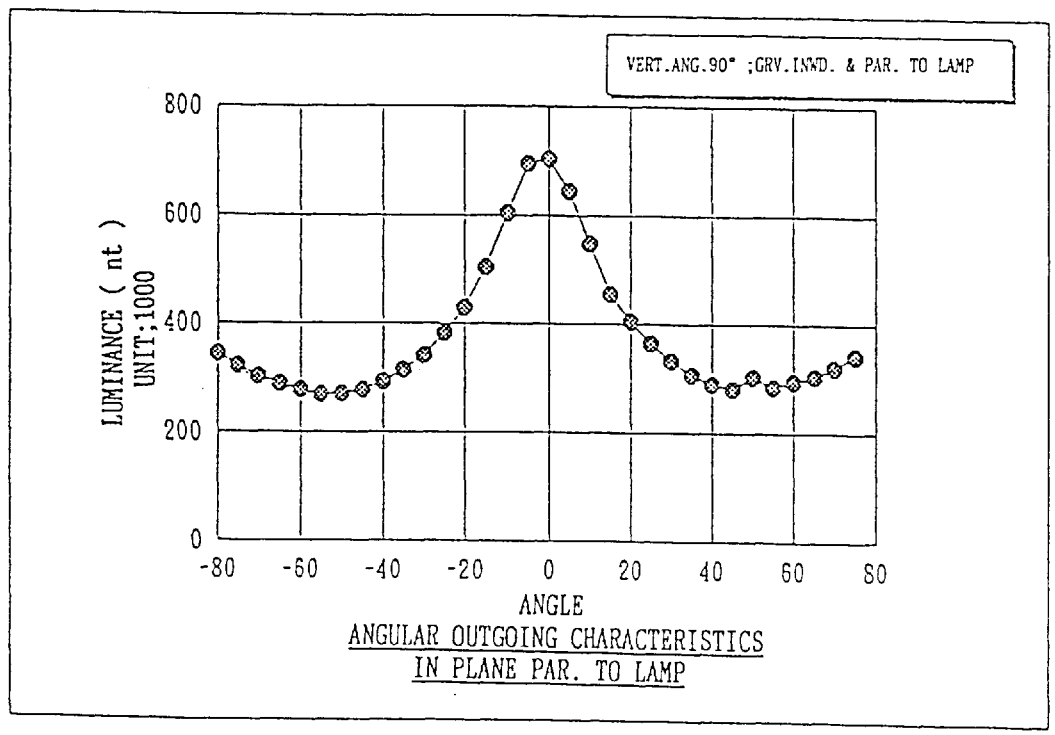
FIG. 21 is a graph showing a luminance change when scanning θ within the range from −80° to +80° under the condition of the prism vertical angle ψ=90°; the arrangement of the grooves inward parallel to a lamp; ø=0°.

[The graph of FIG. 21]
(1) Scanning $\theta$ within the range from −80° to +80° under the condition of ø=0°.
(2) Showing luminance on the vertical axis by the nt unit.
(3) Description: the graph shows a clear symmetric form with a peak at the direction of $\theta=0°$.

Figure 22:
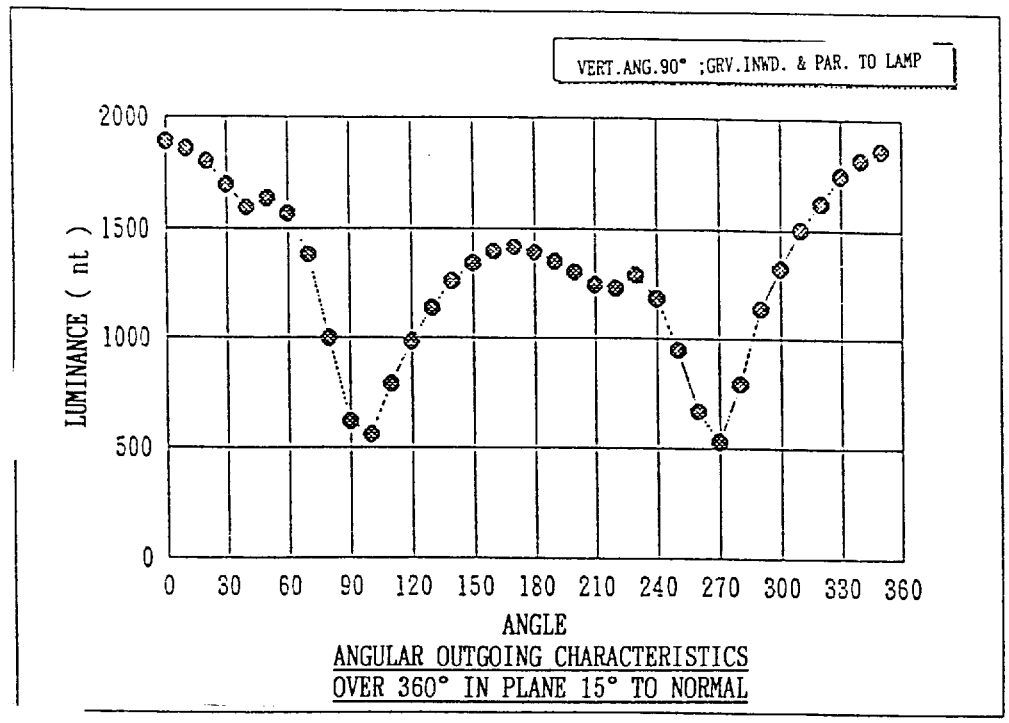
FIG. 22 is a graph showing a luminance change when scanning ζ in the range from 0° to +360° under the condition of the prism vertical angle ψ=90°; the arrangement of the grooves inward parallel to a lamp and β=15°.
Figure 23:
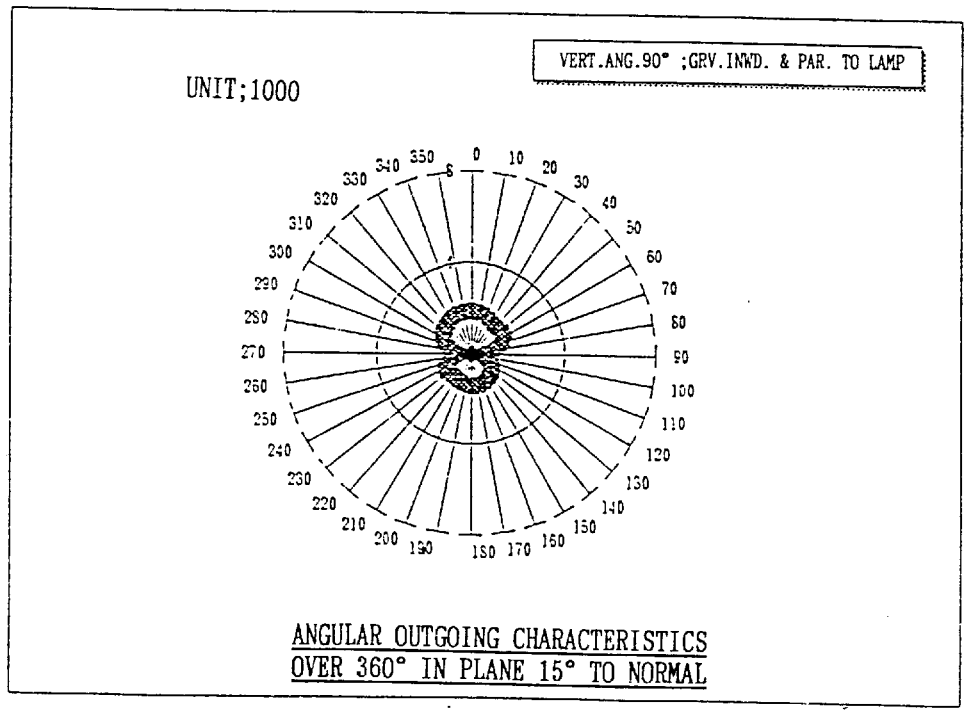
FIG. 23 is a graph showing the same measured data as FIG. 22 described by taking luminance on the radial direction axis.

[The graphs of FIG. 22 and FIG. 23]
(1) Scanning $\zeta$ in the range from 0° to +360° under the condition of $\beta=15°$.

(2) The graph of FIG. 22 illustrates luminance by taking luminance on the vertical axis by the nt unit. The graph of FIG. 23 shows the same data by taking luminance on the radial direction axis by the 1000 nt unit.

(3) Description: as is seen from the graph, the clear luminance peaks appear near the direction of $\zeta=+0$ ($=360°$) and $\zeta=+180°$, respectively. However, the luminance peak levels are rather low approximately 1900 nt (near $\zeta=+0°$) and approximately 1300 nt (near $\zeta=+180°$).

Figure 24:
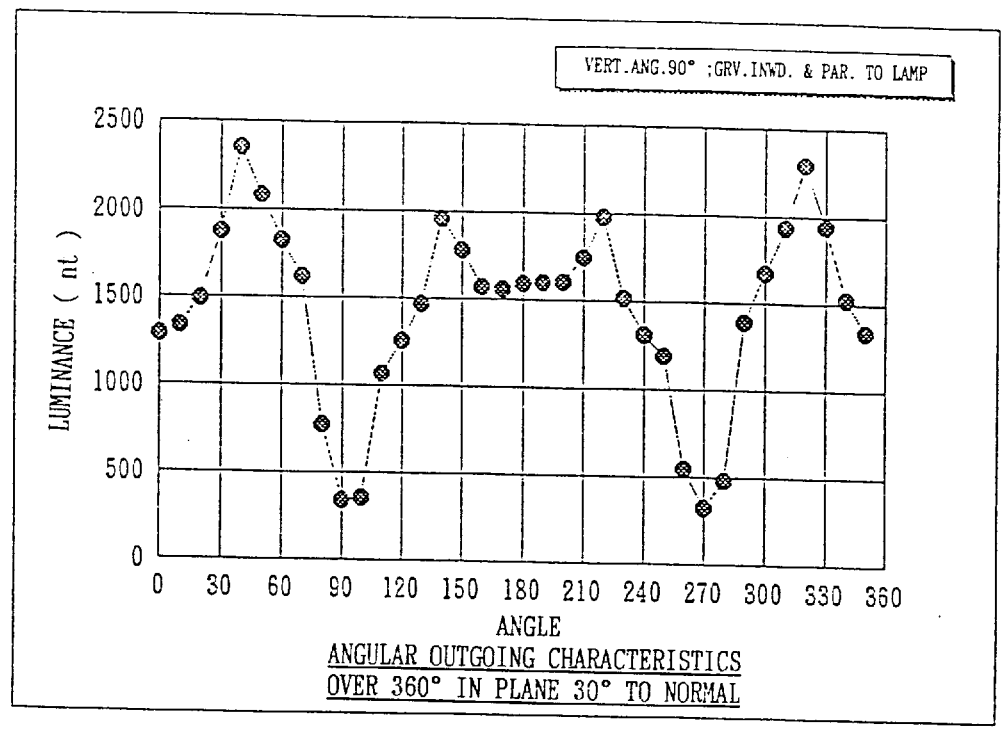
FIG. 24 is a graph showing a luminance change when scanning ζ in the range from 0° to +360° under the condition of the prism vertical angle ψ=90°; the arrangement of the grooves inward parallel to the lamp; β=30°.
Figure 25:
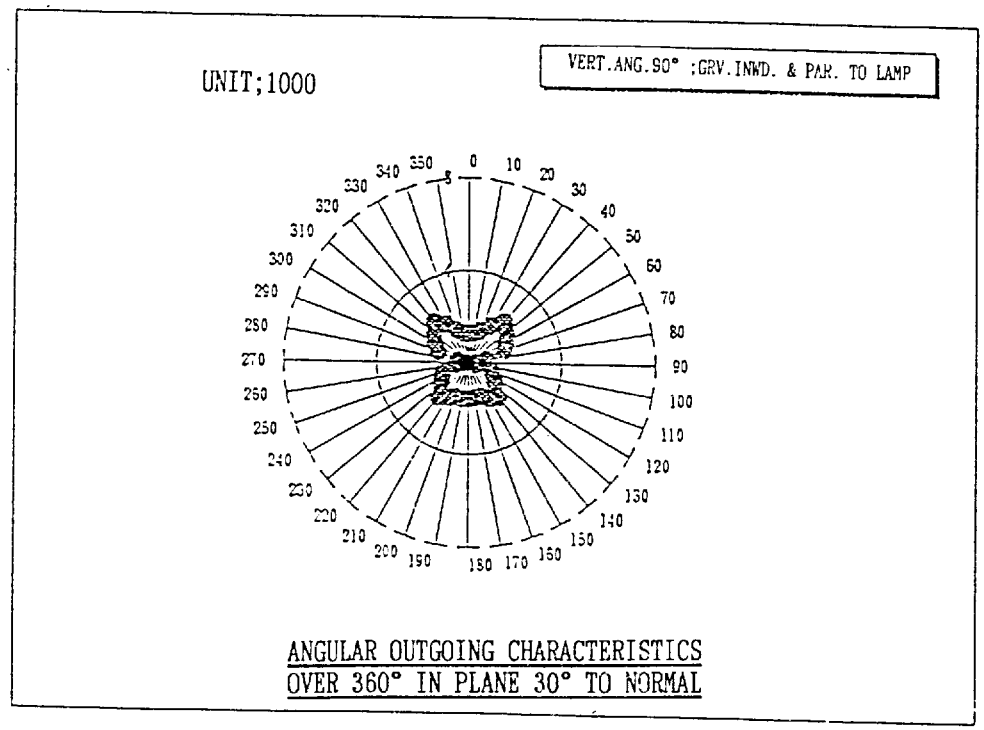
FIG. 25 is a graph showing the same measured data as FIG. 24 described by taking luminance on the radial direction axis.

[The graphs of FIG. 24 and FIG. 25]

(1) Scanning $\zeta$ in the range from 0° to +360° under the condition of $\beta=30°$.

(2) The graph of FIG. 24 shows luminance by taking luminance on the vertical axis by the nt unit. The graph of FIG. 25 shows the same data by taking luminance on the radial direction axis by the 1000 nt unit.

(3) Description: two sets of two peaks appear symmetrically with respect to around $\zeta=+180°$. The luminance peaks near the direction of $\zeta=+40°$ and $\zeta=+320°$ are higher compared with the luminance peaks near the direction of $\zeta=+140°$ and $\zeta=+220°$ and moreover, each rising up sharply from the bottom value (approximately 300 nt near $\zeta=+90°$ and $\zeta=+270°$). On the other hand, the bottom between the peaks near ($\zeta=+140°$ and $\zeta=+220°$ is insufficient in clearness.

Figure 26:
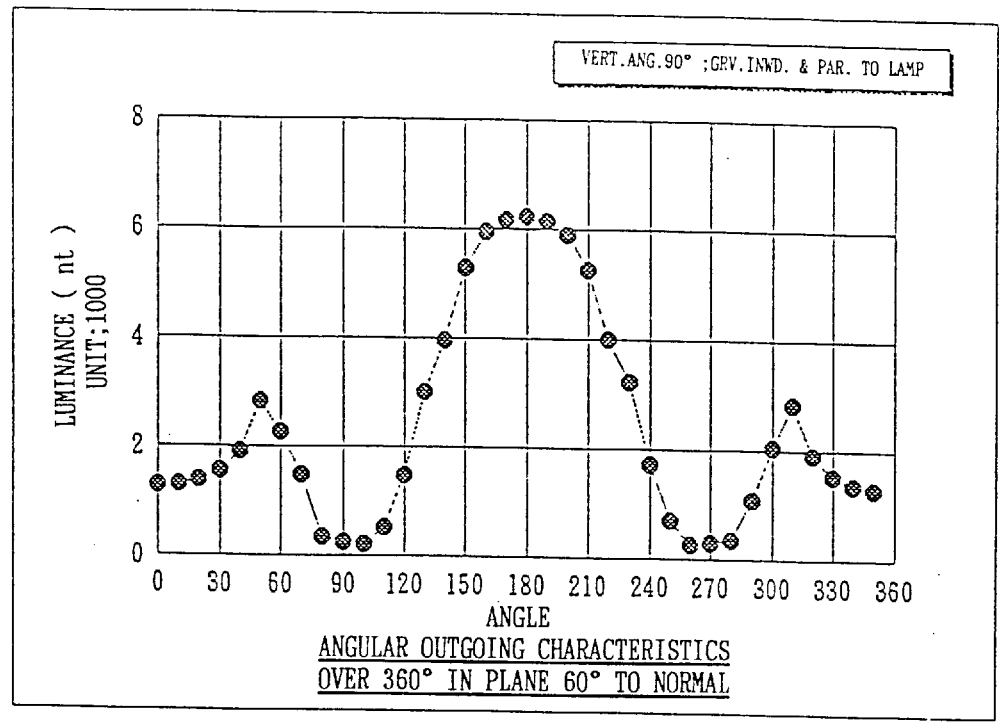
FIG. 26 is a graph showing a luminance change when scanning ζ in the range from 0° to +360° under the condition of the prism vertical angle ψ=90°; the arrange of the grooves inward parallel to a lamp and β=60°.
Figure 27:
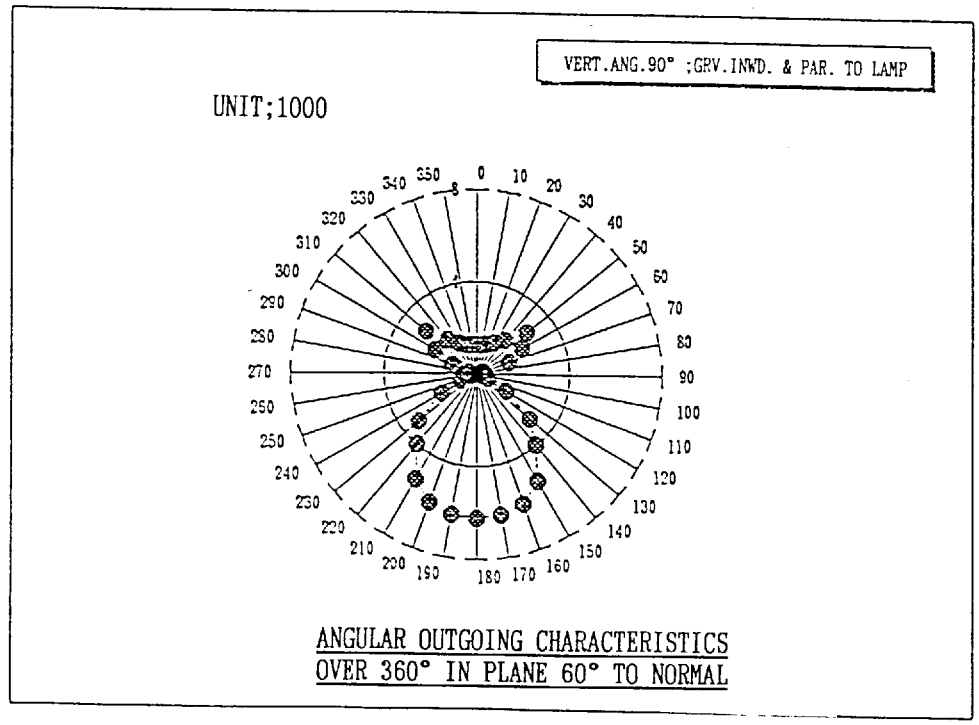
FIG. 27 is a graph showing the same data as FIG. 26 described by taking luminance on the radial direction axis.

[The graphs of FIG. 26 and FIG. 27]

(1) Scanning $\zeta$ in the range from 0° to +360° under the condition of $\beta=60°$.

(2) The graph of FIG. 26 shows luminance by taking luminance on the vertical axis by the 1000 nt unit. The graph of FIG. 27 shows the same data by taking luminance on the radial direction axis by the 1000 nt unit.

(3) Description: as is seen from the graph, a high peak appears near $\zeta=+180°$, while a low peaks appear near $\zeta+50°$ and $\zeta=+310°$. Moreover, there are bottoms with extremely low luminance levels of approximately 200 nt near $\zeta=+90°$ and $\zeta=+270°$.

From the above various graphs, it is understood that the dual light flux was generated at two directions frontally and obliquely above for both the near side and far side, although unsymmetrically, viewing from the lamp L side in the arrangement of <Embodiment I-(2)> (the prism vertical angle $\psi=90°$, the grooves inward parallel to the lamp).

[II] The constitution in which a sub-prism sheet is further disposed for modifying the preferential propagation direction of the device in type [1] (using only main prism sheet with the vertical angle of 90°; realizing dual light flux generation into a section perpendicular to the direction of the grooves on the main prism sheet). This type comprises two basic types.

First type; generating the dual light flux by the main prism sheet and modifying each preferential propagation direction of the dualized light flux by the sub-prism sheet, subsequently. That is, the arrangement using PS1 as the main prism sheet and PS2 as the sub-prism sheet in FIG. 4 is employed.

Second type; reversely, modifying the preferential propagation direction by the sub-prism sheet and dualizing this light flux, subsequently. That is, the arrangement using PS1 as the sub-prism sheet and PS2 as the main prism sheet in FIG. 4 is employed. Each example will be described hereinafter. In the following diagrams, "the 1st" means the prism sheet which is disposed inside (relatively near the light scattering guide 1) and "the 2nd" means the prism sheet which is disposed outside (relatively far from the light scattering guide 1).

<Embodiment II-(1)>: this is an example of the first type. The sub-prism sheet (the prism vertical angle $\psi=64°$, the grooves inward parallel to the lamp) is disposed outside of the main prism sheet (the prism vertical angle $\psi=90°$, the grooves inward perpendicular to the lamp). The measured results of the invention are shown in the graphs of FIG. 28 to FIG. 33.

Figure 6:
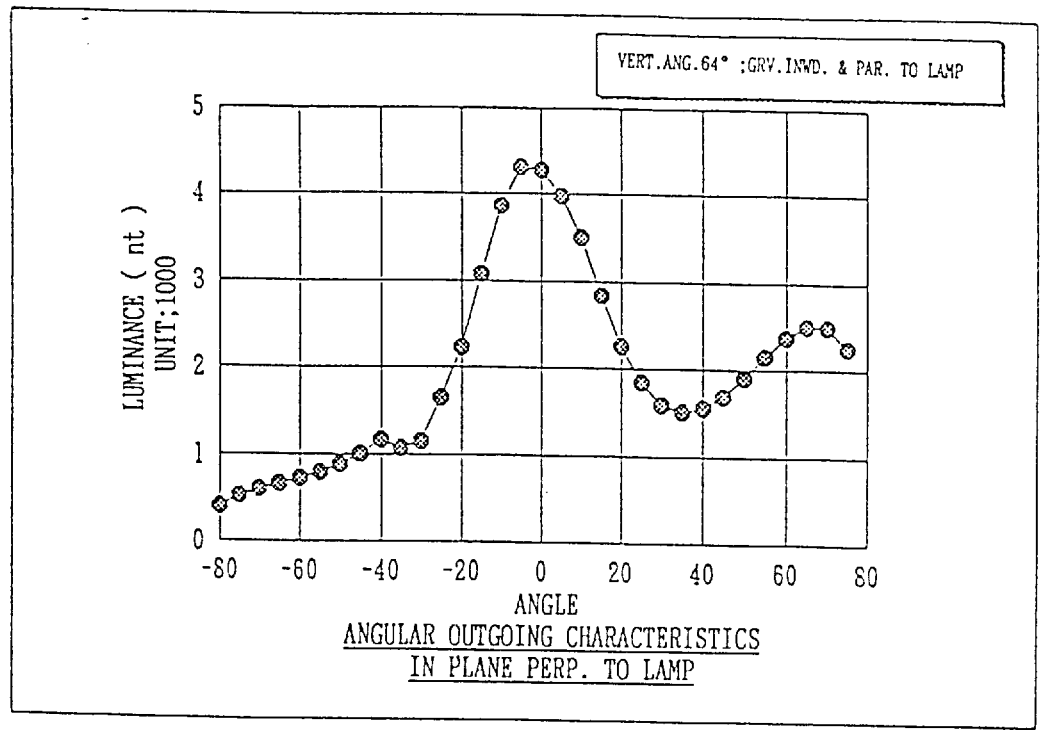
FIG. 6 is a graph showing a luminance change when scanning ø within the range from −80° to +80° under the condition of the prism vertical angle ψ=64°; the arrangement of the grooves inward parallel to the lamp; θ=0°.
Figure 7:
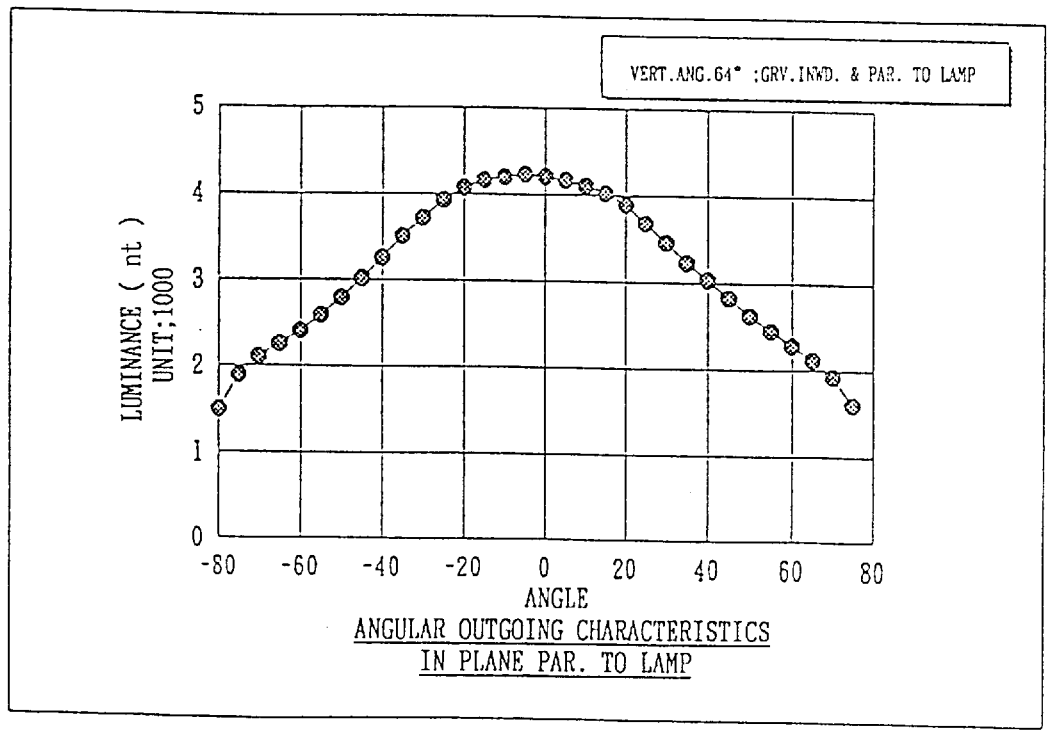
FIG. 7 is a graph showing a luminance change when scanning θ within the range from −80° to +80° under the condition of the prism vertical angle ψ=64°; the arrangement of the grooves inward parallel to the lamp (the same as FIG. 6); ø=0°.
Figure 28:
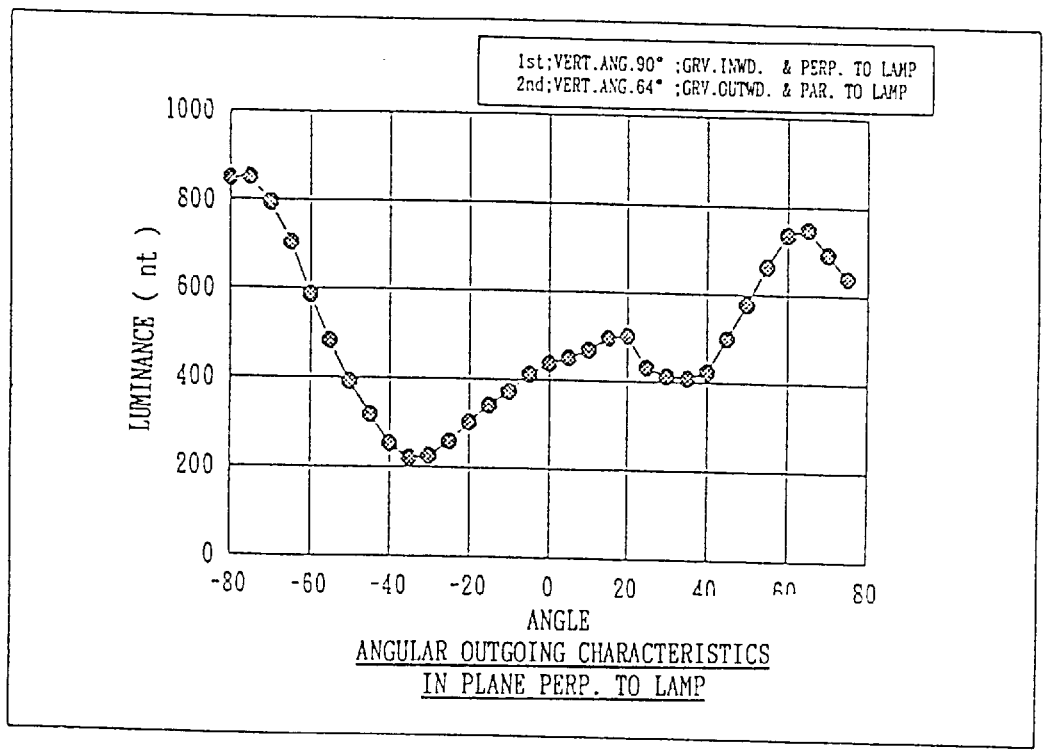
FIG. 28 is a graph showing a luminance change when scanning ø within the range from −80° to +80° under the condition that the sub-prism sheet (the arrangement of the prism vertical angle ψ=64°; the grooves inward parallel to the lamp) is disposed outside of the main prism sheet (the arrangement of the vertical angle ψ=90°; the grooves inward perpendicular to the lamp); θ=0°.
Figure 29:
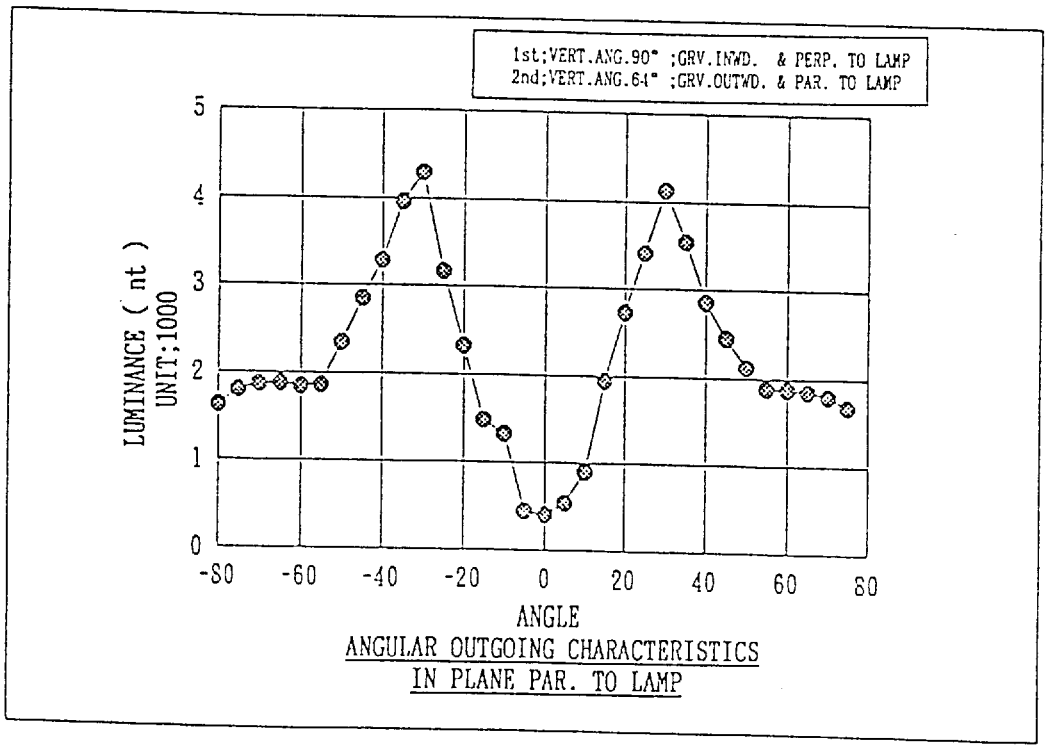
FIG. 29 is a graph showing a luminance change when scanning θ within the range from −80° to +80° under the condition that the sub-prism sheet (the arrangement of the prism vertical angle ψ=64°; the grooves outward parallel to the lamp) is disposed outside of the main prism sheet (the arrangement of the prism vertical angle ψ=90°; the grooves inward perpendicular to a lamp) (the same as FIG. 28); ø=0°.

In these graphs, the graph of FIG. 28 illustrates the results of this example in the same manner as FIG. 6 and the graph of FIG. 29 illustrates the results of this example in the same manner as FIG. 7.

FIG. 30 to FIG. 33 illustrate the results obtained by measuring under the two conditions for angle $\beta$ in the same manner as FIG. 14 and FIG. 15.

[The graphs of FIG. 28]

(1) The sub-prism sheet (the arrangement of the prism vertical angle $\psi=64°$, the grooves inward parallel to the lamp) is disposed outside of the main prism sheet (the prism vertical angle $\psi=90°$, the grooves inward perpendicular to the lamp).

(2) Scanning $\emptyset$ within the range from −80° to +80° under the condition $\theta=0°$.

(3) Illustrating luminance on the vertical axis by the nt unit.

(4) Description: there is a bottom at the direction approximately $\emptyset=-30°$, while the luminance peaks are observed at $\emptyset$=approximately −80° and $\emptyset$=approximately +60°. However, the luminance levels are very low and are only approximately 830 nt at the peak value.

[The graphs of FIG. 29]

(1) The sub-prism sheet (the arrangement of the prism vertical angle $\psi=64°$, the grooves inward parallel to the lamp) is disposed outside of the main prism sheet (the prism vertical angle $\psi=90°$, the grooves inward perpendicular to the lamp); (the same as FIG. 28).

(2) Scanning $\theta$ within the range from −80° to +80° under the condition of $\emptyset=0°$.

(3) Illustrating luminance on the vertical axis by the 1000 nt unit.

(4) Description: as is seen from the graph, there is an extremely deep bottom (approximately 400 nt) at the direction of approximately $\theta=0°$, that is, the frontal direction of the surface light source device, while the high luminance peaks (approximately 4200 nt) appear at the direction of $\theta$=approximately ±30°. All the graphs show the regular symmetrical shape.

From the two graphs in FIG. 28 and FIG. 29 described above, it is apparent that the dual light flux generation is accomplished at the left and right directions viewing from the lamp side in this Embodiment. This will be better understood from the graphs in the following FIG. 30 to FIG. 33.

Figure 30:
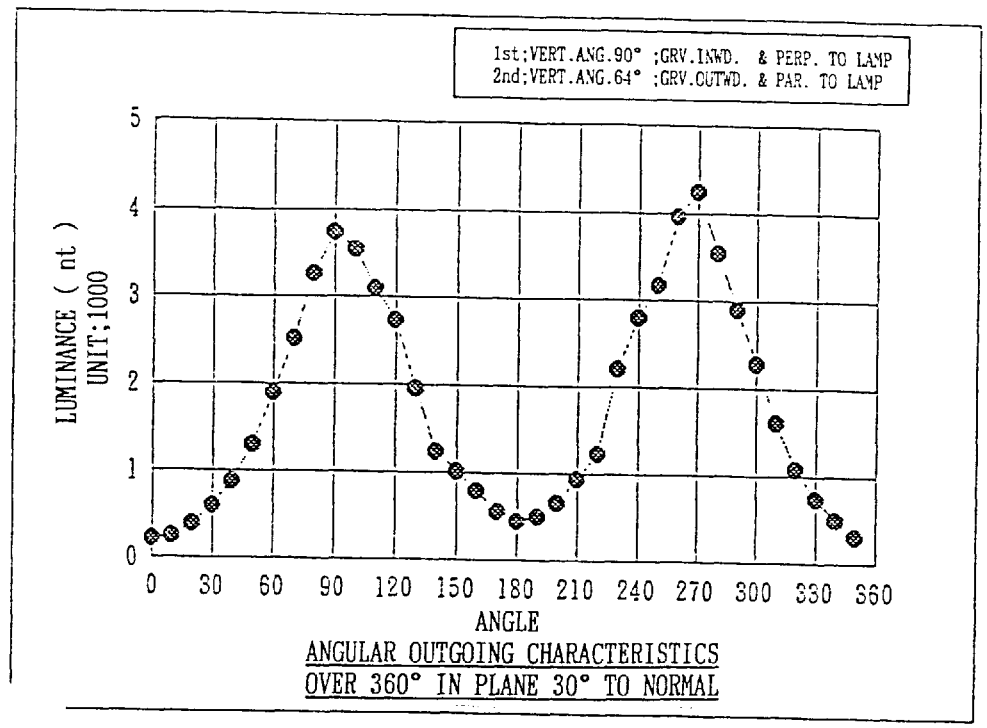
FIG. 30 is a graph showing a luminance change when scanning ζ in the range from 0° to +360° under the condition that the sub-prism sheet (the arrangement of the prism vertical angle ψ=64°; the grooves outward parallel to the lamp) is disposed an outside of the main prism sheet (the arrangement of the prism vertical angle ψ=90°; the grooves inward perpendicular to the lamp) (the same as FIG. 28); β=30°.
Figure 31:
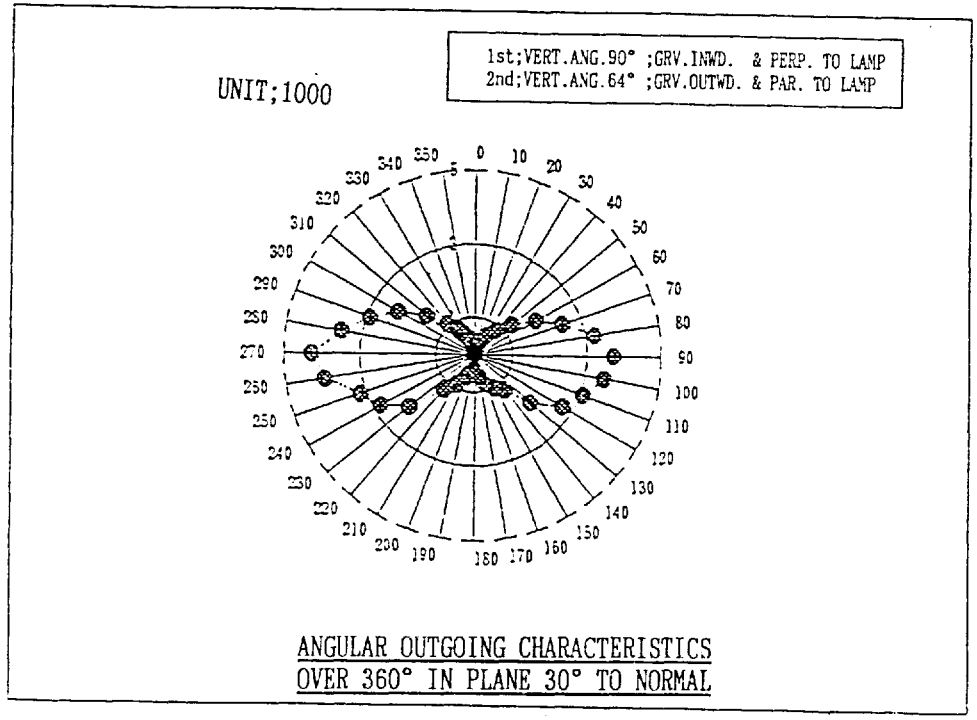
FIG. 31 is a graph showing the same data as FIG. 30 described by taking luminance on the radial direction axis.

[The graphs of FIG. 30 and FIG. 31]

(1) Scanning $\zeta$ in the range from 0° to +360° under the condition of $\beta=30°$.

(2) The graph of FIG. 30 shows luminance by taking luminance on the vertical axis by the 1000 nt unit. The graph of FIG. 31 shows the same data by taking luminance on the radial direction axis by the 1000 nt unit.

(3) Description: as is seen from the both graphs, there are peaks near the directions of $\zeta=+180°\pm 90°$ respectively. Both the peak luminance levels are high (approximately 4200 nt and approximately 3800 nt), and the luminance level of the bottom portion near $\zeta=+180°$ is low (approximately 400 nt).

Moreover, the rises from the bottom portion near $\zeta=+180°$ towards both the peaks are clear and gentle.

Figure 32:
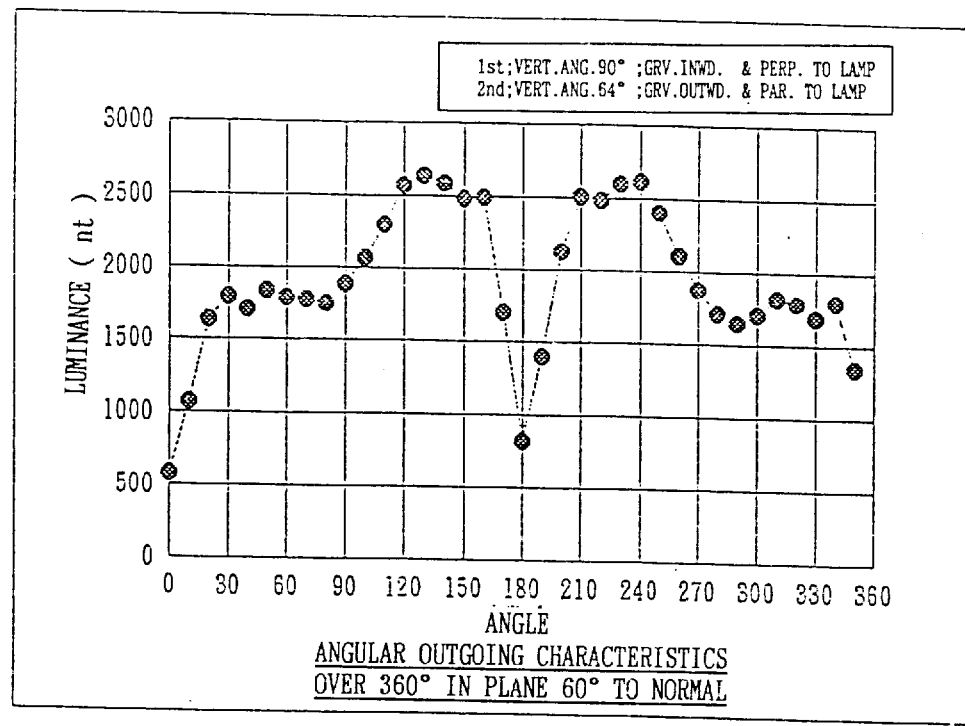
FIG. 32 is a graph showing a luminance change when scanning ζ in the range from 0° to +360° under the condition that the sub-prism sheet (the arrangement of the prism vertical angle ψ=64°; the grooves inward parallel to the lamp) is disposed outside of the main prism sheet (the arrangement of the prism vertical angle ψ=90°; the grooves inward perpendicular to the lamp) (the same as FIG. 28); β=60° by taking luminance on the vertical axis.
Figure 33:
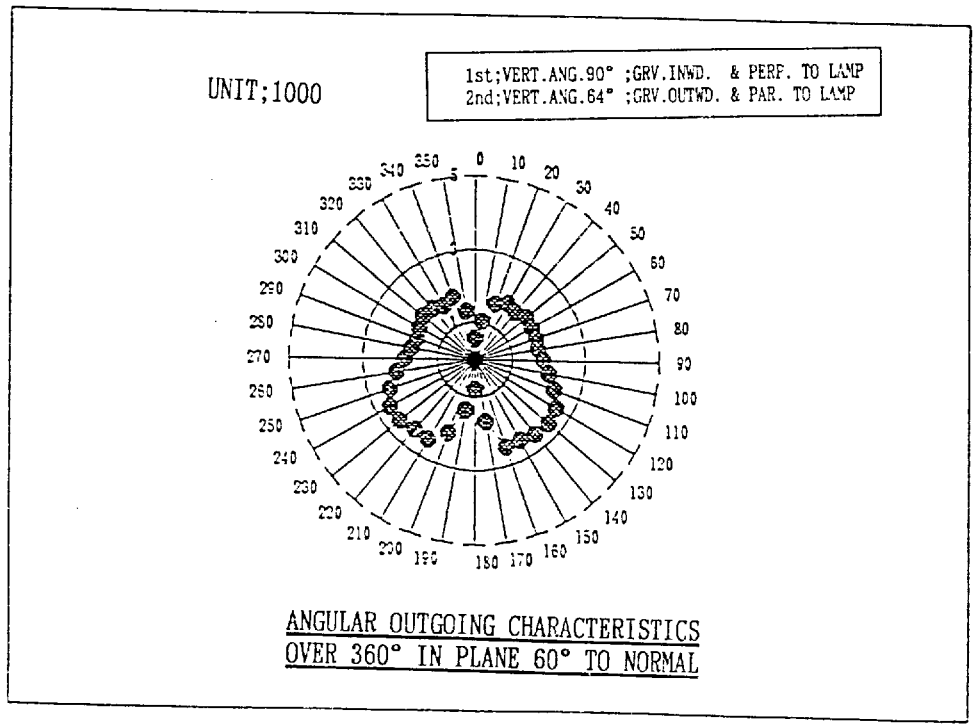
FIG. 33 is a graph showing the same data as FIG. 32 described by taking luminance on the radial direction axis.

[The graphs of FIG. 32 and FIG. 33]

(1) Scanning $\zeta$ in the range from 0° to +360° under the condition of $\beta=60°$.

(2) The graph of FIG. 32 shows luminance by taking luminance on a vertical axis by nt unit. The graph of FIG. 33 shows the same data by taking luminance on the radial axis by the 1000 nt unit.

(3) Description: as is seen from the both graphs, the clear bottom portions (approximately 800 nt and approximately 600 nt) are near the direction of $\zeta=+180°$ and $\zeta=0°$ respectively.

Moreover, the portion with a relatively high luminance level (approximately 2500 nt) appear in a range $\zeta=+180°\pm$ (30° to 60°) and the portion with a certain degree of luminance level (approximately 1500 nt to approximately 2000 nt) at $\zeta=+180°\pm$ (above 60°) is also observed.

The above various graphs explain the following: this Embodiment II-(1) corresponds to the arrangement in which the sub-prism sheet (the arrangement of the prism vertical angle $\psi=64°$, the grooves inward parallel to the lamp) is added to the outside of the arrangement of the Example I-(1) mentioned above. This sub-prism sheet has the effect of raising the preferential propagation direction (the direction of approximately +60° on the surface perpendicular to the lamp) of the parallelized light flux emitted from the light scattering guide 1 toward the perpendicular direction with respect to the light exiting surface 5 (or the surface a in FIG. 5) viewing from the lamp side, as guessed from the graph (the arrangement of the prism vertical angle $\psi=70°$, the grooves outward parallel to the lamp) shown in FIG. 8.

Accordingly, it is guessed that the characteristics obtained in this embodiment correspond to the function by which the preferential propagation directions of the dual light flux obtained in the Embodiment I-(1) are raised up toward the perpendicular direction with respect to the light exiting surface 5 viewing from the lamp side. It is understood that this guess is correct when the graph of this Embodiment II-(1) is compared with the graph (FIG. 16 to FIG. 19) of the Example I-(1).

For example, when the graph of FIG. 31 is compared with the graph of FIG. 17 and the graph of FIG. 33 is compared with the graph of FIG. 19, it is understood that an illuminating light flux in which each preferential propagation direction of the dual light flux obtained in the example I-(1) is raised up to the near side frontally and is dualized toward the left and right directions slightly ahead, viewing from the lamp side, is generated.

<Embodiment II-(2)>; this is an example of the second type. The sub-prism sheet (an arrangement of the prism vertical angle $\psi=64°$, the grooves inward parallel to the lamp) is further disposed inside of the main prism sheet (an arrangement of the prism vertical angle $\psi=90°$, the grooves inward perpendicular to the lamp).

In this embodiment, the sub-prism sheet (an arrangement of the prism vertical angle $\psi=64°$, the grooves inward parallel to the lamp) is added to the inside of the arrangement of the Embodiment I-(1) mentioned above.

Figure 34:
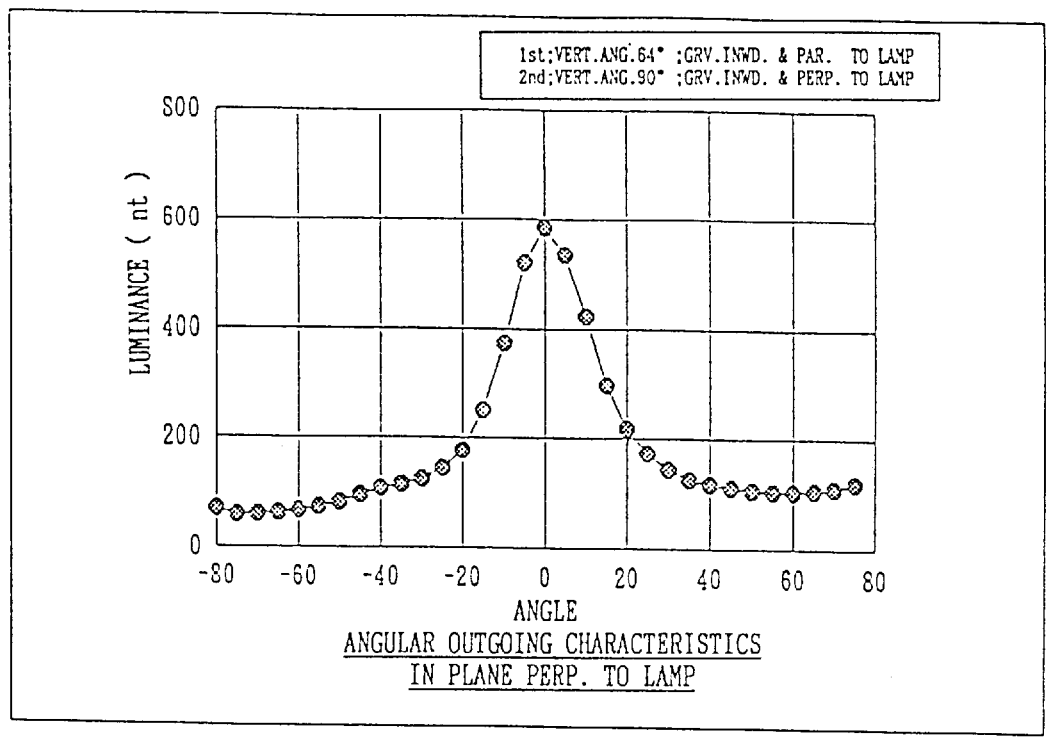
FIG. 34 is a graph showing a luminance change when scanning ø within the range from −80° to +80° under the condition that the sub-prism sheet (the arrangement of the prism vertical angle ψ=64°; the grooves inward parallel to the lamp) is disposed inside of the main prism sheet (the arrangement of the prism vertical angle ψ=90°; the grooves inward perpendicular to the lamp); θ=0°.
Figure 35:
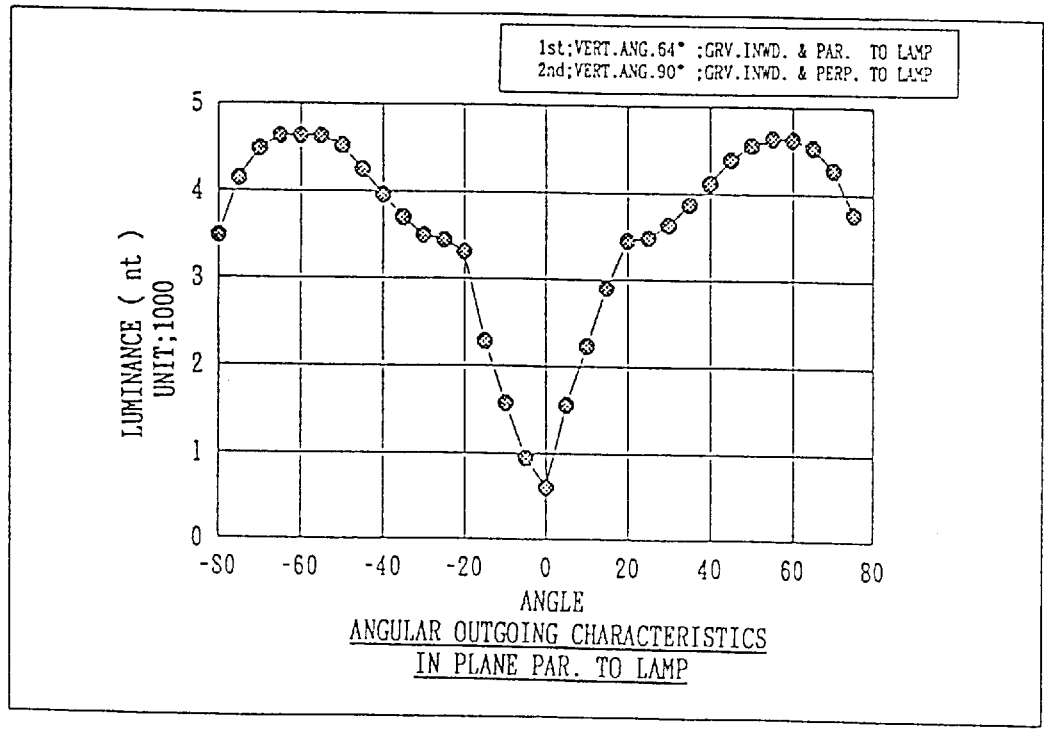
FIG. 35 is a graph showing a luminance change when scanning θ within the range from −80° to +80° under the condition that the sub-prism sheet (the arrangement of the prism vertical angle ψ=64°; the grooves inward parallel to the lamp) is disposed inside the main prism sheet (the arrangement of the prism vertical angle ψ=90°; the grooves inward perpendicular to the lamp); ø=0°.

The results of this Embodiment are shown in the graphs of FIG. 34 to FIG. 39. In these graphs, the graph of FIG. 34 shows the results of this example in the same manner as FIG. 6 and the graph of FIG. 35 shows the results of this example in the same manner as FIG. 7. Moreover FIG. 36 to FIG. 39 illustrate the results under the two conditions for an angle β in the same manner as FIG. 14 and FIG. 15.

[The graph of FIG. 34]

(1) The sub-prism sheet (the arrangement of the prism vertical angle $\psi=64°$, the grooves inward parallel to the lamp) is disposed inside of the main prism sheet (the prism vertical angle $\psi=90°$, the grooves inward perpendicular to the lamp).

(2) Scanning ø within the range from −80° to +80° under the condition of θ=0°.

(3) Showing luminance on the vertical axis by the nt unit.

(4) Description: as is seen from the graph, a luminance peak is observed at the direction of approximately ø=0°. However, the luminance level is very low and is only approximately 600 nt in the peak value.

[The graphs of FIG. 35]

(1) The sub-prism sheet (the arrangement of the prism vertical angle $\psi=64°$, the grooves inward parallel to the lamp) is disposed inside of the main prism sheet (the prism vertical angle $\psi=90°$, the grooves inward perpendicular to the lamp); (the same as FIG. 33).

(2) Scanning θ within the range from −80° to +80° under the condition of ø=0°.

(3) The vertical axis shows luminance by the 1000 nt unit.

(4) Description: as is seen from the graph, there is an extremely deep bottom (approximately 500 nt) at the direction of approximately θ=0°, that is, the frontal direction of the surface light source device, while the high luminance peaks (approximately 4700 nt) are observed at the direction of θ=approximately ±60°. All the graphs show regular symmetrical shapes.

From the graphs of FIG. 34 and FIG. 35, it is apparent that the dual light flux generation is accomplished at the left and right directions when viewed from the lamp side in this embodiment. The following graphs of FIG. 36 to FIG. 39 also prove this.

Figure 36:
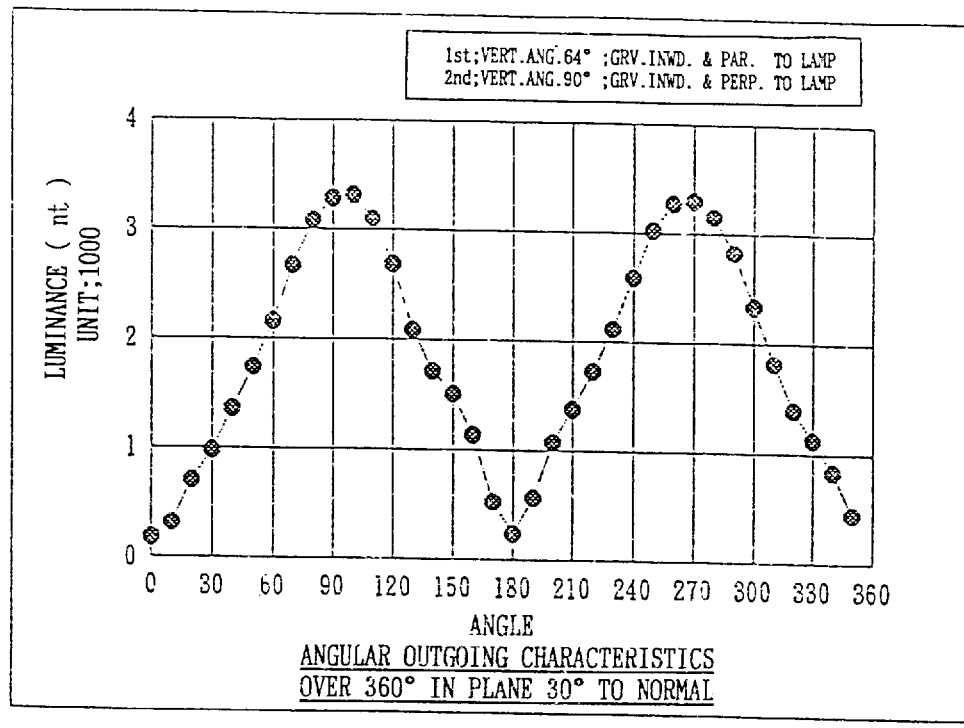
FIG. 36 is a graph showing a luminance change when scanning ζ in the range from 0° to +360° under the condition that the sub-prism sheet (the arrangement of the prism vertical angle ψ=64°; the grooves inward parallel to the lamp) is disposed inside of the main prism sheet (the arrangement of the prism vertical angle ζ=90°; the grooves inward perpendicular to the lamp); β=30° by taking luminance on the vertical axis.
Figure 37:
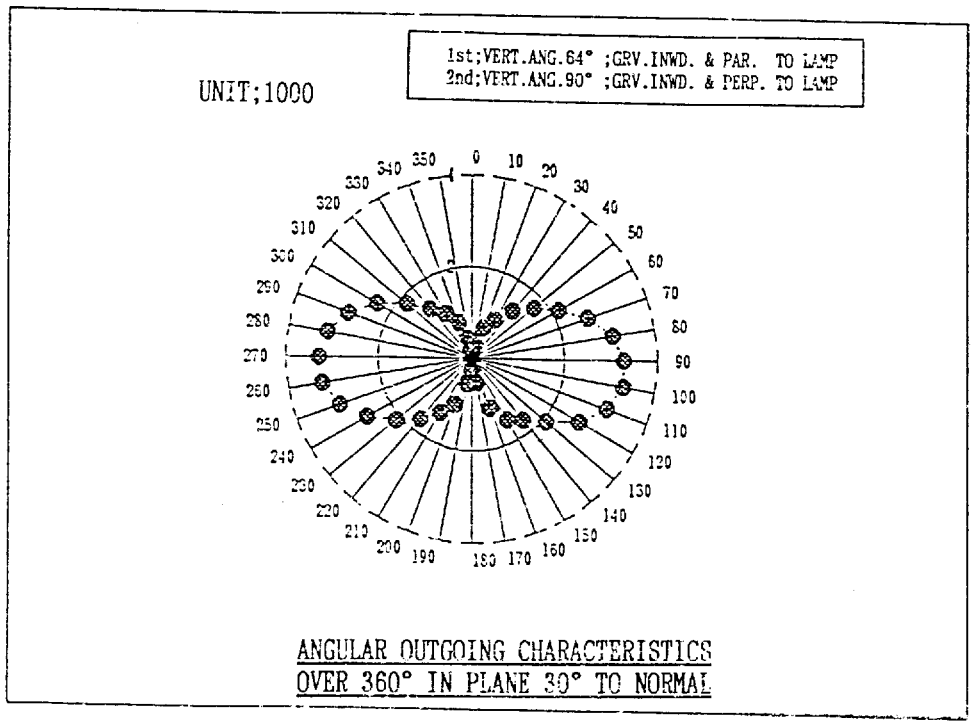
FIG. 37 is a graph showing the same data as FIG. 36 described by taking luminance on the radial direction axis.

[The graphs of FIG. 36 and FIG. 37]

(1) Scanning $\zeta$ in the range from 0° to +360° under the condition of β=30°.

(2) The graph of FIG. 36 shows luminance by taking luminance on the vertical axis by the 1000 nt unit. FIG. 37 is a graph showing the same data by taking luminance on the radial direction axis by the 1000 nt unit.

(3) Description: as is seen from the both graphs, there are striking peaks near the direction of $\zeta=+180°\pm90°$, respectively. The peak levels are considerably high (approximately 3300 nt) and the luminance level of the bottom portion which exists near $\zeta=+180°$ is very low (approximately 200 nt). Moreover, luminance rises up from this bottom portion towards both peaks clear and straight.

Figure 38:
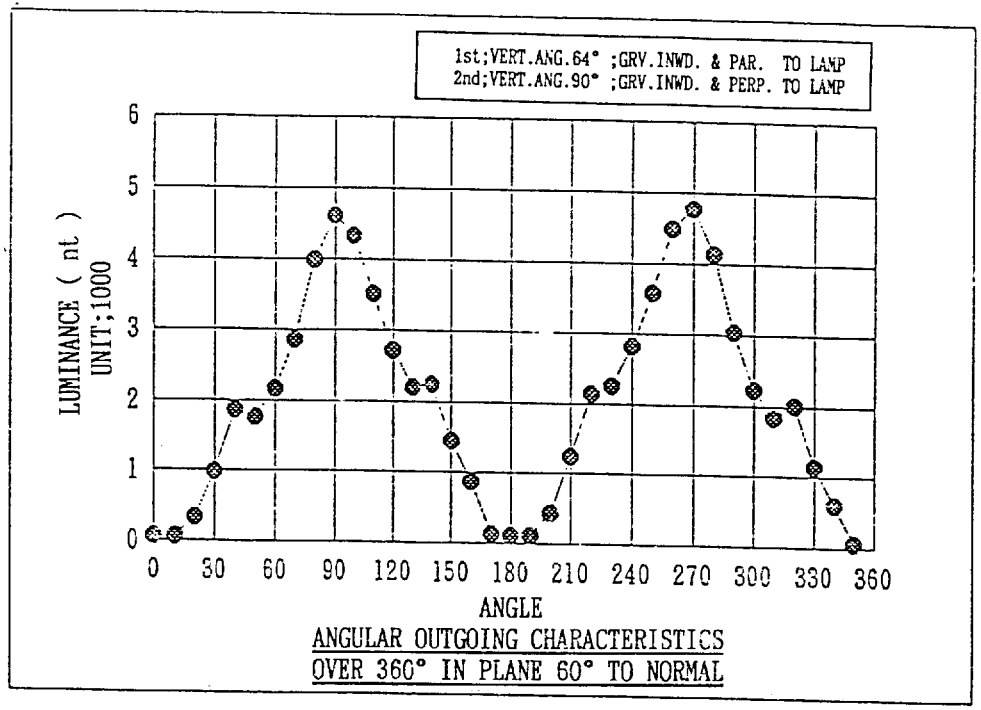
FIG. 38 is a graph showing a luminance change when scanning ζ in the range from 0° to +360° under the condition that the sub-prism sheet (the arrangement of the prism vertical angle ψ=64°; the grooves inward parallel to the lamp) is disposed inside of the main prism sheet (the arrangement of the prism vertical angle ψ=90°; the grooves inward perpendicular to the lamp); β=60° by taking luminance on the vertical axis.
Figure 39:
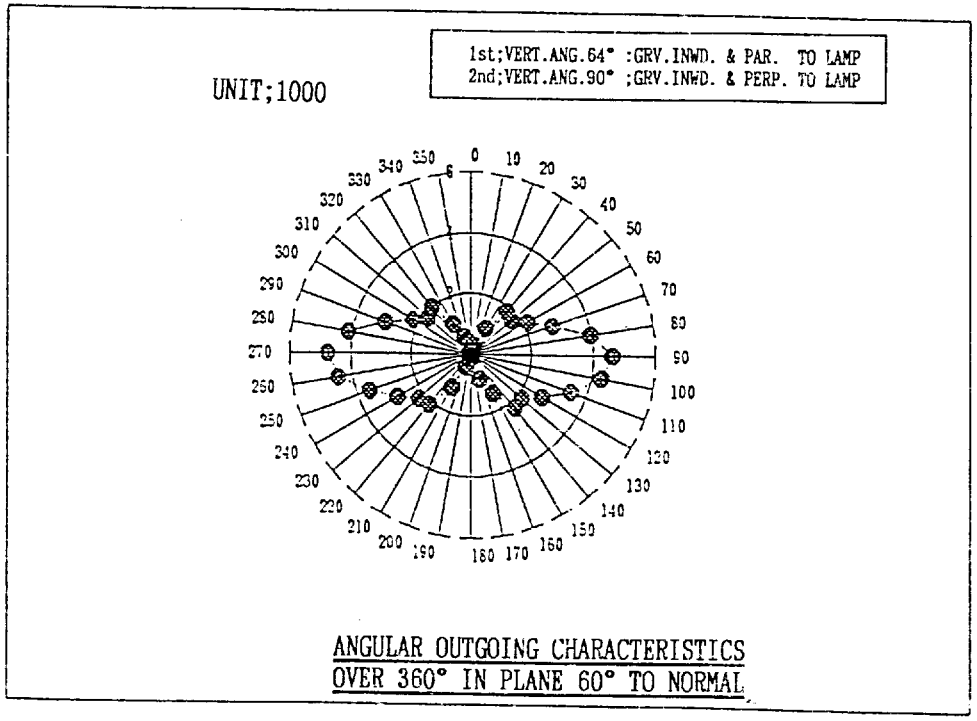
FIG. 39 is a graph showing the same data as FIG. 38 described by taking luminance on the radial direction axis.

[The graphs of FIG. 38 and FIG. 39]

(1) Scanning $\zeta$ in the range from 0° to +360° under the condition of β=60°.

(2) The graph of FIG. 38 shows luminance by taking luminance on the vertical axis by the 1000 nt unit. The graph of FIG. 39 shows the same data by taking luminance on the radial direction axis by the 1000 nt unit.

(3) Description: as is seen from both graphs, there are a clear bottom portions with a very low luminance level (approximately 100 nt) near the direction of $\zeta=+180°$ and there are the peaks with a very high luminance level (approximately 4700 nt) in the vicinity of the direction of $\zeta=+180°\pm90°$.

The above various graphs explain the following: this Embodiment II-(2) corresponds to the arrangement in which the sub-prism sheet (the arrangement of the prism vertical angle $\psi=64°$, the grooves inward parallel to the lamp) is added to inside of the arrangement of the Example I-(1) mentioned above. This sub-prism sheet has an action raising up the preferential propagation direction (the direction of approximately +60° on the surface perpendicular to the lamp) of the light flux emitted from the light scattering guide 1 toward the perpendicular direction with respect to the light exiting surface 5 (or the surface a) when viewing from the lamp side, as compared with the graph of FIG. 6 (the arrangement of the prism vertical angle ψ=64°, the grooves outward parallel to the lamp).

Accordingly, it is guessed that the characteristics obtained in this embodiment correspond to the function by which the preferential directions of the dualized light flux obtained by the previously described Embodiment I-(1) is raised up toward the perpendicular direction with respect to the light exiting surface 5 (plane a), viewing from the lamp side.

It is understood that this guess is correct when the graphs (FIG. 34 to FIG. 39) of this Embodiment II-(2) are compared with the graphs (FIG. 16 to FIG. 19) of the Example I-(1).

For example, when the graph of FIG. 37 is compared with the graph of FIG. 17 and the graph of FIG. 39 is compared with the graph of FIG. 19, an illuminating light flux in which the preferential directions of the dualzed light flux obtained in Embodiment I-(1) is raised up toward the near side and dualized toward almost the right and left, viewing from the lamp side.

<Embodiment II-(3)>: this is another example of the second type. The sub-prism sheet (an arrangement of the prism vertical angle ψ=70°, the grooves inward parallel to the lamp) is further combined with the main prism sheet (an arrangement of the prism vertical angle ψ=90°, the grooves inward perpendicular to the lamp).

In this embodiment, the sub-prism sheet (an arrangement of the prism vertical angle ψ=70°, the grooves outward parallel to the lamp) is added to inside of the arrangement of the Embodiment I-(1) mentioned above.

Figure 40:
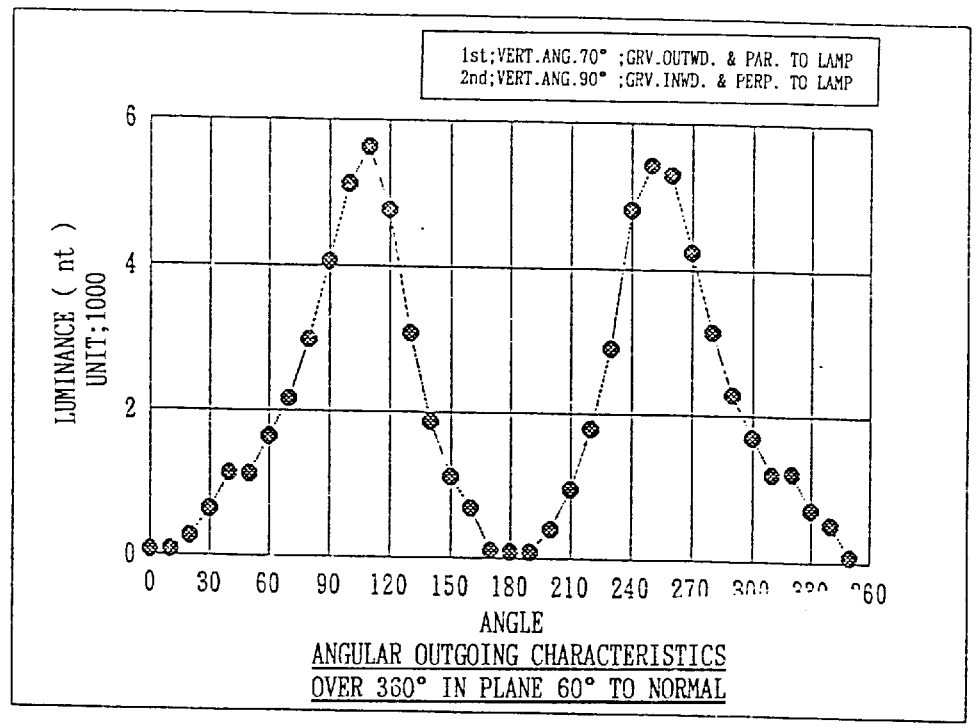
FIG. 40 is a graph showing a luminance change when scanning ζ in the range from 0° to +360° under the condition that the sub-prism sheet (the arrangement of the prism vertical angle ψ=70°; the grooves inward parallel to the lamp) is disposed inside the main prism sheet (the arrangement of the prism vertical angle ψ=90°; the grooves inward perpendicular to the lamp); β=60° by taking luminance on the vertical axis.
Figure 41:
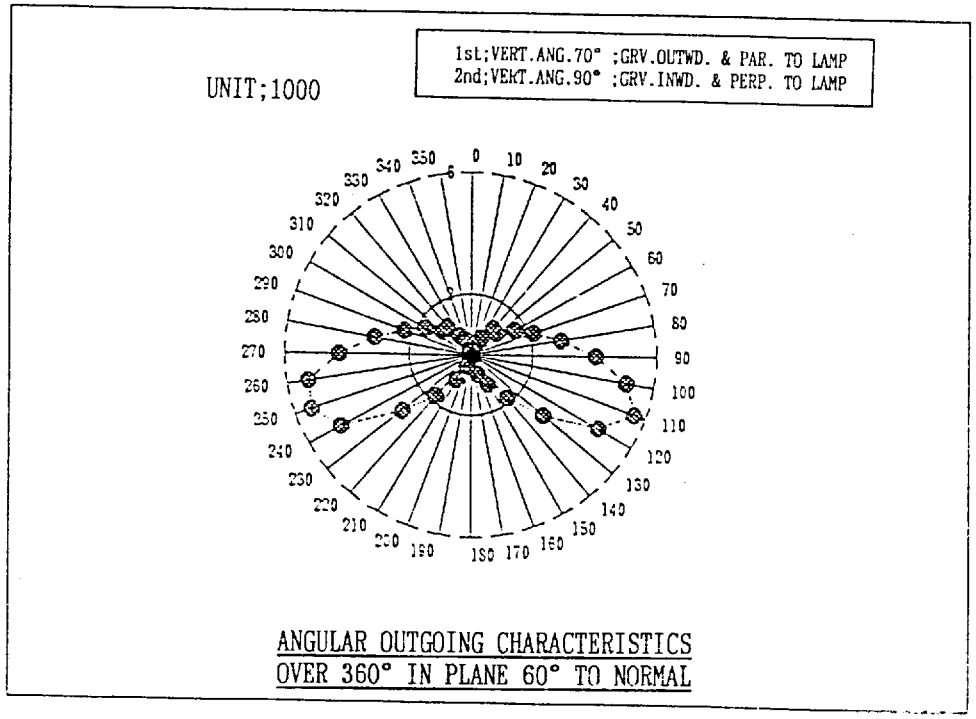
FIG. 41 is a graph showing the same data as FIG. 40 described by taking luminance on the radial direction axis.

The results of this embodiment are shown in the graphs of FIG. 40 and FIG. 41. These graphs illustrate the results for this example in the same manner as FIG. 14 and FIG. 15 under the condition holding the angle β constant.

[The graphs of FIG. 40 and FIG. 41]

(1) Scanning ζ in the range from 0° to +360° under the condition of β=60°.

(2) The graph of FIG. 40 shows luminance by taking luminance on the vertical axis by the 1000 nt unit. The graph of FIG. 41 shows the same data by taking luminance on the radial direction axis by the 1000 nt unit.

(3) Description: as will be read readily from the both graphs, there are remarkable peaks near the direction ζ=+180°±70°respectively. The peak levels are extremely high (approximately 5700 nt) and the luminance level of the bottom portion which exists near ζ=+180° is very low (approximately 200 nt). Moreover, the rise from this bottom portion towards the both peaks is clear and smooth.

Figure 8:
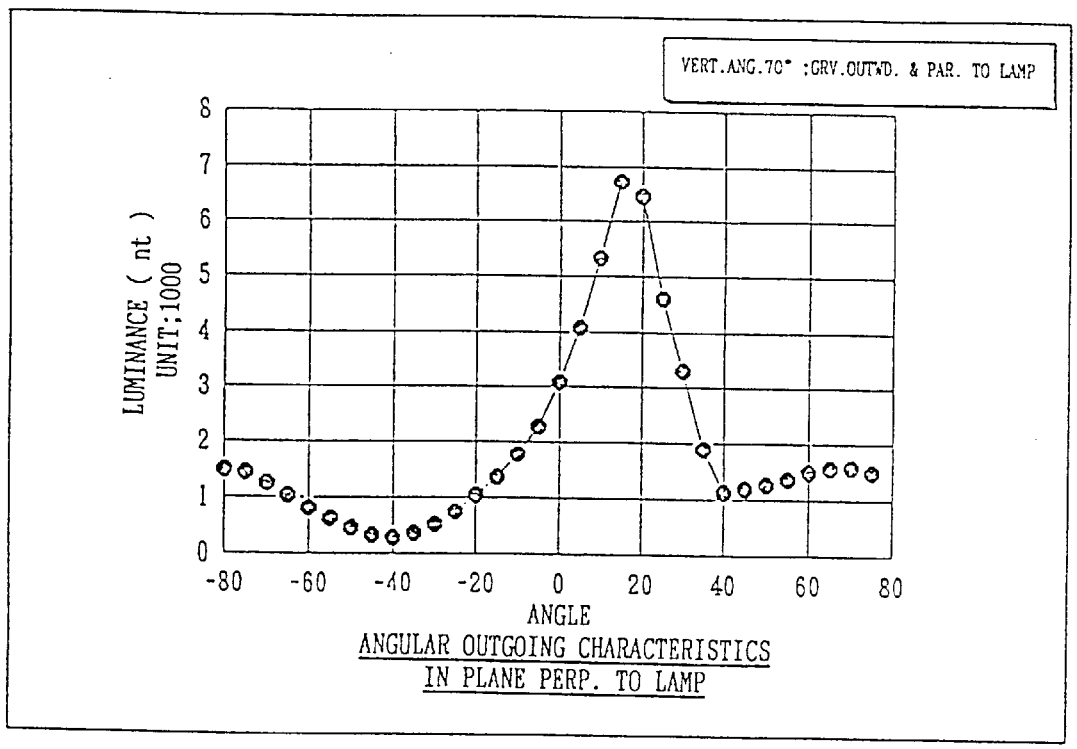
FIG. 8 is a graph showing a luminance change when scanning ø within the range from −80° to +80° under the condition of the prism vertical angle ψ=70°; the arrangement of the grooves outward parallel to the lamp; θ=0°.
Figure 9:
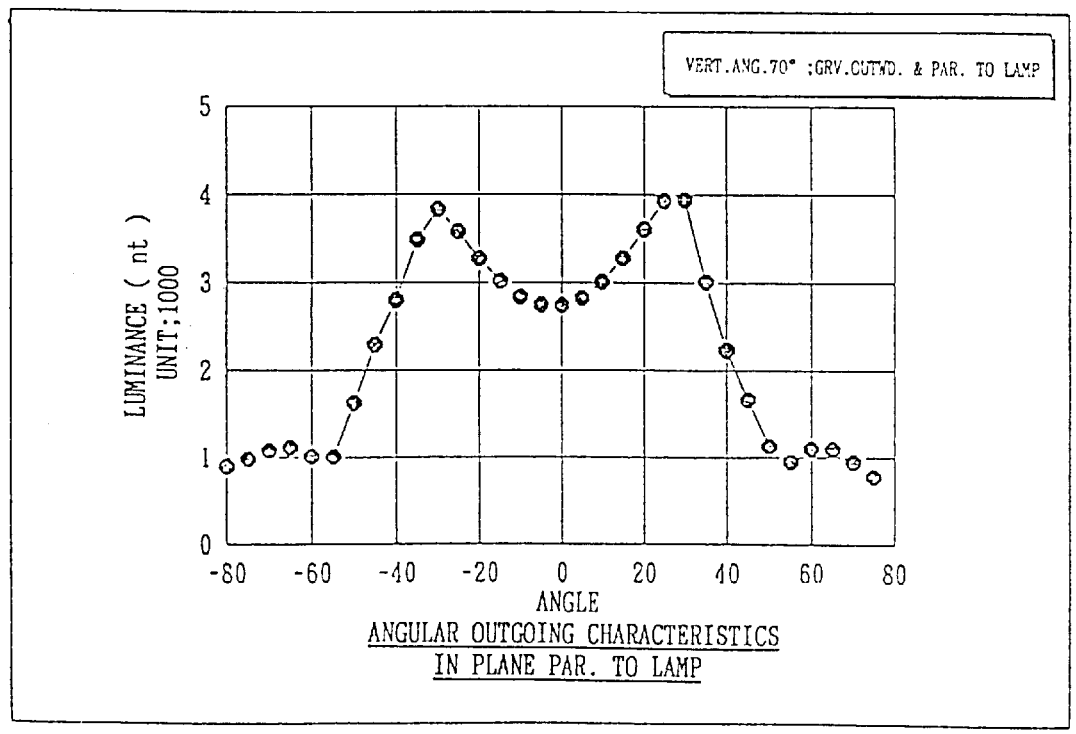
FIG. 9 is a graph showing a luminance change when scanning α within the range from −80° to +80° under the condition of the prism vertical angle ψ=70°; the arrangement of the grooves outward parallel to the lamp (the same as FIG. 8); ø=0°.
Figure 10:
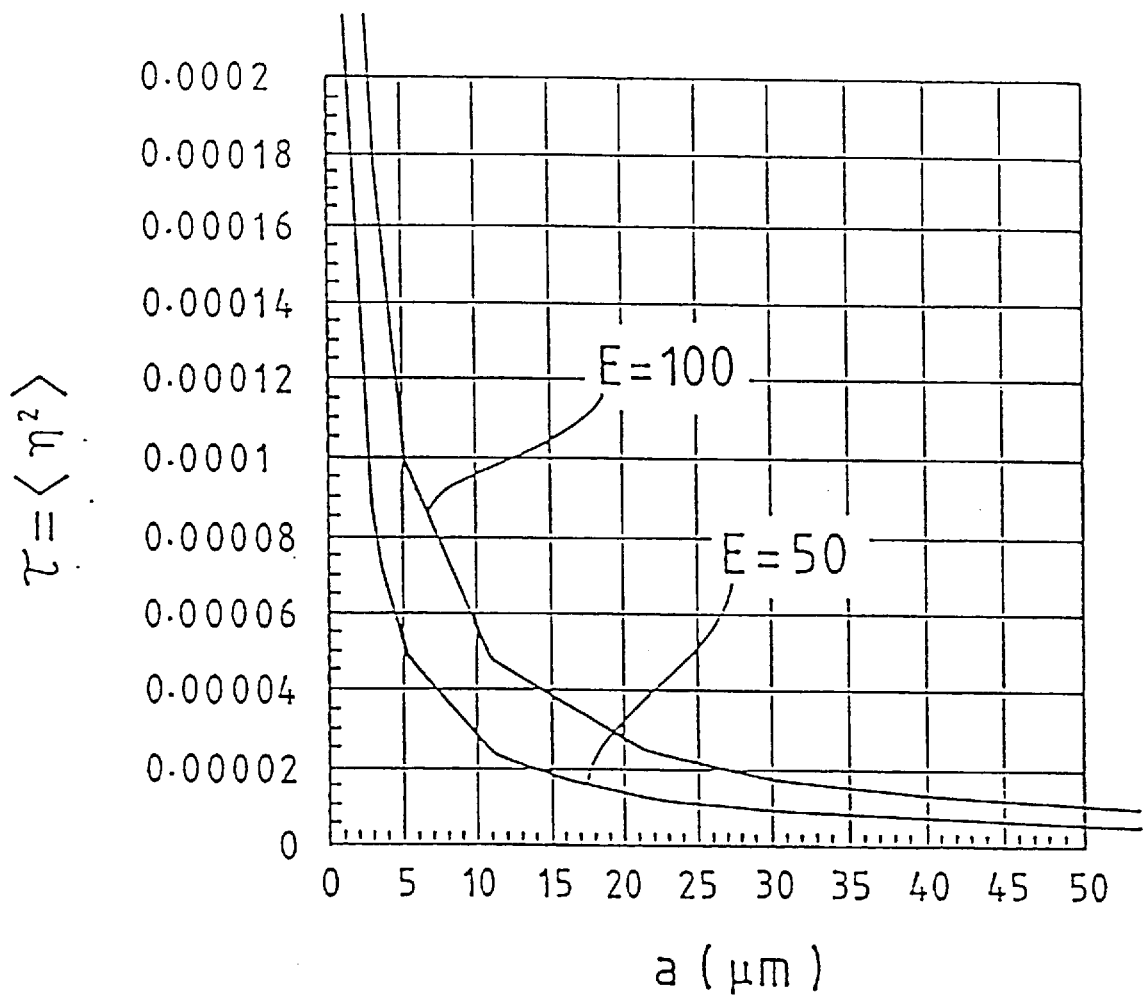
FIG. 10 is a graph describing a curve representing the condition under which an effective scattering irradiation parameter E is constant E=50[cm$^{-1}$] and E=100[cm$^{-1}$], the horizontal axis representing correlation distance and the vertical axis representing square mean value τ of dielectric constant fluctuation.
Figure 11:
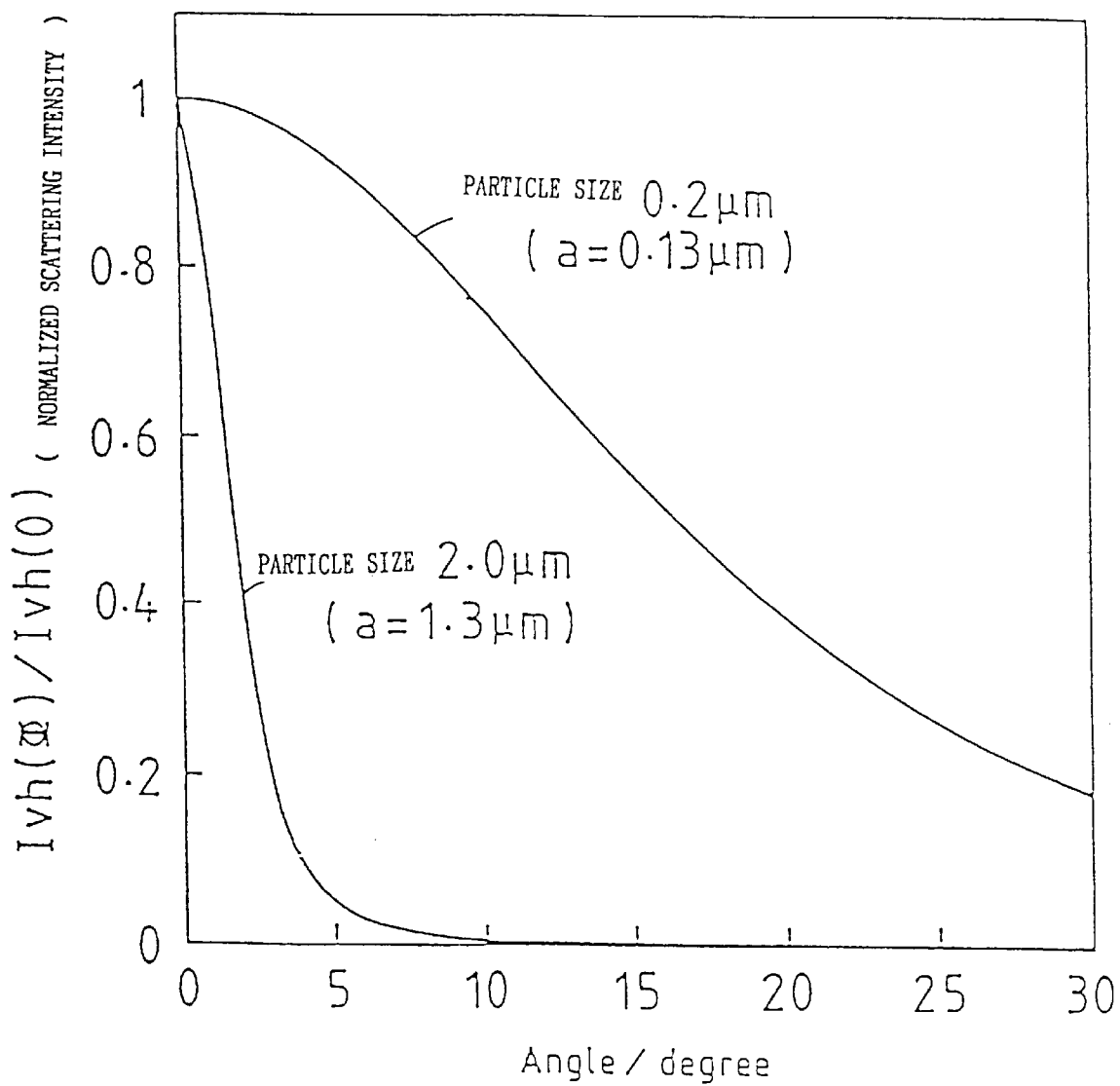

This explains the following: this Embodiment II-(3) is the arrangement in which the condition of the sub-prism sheet disposed inside is changed from "the arrangement of the prism vertical angle ψ=64°, the grooves inward parallel to the lamp" to "the arrangement of the prism vertical angle ψ=70°, the grooves outward parallel to the lamp" in the arrangement of the example II-(2) mentioned above. This sub-prism sheet has an effect of raising up the preferential propagation direction (the direction of approximately +60° on the surface perpendicular to the lamp) of the parallelized light flux emitted from the light scattering guide 1 toward the perpendicular direction with respect to the light exiting surface 5 (or the surface a in FIG. 5) when viewing from the lamp side, as shown in the graph of FIG. 8.

However, as will be understood when compared with the graph of FIG. 6, the action raising up the preferential propagation direction is weaker compared with the action of the prism sheet employed in example II-(2). This is considered to be caused by the directions of the peaks of ξ which are shown in the graphs of FIG. 40 and FIG. 41 not being at the directions of 180°±90° but at the directions of +180°±70°, which is slightly ahead therefrom, viewing from the lamp side. Thus, even in the case where the main prism sheet is used under the same condition, the direction in which the dual light flux is generated (two preferential propagation directions of the dualized light flux) can be adjusted three-dimensionally by changing the condition (a vertical angle and an arrangement angle or the like) under which the sub-prism sheet is combined therewith.

<Embodiment II-(4)>; another example of the second type. The sub-prism sheet (an arrangement of the prism vertical angle ψ=90°, the grooves inward parallel to the lamp) is further disposed to the inside of the main prism sheet (an arrangement of the prism vertical angle ψ=90°, the grooves facing inward and perpendicular to the lamp).

This embodiment is the arrangement in which the sub-prism sheet (the arrangement of the prism vertical angle ψ=90°, the grooves outward parallel to the lamp) is added to inside of the arrangement of the Example I-(1) mentioned above. Moreover, at the same time, this embodiment corresponds to the arrangement in which the condition of the vertical angle of the sub-prism sheet to be disposed inside is changed from "ψ=70°" to "ψ=90°" in the arrangement of the Example II-(3) mentioned above.

Figure 42:
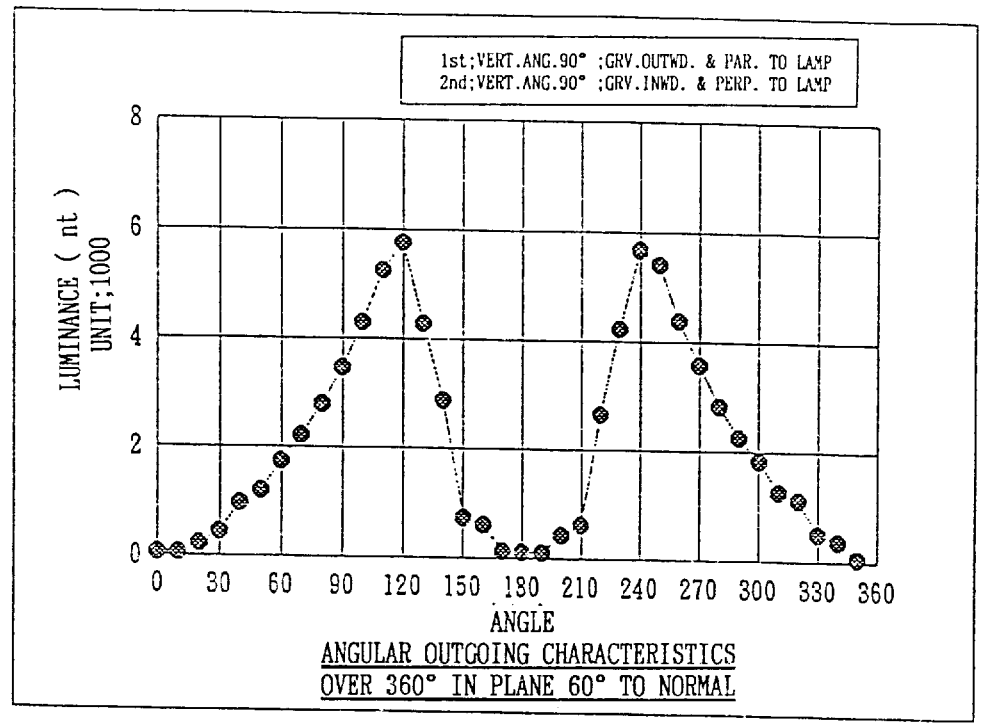
FIG. 42 is a graph showing a luminance change when scanning ζ in the range from 0° to +360° under the condition that the sub-prism sheet (the arrangement of the vertical angle ψ=90°; the grooves outward parallel to the lamp) is disposed inside of the main prism sheet (the arrangement of the prism vertical angle ψ=90°; the grooves inward perpendicular to the lamp); β=60° by taking luminance on the vertical axis.
Figure 43:
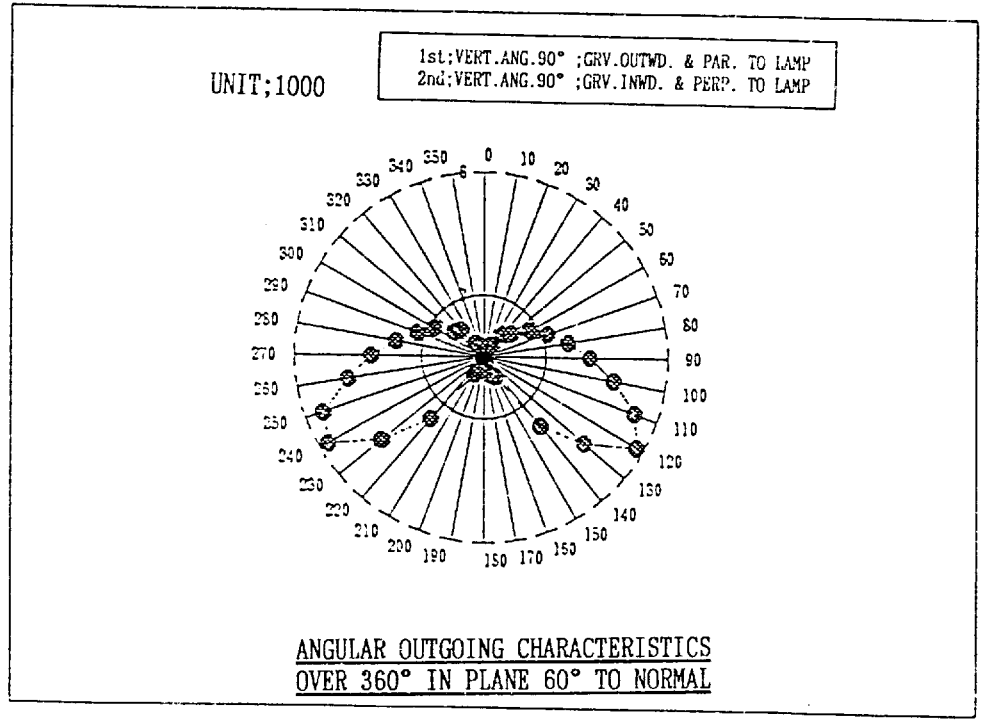
FIG. 43 is a graph showing the same data as FIG. 42 described by taking luminance on the radial direction axis.

The results of this embodiment are shown in the graphs of FIG. 42 to FIG. 43. These graphs illustrate the results of this example in the same manner as FIG. 14 and FIG. 15 under the condition holding the angle β constant.

[The graphs of FIG. 42 and FIG. 43]

(1) Scanning ζ in the range from 0° to +360° under the condition β=60°.

(2) The graph of FIG. 42 shows luminance by taking luminance on the vertical axis by the 1000 nt unit. The graph of FIG. 43 shows the same data by taking luminance on the radial direction axis by the 1000 nt unit.

(3) description; as is seen from the both graphs, there are remarkable peaks near the direction ζ=+180°±60°, respectively. The peak levels are extremely high (approximately 5700 nt) and the luminance level of the bottom portion which exists near ζ=+180° is very low (approximately 200 nt). Moreover, the rise from this bottom portion towards both peaks is clear and straight in a considerably wide range.

These measured results, explain the following: this Embodiment II-(4) is the arrangement in which the condition of the vertical angle of the sub-prism sheet to be disposed inside is changed from "ø=70°" to "ø=90°" in the arrangement of the Example II-(3) described above. As will be described hereinafter, this sub-prism sheet has an effect of raising up the preferential propagation direction (the direction of approximately +60° in the plane perpendicular to the lamp) of the parallelized light flux emitted from the light scattering guide 1 toward the perpendicular direction with respect to the light exiting surface 5 (or the surface a in FIG. 5) when viewing from the lamp side, as shown in the graph of FIG. 8. However, when compared with the graph of FIG. 6, the action raising up the preferential propagation direction is weaker compared with the action of the prism sheet employed in the Example II-(3). It is understood from that the directions of the peaks of ζ which are shown in the graphs of FIG. 42 and FIG. 43 exist at the directions of +180°±60° are deviated forward from the directions of +180°±70° (refer to the graphs of FIG. 40 and FIG. 41) in the Embodiment II-(3).

From this example, it is also understood that the directions of the dual light flux generation by the main prism can be adjusted three-dimensionally by changing the condition (a vertical angle and an arrangement angle or others) of the sub-prism sheet to be combined therewith.

Type [III]; the prism sheet obtained by unifying the main prism sheet and the sub-prism sheet (a main-and-sub-prism sheet) is used. This is a modified arrangement of type [II] described above, more particularly, a modification of the first type of the two types of [II] described above. That is, in this type of arrangement, the primary light flux is provided from the prism surface (the prism vertical angle 70° to 100°, preferably 75° to 95°) functioning as a main prism sheet and the dualized light flux is emitted from the prism surface (the prism vertical angle, preferably 60° to 70°) with a function (a function modifying the preferential propagation direction) as a sub-prism sheet.

Figure 44:
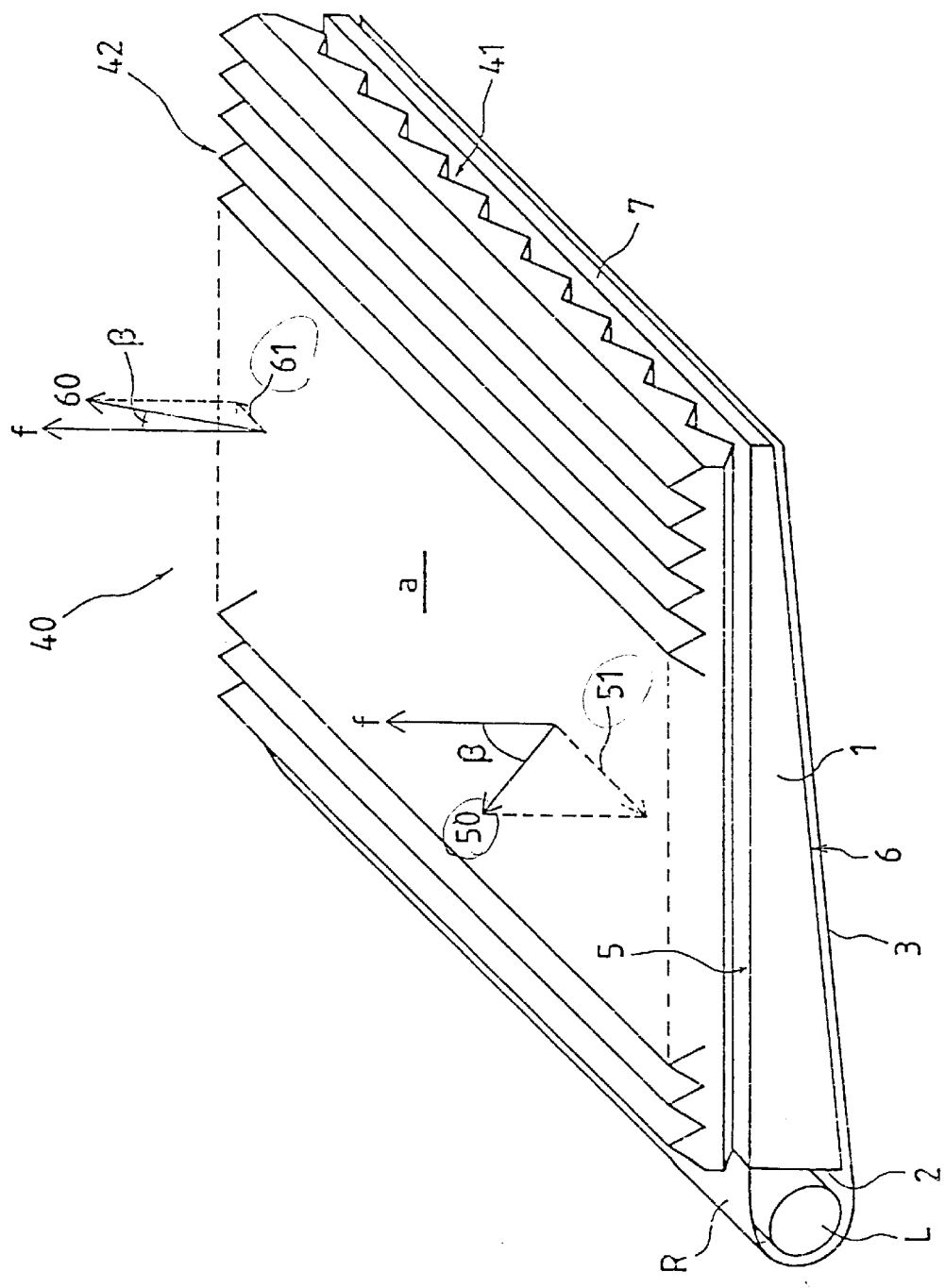
FIG. 44 illustrates an arrangement in which a main-sub prism sheet 40 is employed instead of the prism sheet PS1 and PS2 used in the arrangement shown in FIG. 4, the prism sheet 40 having V-shape groove surfaces 41 and 42 arranged perpendicular to each other on the front face and the back face, respectively.

<Embodiment III-(1)>: an example of the arrangement is shown in FIG. 44. In this example, a main-sub prism sheet with V-shape grooves on both the front face and the back face, respectively formed in a perpendicular relation to each other.

The main-sub prism is oriented so that the V-shape grooves 41 providing the vertical angle of 90° face inward and align perpendicular to the lamp L while the V-shape grooves 42 providing the vertical angle of 64° face outward and align parallel to the lamp L.

The other components are in common with the case of FIG. 4. The light supplied from a light source element L to the light scattering guide 1 with exiting directivity is emitted gradually from the light exiting surface 5 through a process in which the light is led toward the end surface 7 on the thinner side and is subject to scattering and reflecting in the light scattering guide 1.

The preferential propagation direction (a principal axis direction of a parallel light flux) of this emitted light flux exists at the direction raised up by approximately 25° to 30° from the light exiting surface 5, viewing from the light incidence surface as mentioned above. Characteristics of the dual light generation in this embodiment are guessed from the results of the Embodiment II-(1) as follows;

In the Embodiment II-(1), the sub-prism sheet (the prism vertical angle ψ=64°, the grooves inward parallel to the lamp) is disposed outside of the main prism sheet (the prism vertical angle ψ=90°, the grooves inward perpendicular to the lamp).

In the arrangement of the Embodiment II-(1), if the flat surfaces of the main prism sheet and the sub-prism sheet are unified, the present embodiment is obtained. Methods of unifying the two sheets include bonding or welding them totally or partially to each other, integrally molding them as a single main-sub prism sheet 40 and so forth. Furthermore, unification may be realized by an appropriate engaging mechanism (for example, a set of convex threads and concave threads formed at opposed positions) at the end portion of a main prism sheet and a sub-prism sheet.

It is hardly thought that the characteristics of dual light flux generation function and modifying function of the preferential propagation direction are largely changed depending on the above methods. Accordingly, it is apparent that the same results as the graphs of FIG. 28 to FIG. 33 are obtained when the measurement is made under the same condition as the graphs of FIG. 28 to FIG. 33. That is, the directions of the dual light fluxes obtained in this embodiment, as indicated by arrows 50 and 60, the angle β (angle between each arrow and a normal line f with respect to the surface a) becomes approximately 60° respectively, and their projections 51 and 52 onto the surface a become almost parallel to the direction of the lamp L respectively.

It is apparent from the above description that the direction of the dual light flux generation can be adjusted by varying the vertical angle of the prism formed with the V-shape grooves 42 outward. This embodiment is useful for reducing the number of parts of a surface light source device or a liquid crystal display employing it.

Although the real data of types [I] to [III] are described under the condition employing ψ=90° as the prism vertical angle for dual light flux generation, such dual light flux generation is provided not only under this condition.

Some of the results will be described in order to prove this hereinafter. The measurement conditions and explanations of the measured results will be given in the manner similar to previously described examples. Reference numbers used for the previous examples are given to similar features hereinafter, too. For the sake of graphic illustration suited for three dimensional expressions of dual light flux generation, measurements of 360° scanning type are carried out.

[I] Single use of the main prism sheet grooves inward; the dual light flux generation in the section perpendicular to the direction of grooves of the main prism sheet.

<Reference Example 2>; the prism vertical angle ψ=64°, the grooves inward parallel to the lamp; the measured results are shown in the graphs of FIG. 45 to FIG. 48.

Figure 45:
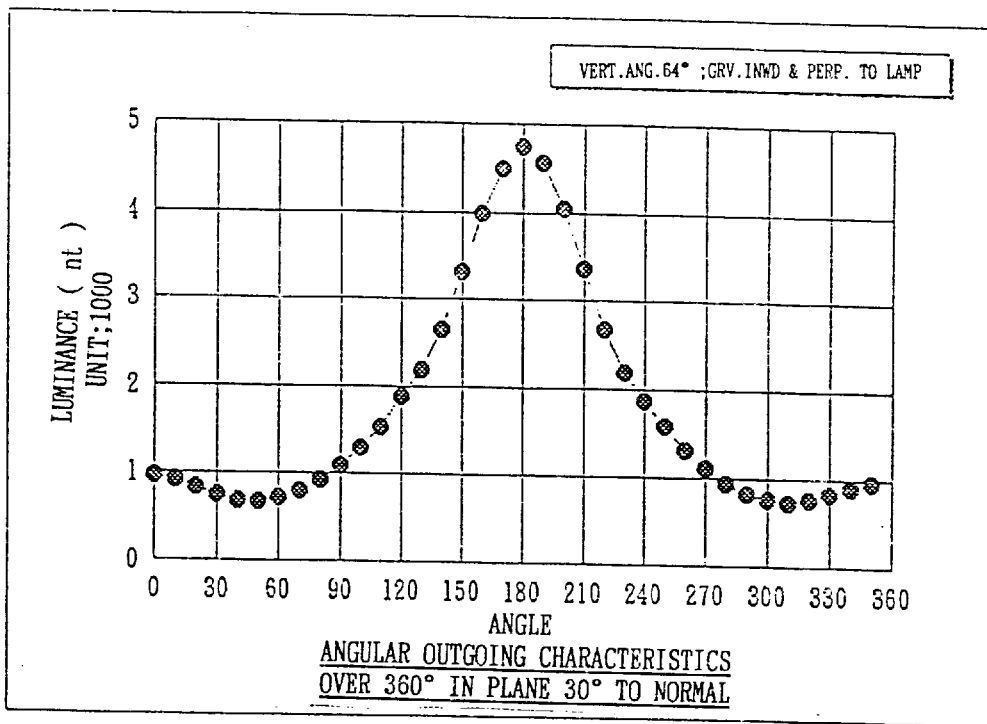
FIG. 45 is a graph showing a luminance change when scanning ζ in the range from 0° to +360° under the condition of the prism vertical angle ψ=64°; the arrangement of the grooves inward parallel to the lamp; β=30° by taking luminance on the vertical axis.
Figure 46:
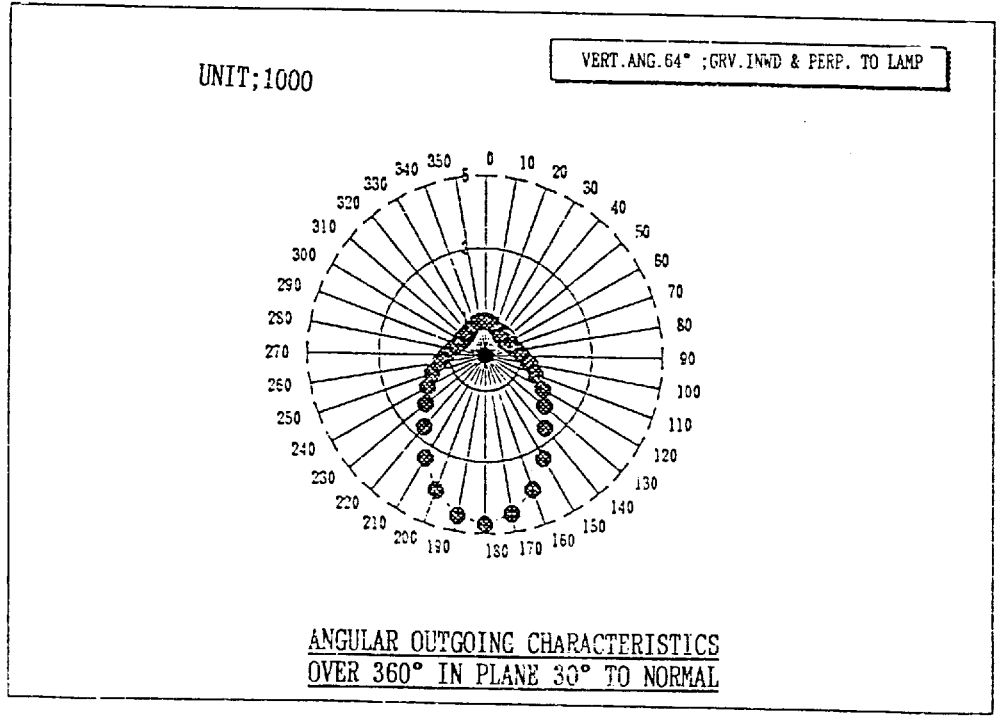
FIG. 46 is a graph showing the same data as FIG. 45 described by taking luminance on the radial direction axis.

[The graphs of FIG. 45 and FIG. 46]

(1) Scanning ζ in the range from 0° to +360° under the condition of β=30°.

(2) The graph of FIG. 45 illustrates luminance by taking luminance on the vertical axis by the 1000 nt unit. The graph of FIG. 46 shows the same data by taking luminance on the radial direction axis by the 1000 nt unit.

(3) Description: as is seen from both graphs, only one luminance peak is observed at the direction of ζ=+180°.

Figure 47:
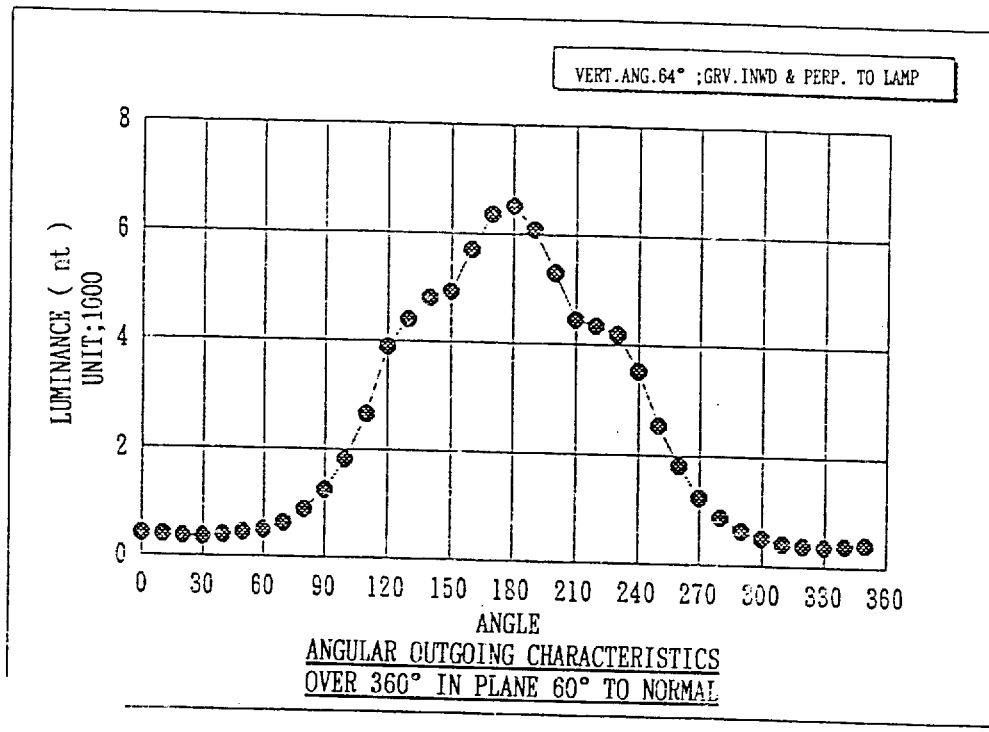
FIG. 47 is a graph showing a luminance change when scanning ζ in the range from 0° to +360° under the condition of the prism vertical angle ψ=64°; the arrangement of the grooves inward parallel to the lamp; β=60° by taking luminance on the vertical axis.
Figure 48:
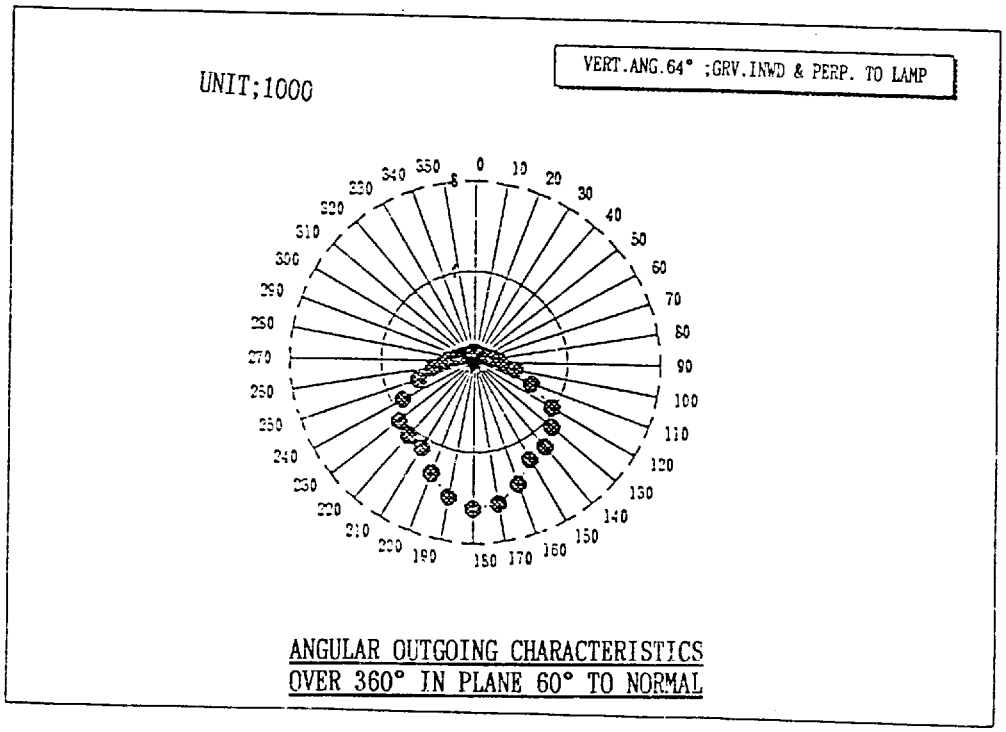
FIG. 48 is a graph showing the same data as FIG. 47 described by taking luminance on the radial direction axis.

[The graphs of FIG. 47 and FIG. 48]

(1) Scanning ζ in the range from 0° to +360° under the condition of β=60°.

(2) The graph of FIG. 47 illustrates luminance by taking luminance on the vertical axis by the 1000 nt unit. The graph of FIG. 48 shows the same data by taking luminance on the radial direction axis by the 1000 nt unit.

(3) Description: as will be read readily from both graphs, only one luminance peak is observed at the direction of ζ=+180°.

From these graphs of FIG. 45 and FIG. 48, it is understood that the dual light flux generation is not accomplished in this reference example (the arrangement of the prism vertical angle ψ=64°, the grooves inward parallel to the lamp).

<Reference Example 3>: the prism vertical angle ψ=68°, the grooves inward perpendicular to the lamp; the measured results are shown in the graphs of FIG. 49 to FIG. 52.

Figure 49:
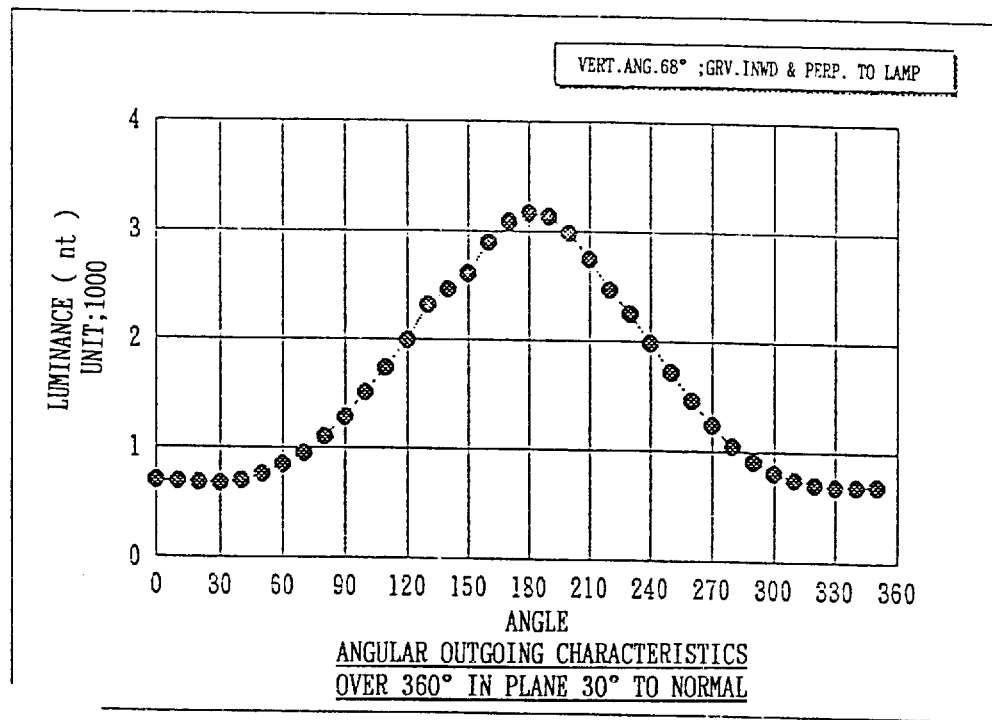
FIG. 49 is a graph showing a luminance change when scanning ζ in the range from 0° to +360° under the condition of the prism vertical angle ψ=68°; the arrangement of the grooves inward parallel to the lamp; β=30° by taking luminance on the vertical axis.
Figure 50:
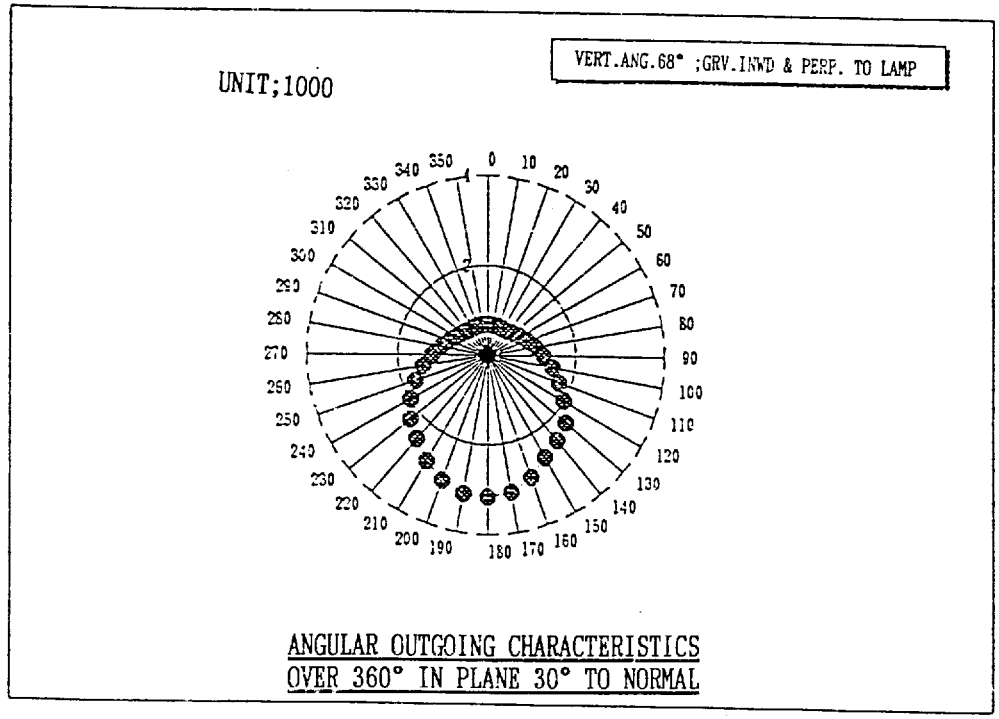
FIG. 50 is a graph showing the same data as FIG. 49 described by taking luminance on the radial direction axis.

[The graphs of FIG. 49 and FIG. 50]

(1) Scanning ζ in the range from 0° to +360° under the condition of β=30°.

(2) The graph of FIG. 49 shows luminance by taking luminance on the vertical axis by the 1000 nt unit. The graph of FIG. 50 shows the same data by taking luminance on the radial direction axis by the 1000 nt unit.

(3) Description: as is seen from both graphs, only one luminance peak is observed the direction of ζ=+180°. However, a symptom of peak split appears in the vicinity of ζ=+135°, although it is extremely small.

Figure 51:
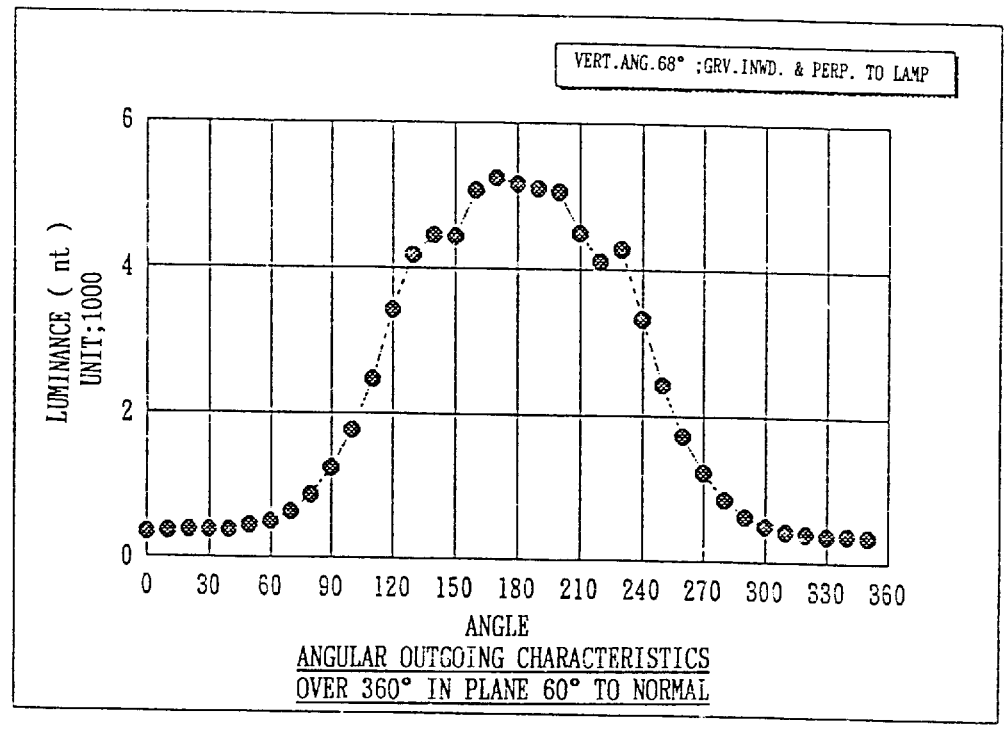
FIG. 51 is a graph showing a luminance change when scanning ζ in the range from 0° to +360° under the condition of the prism vertical angle ψ=68°; the arrangement of the grooves inward parallel to the lamp; β=60° by taking luminance on the vertical axis.
Figure 52:
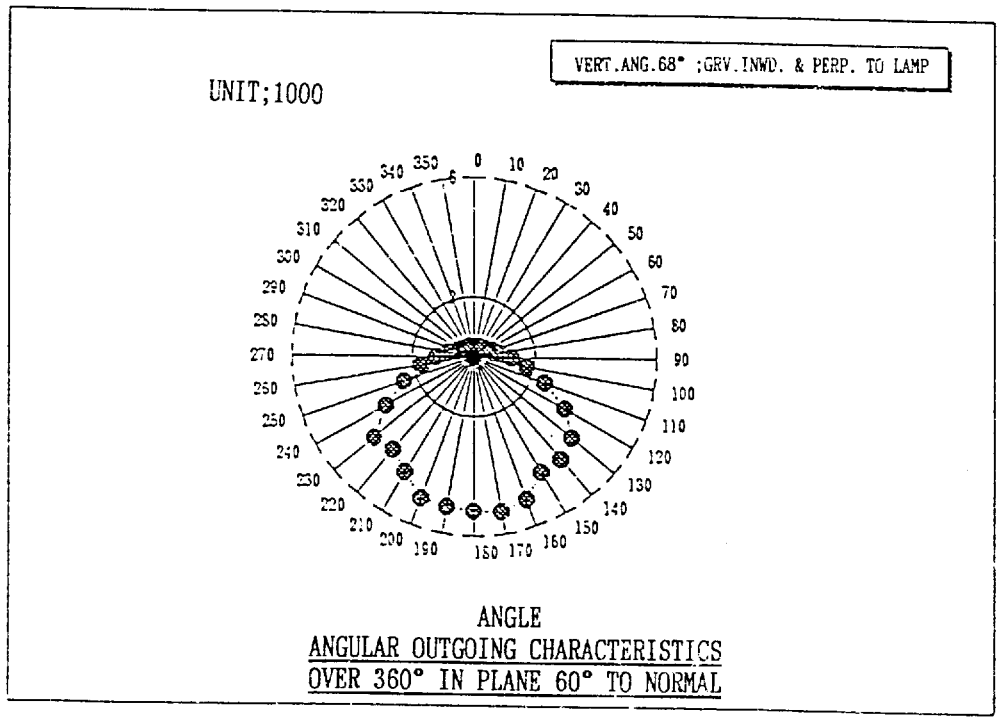
FIG. 52 is a graph showing the same measured data as FIG. 51 described by taking luminance on the radial direction axis.

[The graphs of FIG. 51 and FIG. 52]

(1) Scanning ζ in the range from 0° to +360° under the condition of β=60°.

(2) The graph of FIG. 51 illustrates luminance by taking luminance on the vertical axis by the 1000 nt unit. The graph of FIG. 52 shows the same data by taking luminance on the radial direction axis by the 1000 nt unit.

(3) Description: as is seen from the both graphs, only one luminance peak is observed at the direction ζ=+170°.

However, a symptom of peak split generation appears in the vicinity of ζ=+135° more clearly than in the case where β=30°.

From these graphs of FIG. 49 and FIG. 52, it is understood that the dual light flux is about to be generated, though weakly in this reference example (the arrangement of the prism vertical angle ψ=68°, the grooves inward perpendicular to the lamp). The measured results of <Reference Example 1> and <Reference Example 2> suggest that the dual light flux generation is made feasibile by increasing the prism vertical angle from ψ=64° to ψ=68°.

<Embodiment I-(3)>; the prism vertical angle ψ=70°, the grooves inward perpendicular to the lamp; the results are shown in the graphs of FIG. 53 to FIG. 56.

Figure 53:
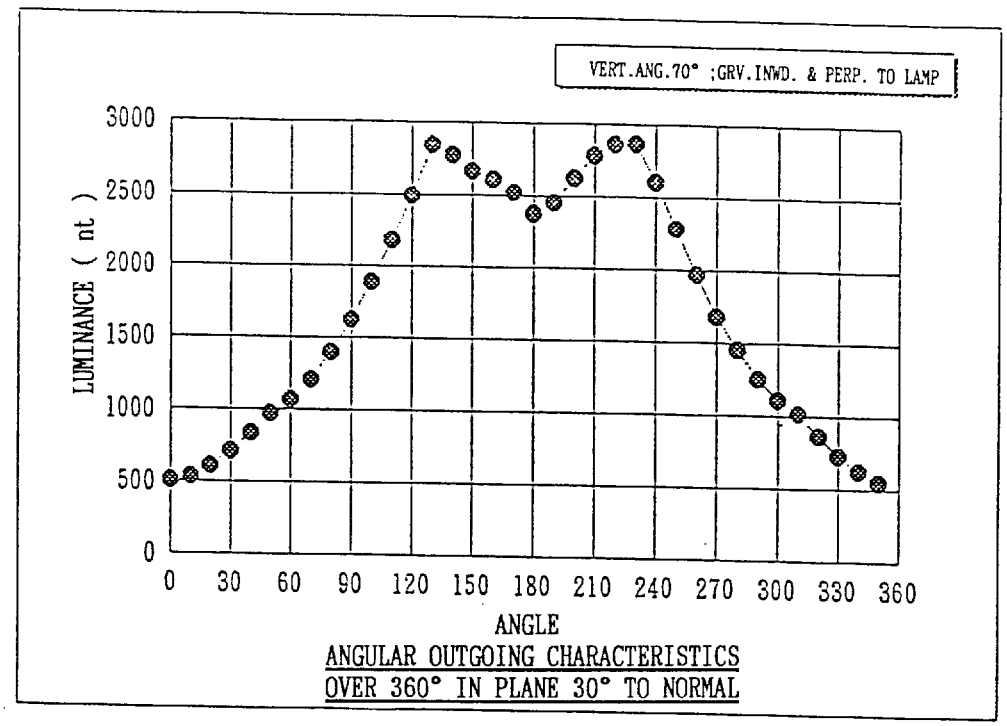
FIG. 53 is a graph showing a luminance change when scanning ζ in the range from 0° to +360° under the condition of the prism vertical angle ψ=70°; the arrangement of the grooves inward parallel to the lamp; β=30° by taking luminance on the vertical axis.
Figure 54:
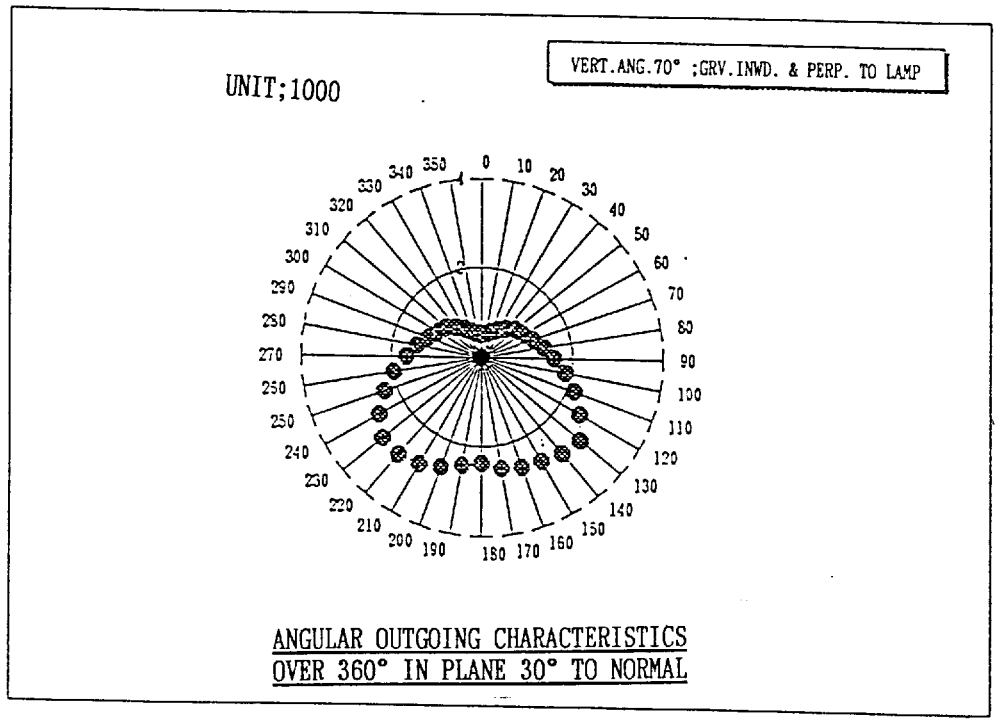
FIG. 54 is a graph showing the same data as FIG. 53 described by taking luminance on the radial direction axis.

[The graphs of FIG. 53 and FIG. 54]

(1) Scanning ζ in the range from 0° to +360° under the condition of β=30°.

(2) The graph of FIG. 53 illustrates luminance by taking luminance on the vertical axis by the nt unit. The graph of FIG. 54 shows the same data by taking luminance on the radial direction axis by the 1000 nt unit.

(3) Description: as is seen from both graphs, two luminance peaks are observed in the vicinity of the direction of ζ=+180°±50°. However, a symptom of peak split appears in the vicinity of ζ=+135° though it is extremely weak. A bottom is in the vicinity of ζ=+180° between both peaks but the difference of luminance value between the peak and the bottom is not so striking.

Figure 55:
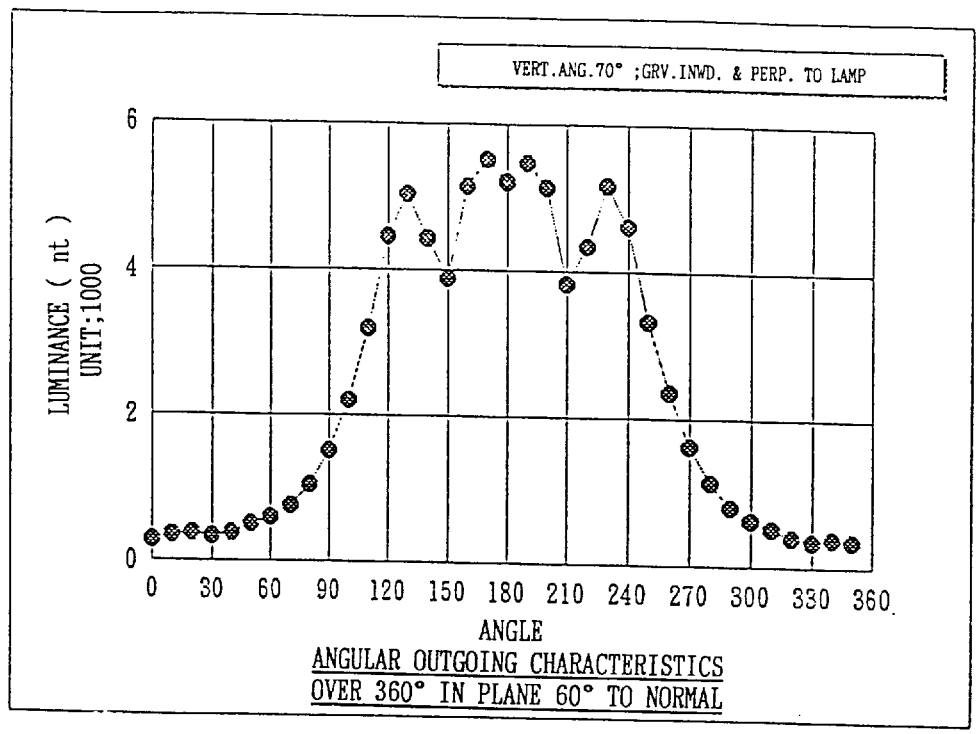
FIG. 55 is a graph showing a luminance change when scanning ζ in the range from 0° to +360° under the condition of the prism vertical angle ψ=70°; the arrangement of the grooves inward parallel to the lamp; β=60° by taking luminance on the vertical axis.
Figure 56:
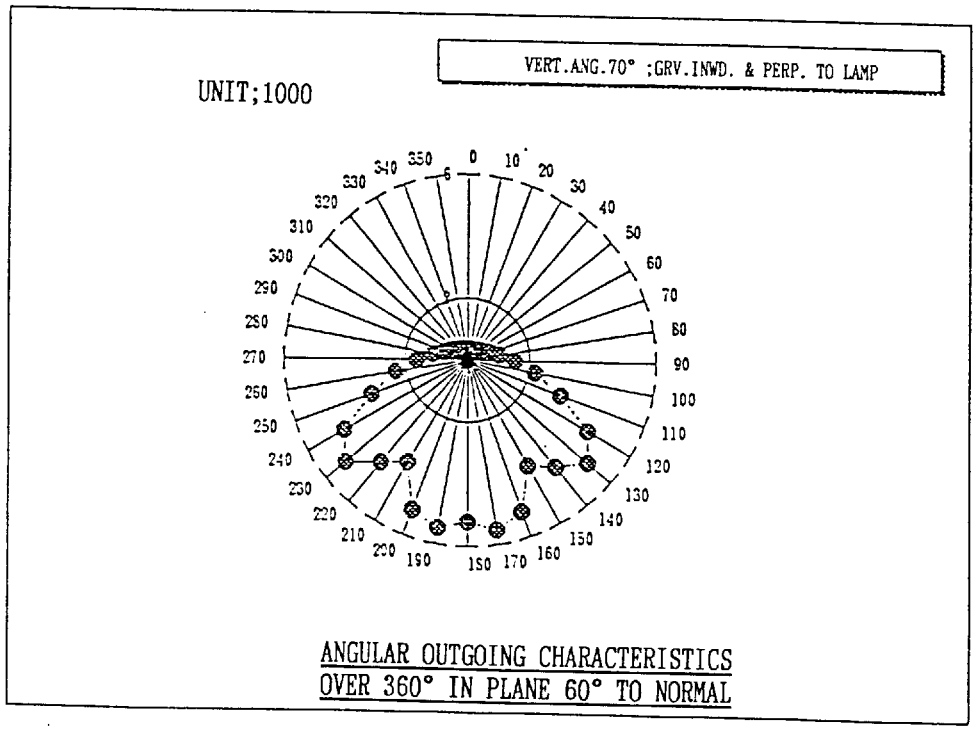
FIG. 56 is a graph showing the same data as FIG. 55 described by taking luminance on the radial direction axis.

[The graphs of FIG. 55 and FIG. 56]

(1) Scanning ζ in the range from 0° to +360° under the condition of β=60°.

(2) The graph of FIG. 55 illustrates luminance by taking luminance on a vertical axis by the 1000 nt unit. The graph of FIG. 56 show the same data by taking luminance on a radial axis by the 1000 nt unit.

(3) description; as is seen from both graphs, two luminance peaks are observed in the vicinity of the direction of ζ=+180°±20°. However, split is not so clear as the distance between the peaks is small. There are a pair of the sub-peaks in the vicinity of ζ=+180°±50°, and a considerable drop of the luminance is observed between ζ=+180°±20° to ζ=+180°±50°.

From these graphs of FIG. 53 to FIG. 56, it is understood that this embodiment (an arrangement of the prism vertical angle ψ=70°, the grooves inward perpendicular to the lamp) approximately corresponds to the critical condition under which the dual light flux generation is barely accomplished. However, the difference from <Reference Example 2> using the prism vertical angle ψ=68° is apparent. Thus, it deserves to be noted that the feasibility of dual light flux generation will be enhanced markedly by increasing the prism vertical angle by only 2°.

<Embodiment I-(4)>; the prism vertical angle ψ=80°, the grooves inward perpendicular to the lamp; the results are shown in the graphs of FIG. 57 to FIG. 60.

Figure 57:
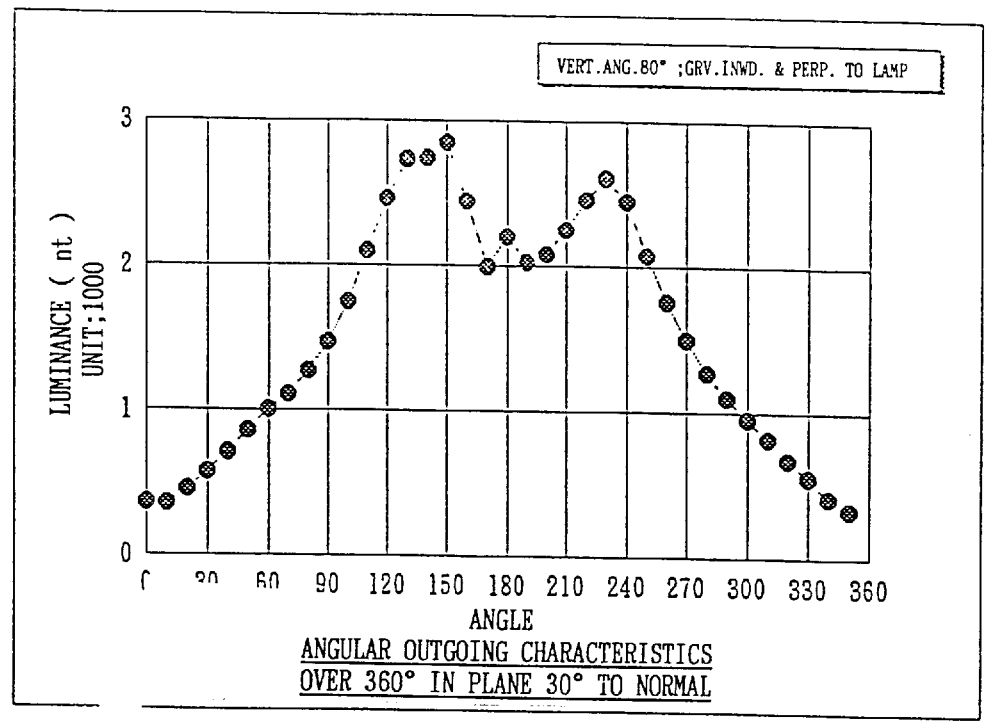
FIG. 57 is a graph showing a luminance change when scanning ζ in the range from 0° to +360° under the condition of the prism vertical angle ψ=80°; the the grooves inward parallel to the lamp; β=30° by taking luminance on the vertical axis.
Figure 58:
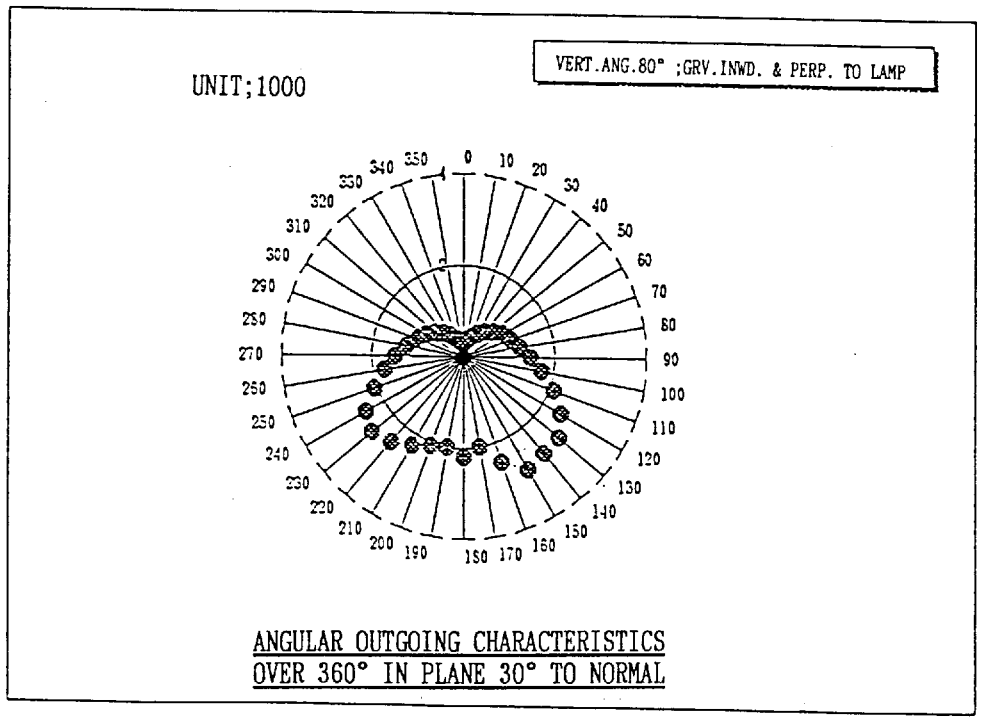
FIG. 58 is a graph showing the same data as FIG. 57 described by taking luminance on the radial direction axis.

[The graphs of FIG. 57 and FIG. 58]

(1) Scanning ψ in the range from 0° to +360° under the condition of β=30°.

(2) The graph of FIG. 57 illustrates luminance by taking luminance on the vertical axis by the 1000 nt unit. The graph of FIG. 58 shows the same data by taking luminance on the radial direction axis by the 1000 nt unit.

(3) Description: as is seen from both graphs, two luminance peaks are observed in the vicinity of the direction of ζ=+150° and ζ=±230°. A bottom is in the vicinity of ζ=+180° between both peaks, but the difference in the luminance values between the peak and the bottom is not so conspicuous. The peak value of the luminance level lower than 3000 nt.

Figure 59:
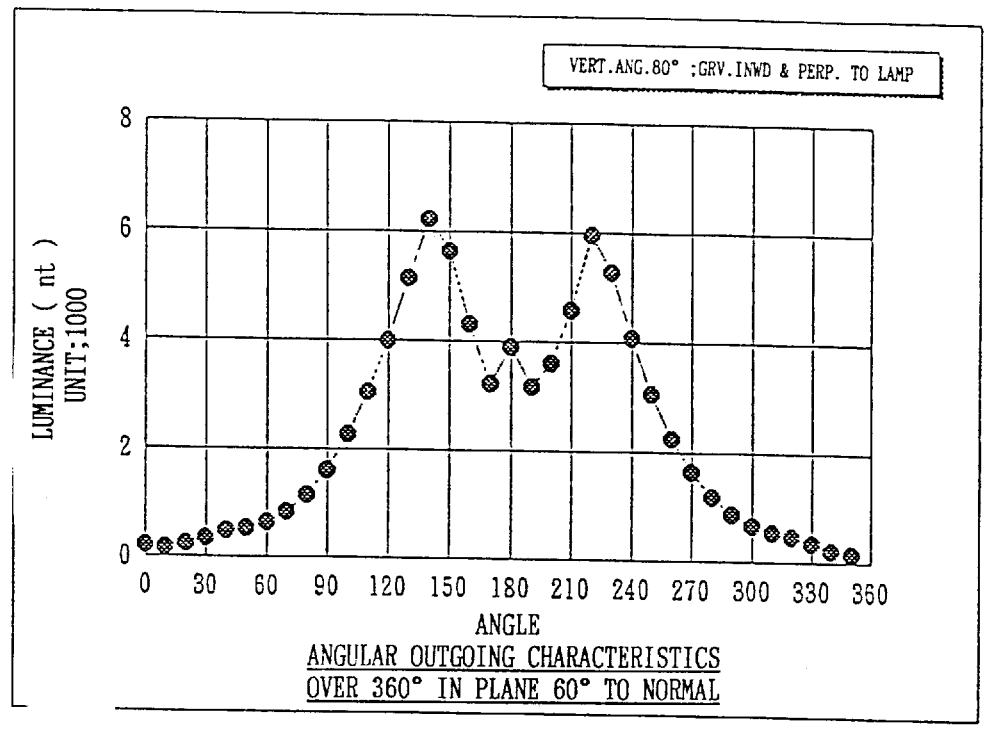
FIG. 59 is a graph showing a luminance change when scanning ζ in the range from 0° to +360° under the condition of the prism vertical angle ψ=80°; the arrangement of the grooves inward parallel to the lamp; β=60° by taking luminance on the vertical axis.
Figure 60:
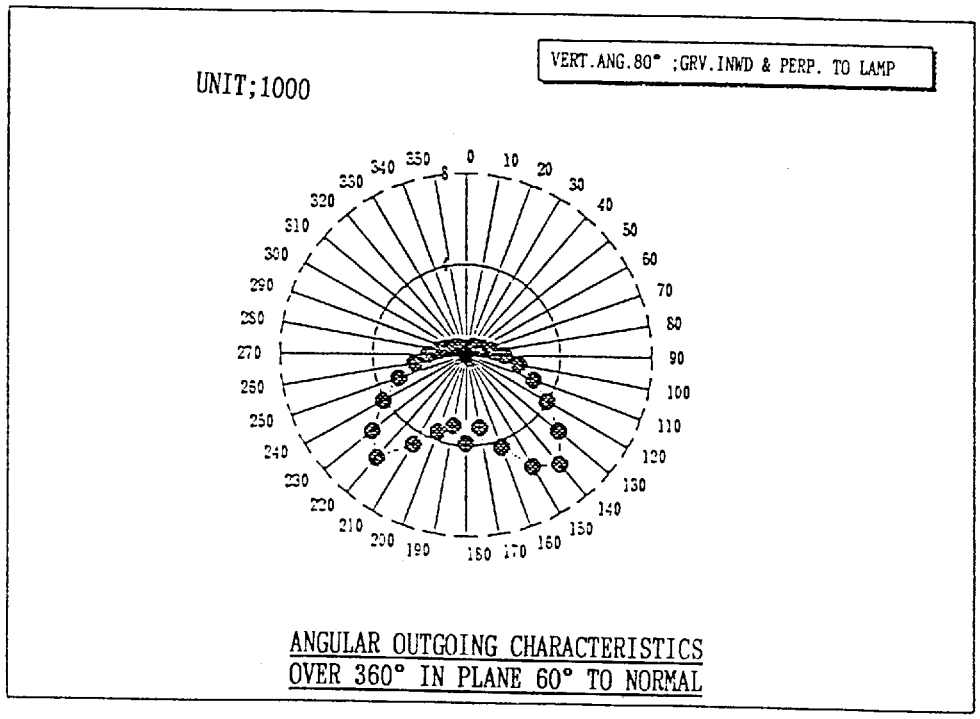
FIG. 60 is a graph showing the same data as FIG. 59 described by taking luminance on the radial direction axis.

[The graphs of FIG. 59 and FIG. 60]

(1) Scanning ζ in the range from 0° to +360° under the condition of β=60°.

(2) The graph of FIG. 59 illustrates luminance by taking luminance on the vertical axis by the 1000 nt unit. The graph of FIG. 60 shows the same data by taking luminance on the radial direction axis by the 1000 nt unit.

(3) Description: as is seen from both graphs, two clear luminance peaks are observed in the vicinity of the direction of ζ=+180°±40°. The separation of peaks is clearer compared with the case β=60°, and the luminances of these peaks differ considerably from luminance of the bottom in the vicinity of ζ=+180°. The peak of a luminance level reaches 6000 nt.

From these graphs of FIG. 57 to FIG. 60, it is understood that the dual light flux generation is satisfactorily accomplished in this embodiment (the arrangement of the prism vertical angle ψ=80°, the grooves inward perpendicular to the lamp). Especially, it must be noted that two clear and high peaks are obtained at β=60° providing a direction considerably slanting from the frontal direction.

However, conspicuousness of the dual light flux generation is lower compared with the case of <Embodiment I-(1)> (refer to FIG. 12, FIG. 13 and FIG. 16 to FIG. 19) in which the prism vertical angle ψ=90° although the arrangement is equivalent to that of this embodiment. Especially, that difference is apparent when the graphs of FIG. 18 and FIG. 19 are compared with the graphs of FIG. 59 and FIG. 60.

<Embodiment I-(5)>; the prism vertical angle ψ=100°, the grooves inward perpendicular to the lamp; the measured results are shown in the graphs of FIG. 61 to FIG. 64.

Figure 61:
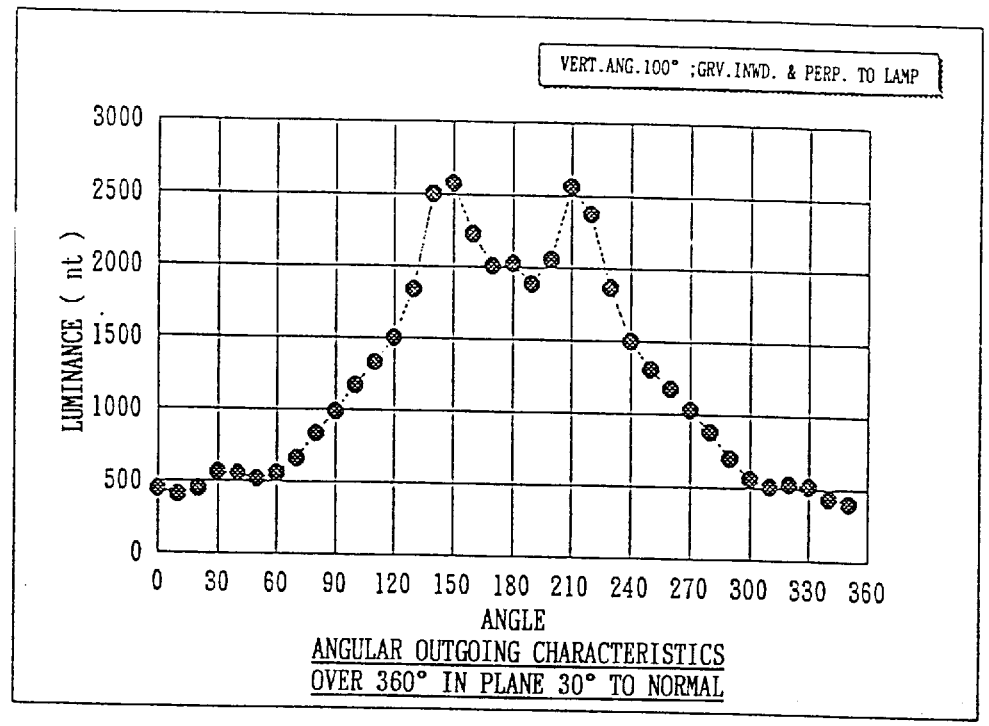
FIG. 61 is a graph showing a luminance change when scanning ζ in the range from 0° to +360° under the condition of the prism vertical angle ψ=100°; the arrangement of the grooves inward parallel to the lamp; β=30° by taking a luminance on the vertical axis.
Figure 62:
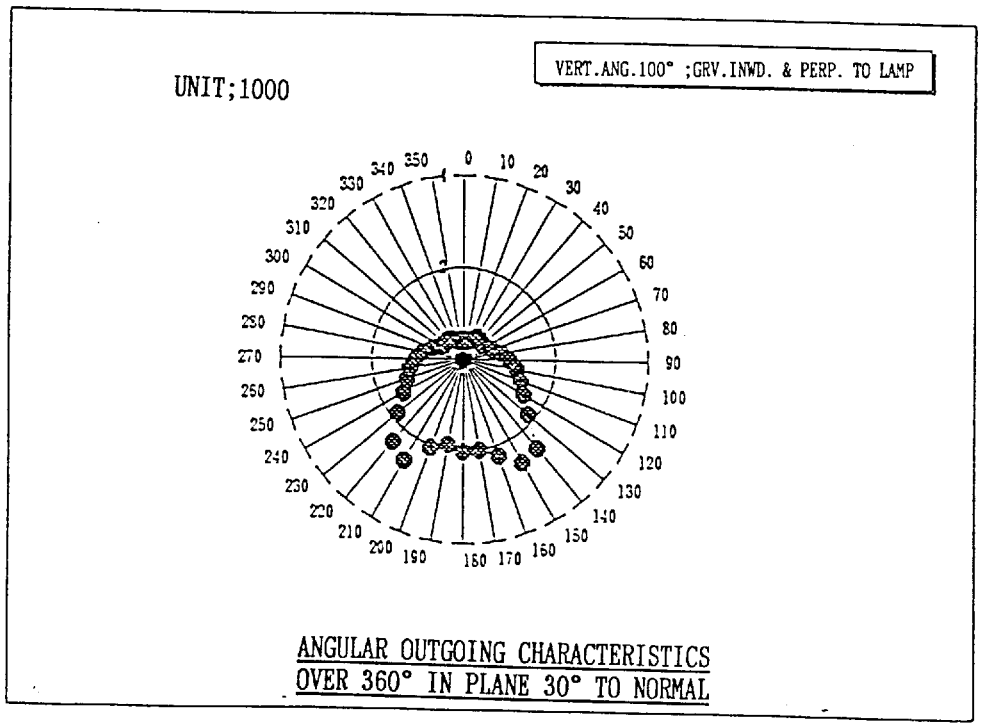
FIG. 62 is a graph showing the same data as FIG. 61 described by taking luminance on the radial direction axis.

[The graphs of FIG. 61 and FIG. 62]

(1) Scanning ψ in the range from 0° to +360° under the condition of β=30°.

(2) The graph of FIG. 61 illustrates luminance by taking luminance on the vertical axis by the nt unit. The graph of FIG. 62 shows the same data by taking luminance on the radial direction axis by the 1000 nt unit.

(3) Description: as is seen from both graphs, the two luminance peaks are observed in the vicinity of the direction of ζ=+150° and ζ=±210°. A bottom is in the vicinity of ζ=+190° between both peaks but the difference in luminance values between peak and bottom is not so striking. The peak values of the luminance level are approximately 2500 nt.

Figure 63:
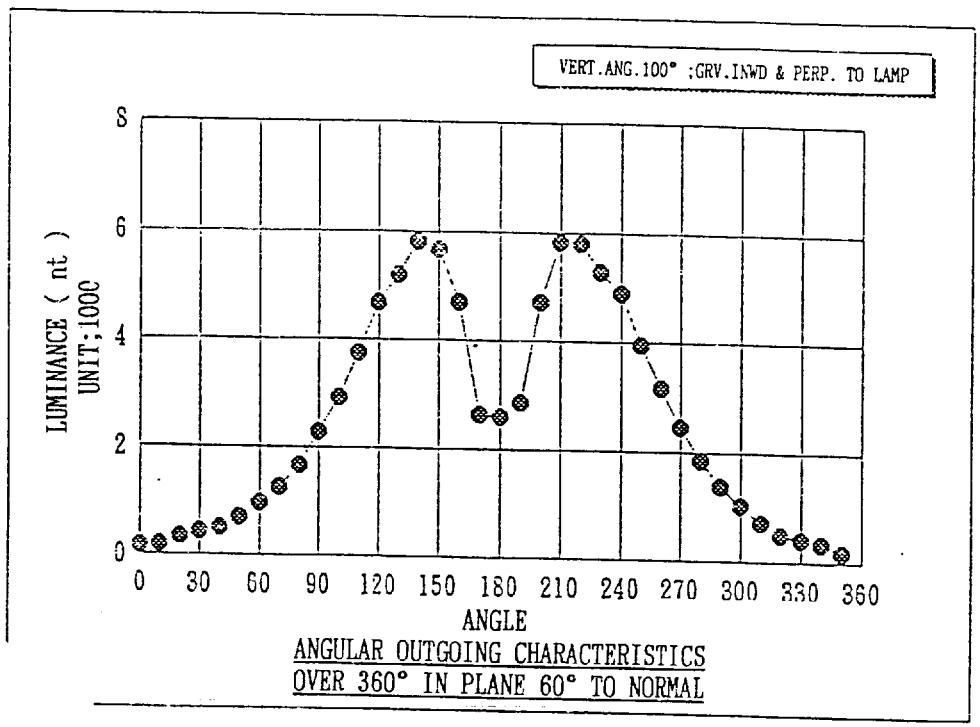
FIG. 63 is a graph showing a luminance change when scanning ζ in the range from 0° to +360° under the condition of the prism vertical angle ψ=100°; the arrangement of the grooves inward parallel to the lamp; β=60° by taking luminance on the vertical axis.
Figure 64:
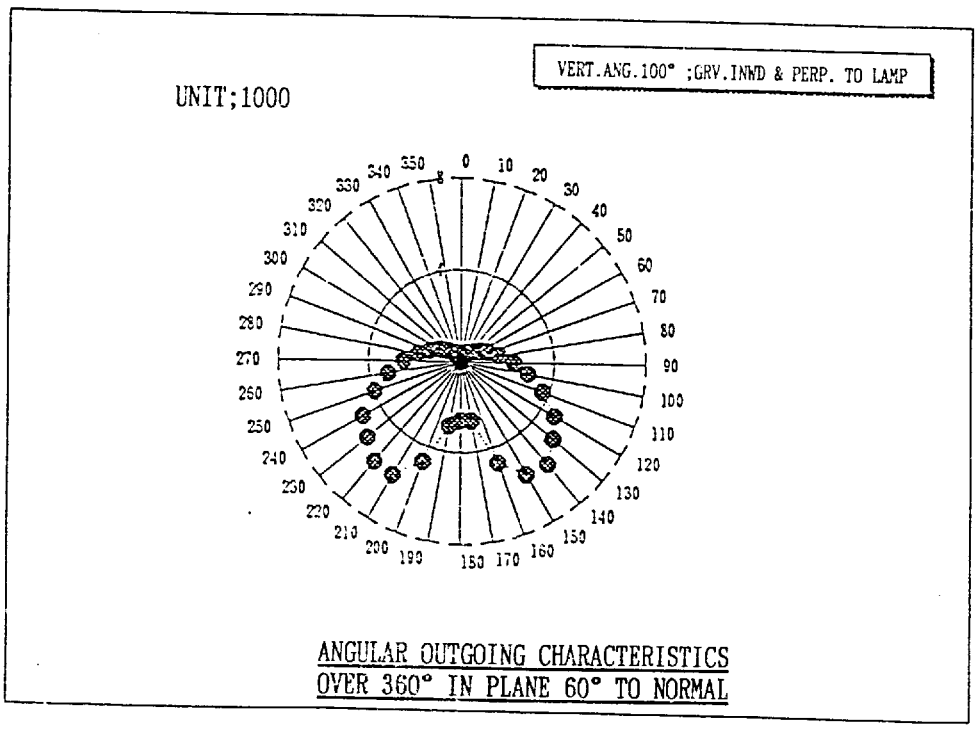
FIG. 64 is a graph showing the same data as FIG. 63 described by taking luminance on the radial direction axis.

[The graphs of FIG. 63 and FIG. 64]

(1) Scanning ζ in the range from 0° to +360° under the condition β=60°.

(2) The graph of FIG. 63 illustrates luminance by taking luminance on the vertical axis by the 1000 nt unit. The graph of FIG. 64 shows the same data by taking luminance on the radial direction axis by the 1000 nt unit.

(3) Description: as is seen from both graphs, two luminance peaks are observed in the vicinity of the direction of ζ=+150° and ζ=±210°. The separation of peaks is clearer compared with the case of β=30° and the difference in luminance from the bottom in the vicinity of ζ=+180° is considerably large. The peak values of luminance level come up to 6000 nt.

From these graphs of FIG. 61 to FIG. 64, it is understood that the dual light flux generation is accomplished well in this embodiment (the arrangement of the prism vertical angle ψ=100°, the grooves inward perpendicular to the lamp). Especially, it must be noted that the two clear and high peaks are obtained at the direction of β=60° slanting from the frontal direction considerably as well as <Embodiment I-(4)> (the prism vertical angle ψ=80°).

However, the conspicuousness of the dual light flux generation is slightly lower than the case of <Embodiment I-(1)> (refer to FIG. 12, FIG. 13, FIG. 16 to FIG. 19) using the prism vertical angle $\psi=90°$, although the arrangement is equivalent to that of this embodiment. Especially, the difference is apparent when the graphs of FIG. 18 and FIG. 19 are compared with the graphs of FIG. 63 and FIG. 64.

Considering comprehensively, it is understood that the performance of this embodiment using the prism vertical angle $\psi=100°$ is approximately equivalent to that of <Embodiment I-(4)> using the prism vertical angle $\psi=80°$. This suggests that the optimum value of the prism vertical angle $\psi$ exists in the vicinity of 90° at least in the case using the main prism sheet singly.

<Embodiment I-(6)>: the prism vertical angle $\psi=110°$, the grooves inward perpendicular to the lamp; the results are shown in the graphs of FIG. 65 to FIG. 68.

Figure 65:
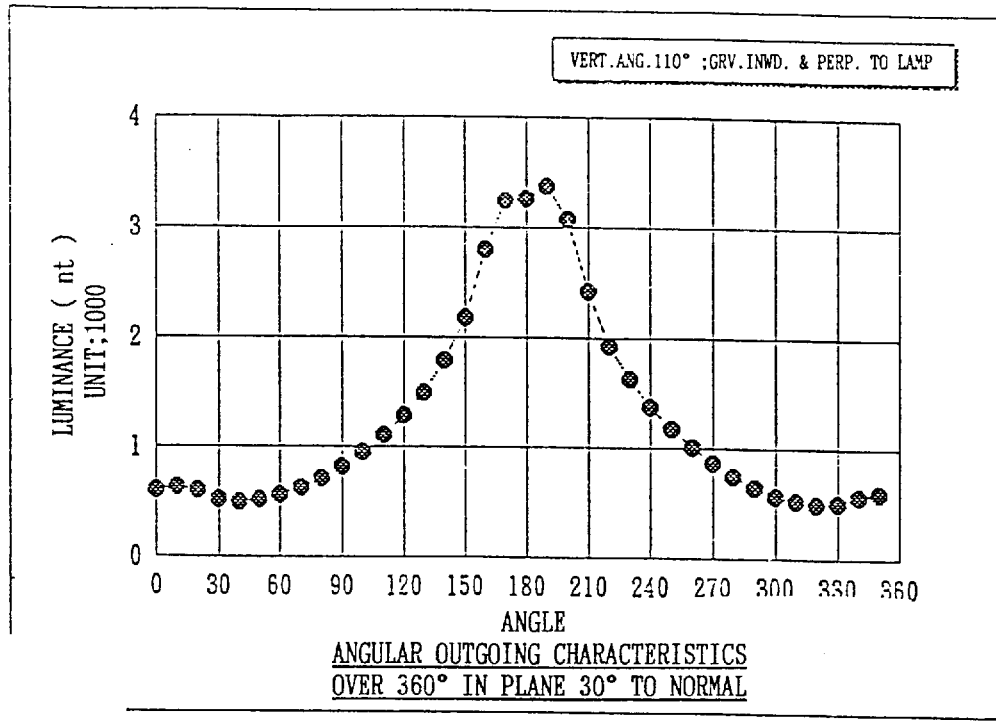
FIG. 65 is a graph showing a luminance change when scanning ζ in the range from 0° to +360° under the condition of the prism vertical angle ψ=110°; the arrangement of the grooves inward parallel to the lamp; β=30° by taking luminance on the vertical axis.
Figure 66:
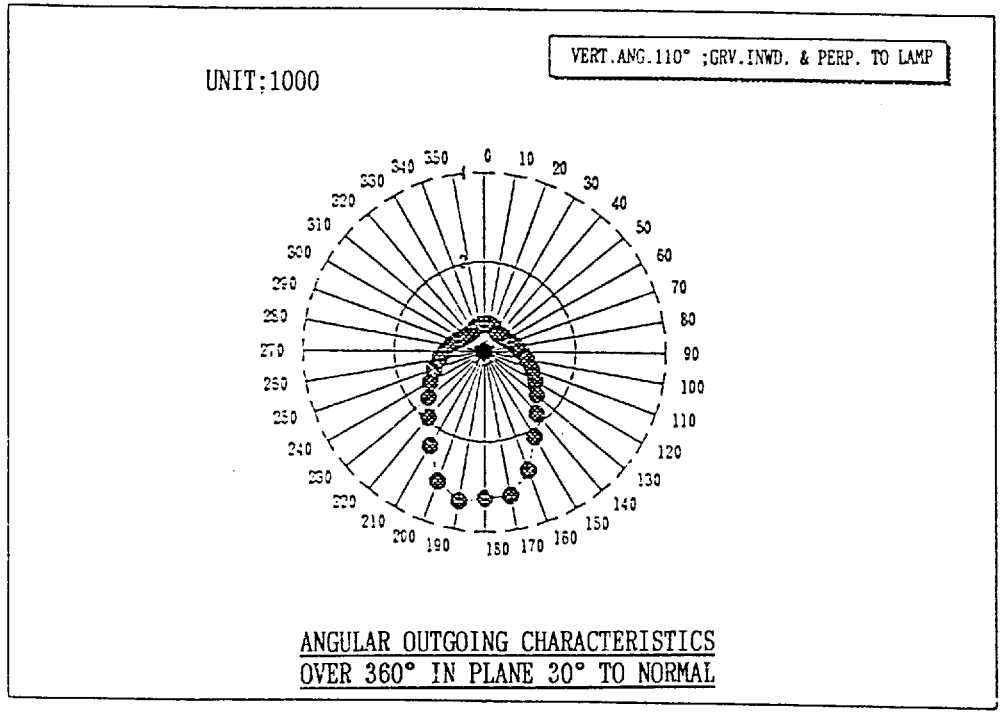
FIG. 66 is a graph showing the same data as FIG. 65 described by taking luminance on the radial direction axis.

[The graphs of FIG. 65 and FIG. 66]

(1) Scanning $\zeta$ in the range from 0° to +360° under the condition of $\beta=30°$.

(2) The graph of FIG. 65 illustrates luminance by taking luminance on the vertical axis by the 1000 nt unit. The graph of FIG. 66 shows the same data by taking luminance on the radial direction axis by the 1000 nt unit.

(3) Description: as is seen from the both graphs, the luminance peak which is impending split is observed in the vicinity of the direction of $\zeta=+180°$. The peak value of luminance level is approximately 3300 nt.

Figure 67:
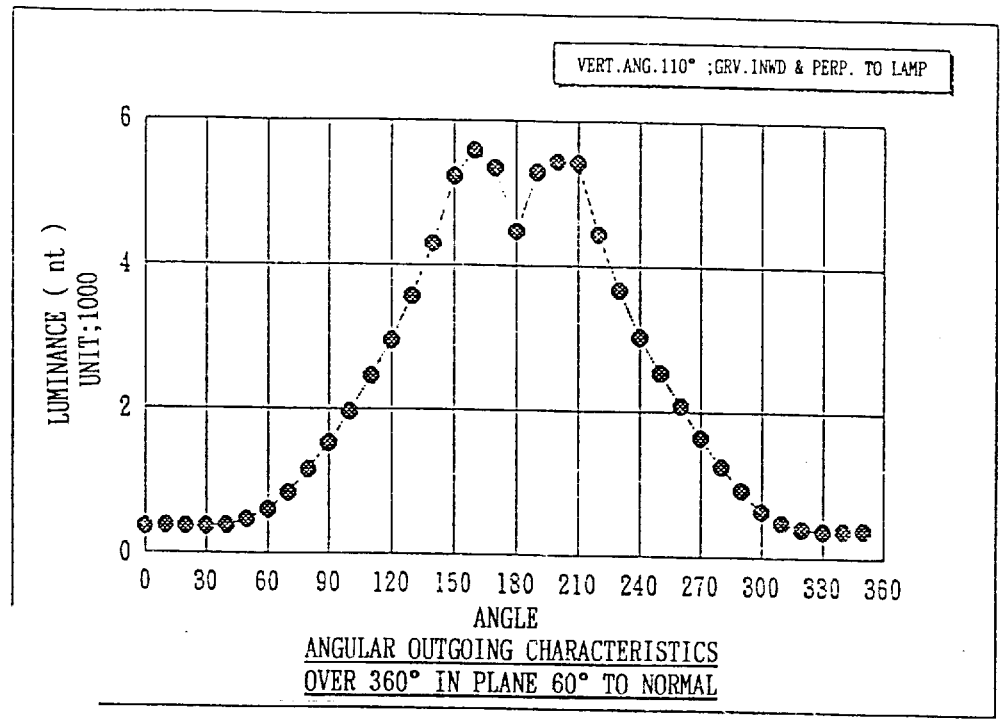
FIG. 67 is a graph showing a luminance change when scanning ζ in the range from 0° to +360° under a condition of a vertical angle ψ=110°; the arrangement of the grooves inward parallel to the lamp; β=60° by taking luminance on the vertical axis.
Figure 68:
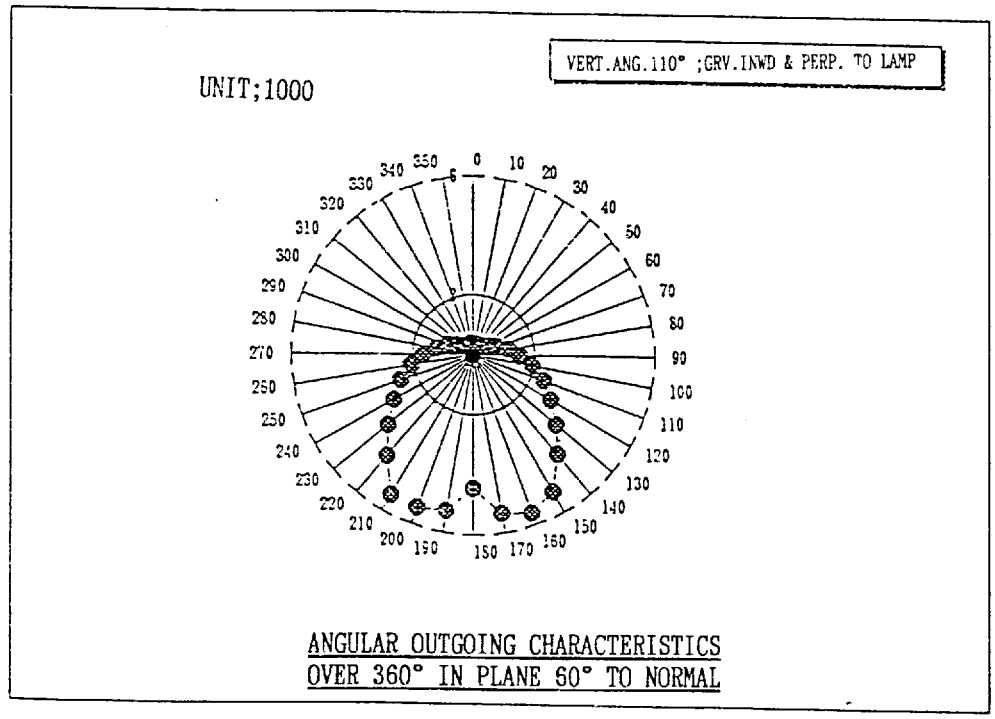
FIG. 68 is a graph showing the same measured data as FIG. 67 described by taking luminance on the radial direction axis.

[The graphs of FIG. 67 and FIG. 68]

(1) Scanning $\zeta$ in the range from 0° to +360° under the condition of $\beta=60°$.

(2) The graph of FIG. 67 illustrates luminance by taking luminance on the vertical axis by the 1000 nt unit. The graph of FIG. 68 shows the same data by taking luminance on the radial direction axis by the 1000 nt unit.

(3) Description: as is seen from both the two luminance peaks are observed in the vicinity of the direction of $\psi=+180°\pm20°$ differing from the case of $\beta=30°$. But the bottom between both peaks is very shallow.

From these graphs of FIG. 65 to FIG. 68, it is understood that this embodiment (an arrangement of the prism vertical angle $\psi=110°$, the grooves inward perpendicular to the lamp) approximately corresponds to the critical condition under which the dual light flux generation is barely accomplished. Moreover, it can be guessed that the function of the dual light flux generation is lost rapidly when $\psi$ exceeds 110° because the performance of the dual light flux generation apparently drops gradually in the order of $\psi=90°$, $\psi=100°$ and $\psi=110°$.

[II] The joint use of a main prism sheet and sub-prism sheet; The dual light flux generation in the surface perpendicular to the direction of the grooves of the main prism sheet is realized. An example belonging to the second type (the sub-prism sheet is disposed to inside of the main prism sheet) will be described. Description of data to prove dual light flux generation for the first type (sub-prism sheet disposed outside of main prism sheet) is omitted, except under the vertical angle of 90°, due to the following reason.

From the results of the various embodiments using the main prism sheet singly, it has been adequately supported that dual light flux can be generated at the prism vertical angles between 70° to 110°. Accordingly, it is understood readily that the conventional function of modification of preferential propagation direction can be applied to each light flux of the dualized light flux when the sub-prism sheet is disposed outside of the main prism sheet employed in the first type.

It can not be thought that dualized light flux is returned to the single light flux by this modification of the preferential propagation direction. Thus, new inspections for the prism vertical angles 70° to 110° of the main prism sheet employed in the first type are considered.

<Embodiment II-(5)>; the sub-prism sheet (an arrangement of the prism vertical angle $\psi=64°$; the grooves inward parallel to the lamp) is further disposed inside of the main prism sheet (an arrangement of the prism vertical angle $\psi=64°$, the grooves inward perpendicular to the lamp). The measured results are shown in the graphs of FIG. 69 to FIG. 72.

Figure 69:
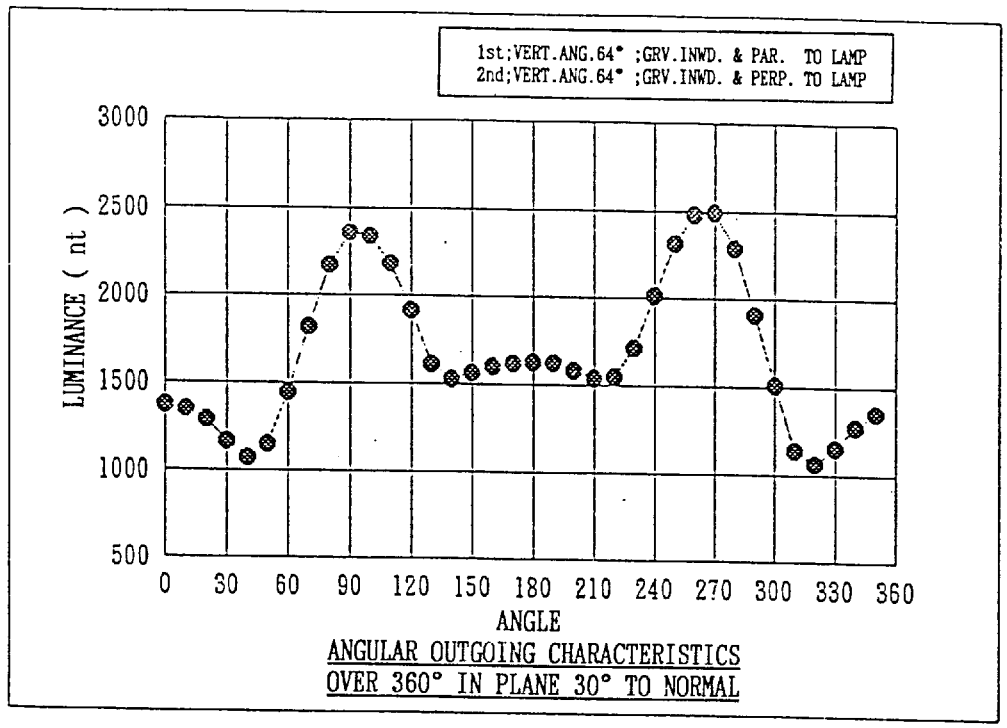
FIG. 69 is a graph showing a luminance change when scanning ζ in the range from 0° to +360° under the condition that the sub-prism sheet (the arrangement of the prism vertical angle ψ=64°; the grooves inward parallel the a lamp) is disposed inside of the main prism sheet (the arrangement of the prism vertical angle ψ=64°; the grooves inward perpendicular to the lamp); β=30° by taking luminance on the vertical axis.
Figure 70:
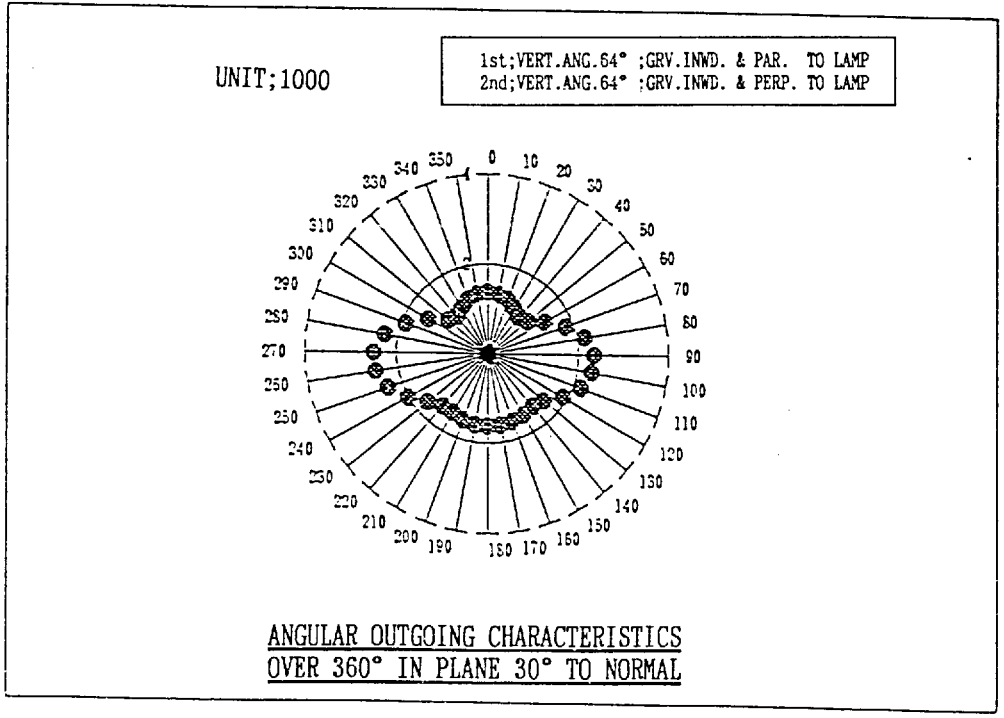
FIG. 70 is a graph showing the same data as FIG. 69 described by taking luminance on the radial direction axis.

[The graphs of FIG. 69 and FIG. 70]

(1) Scanning $\zeta$ in the range from 0° to +360° under the condition of $\beta=30°$.

(2) The graph of FIG. 69 illustrates luminance by taking luminance on the vertical axis by the nt unit. The graph of FIG. 70 shows the same data by taking luminance on the radial direction axis by the 1000 nt unit.

(3) Description: as is seen from both graphs, luminance peaks exist in the vicinity of the direction of $\zeta=+180°\pm90°$, respectively. However, the luminance level of the peaks are low (approximately 2500 nt), and the differences from the luminance levels of the wide bottom portion between both peaks are not so large.

Figure 71:
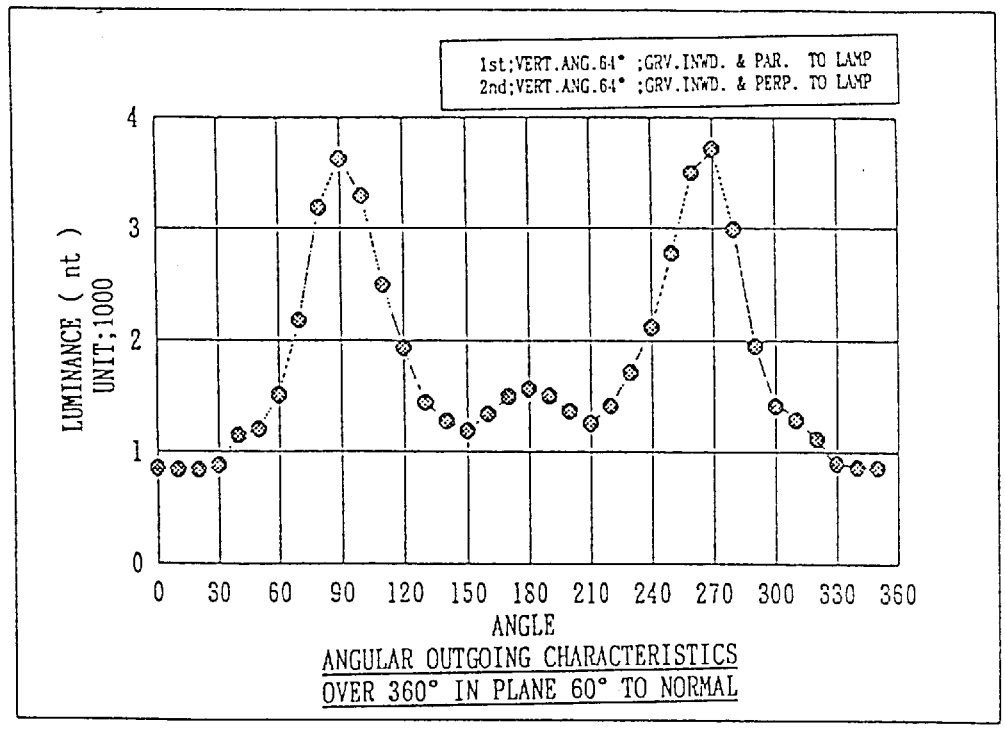
FIG. 71 is a graph showing a luminance change when scanning ζ in the range from 0° to +360° under the condition that the sub-prism sheet (the arrangement of the prism vertical angle ψ=64°; the grooves inward parallel to the lamp) is disposed inside of the main prism sheet (the arrange of the vertical angle ψ=64°; the grooves inward perpendicular to the lamp); β=60° by taking luminance on the vertical axis.
Figure 72:
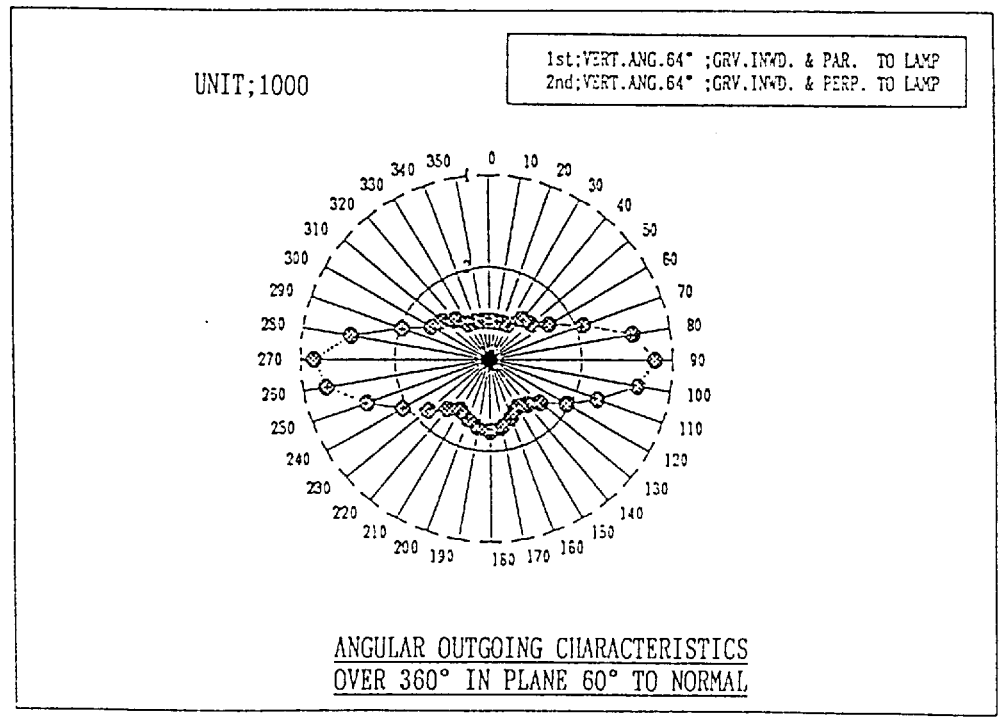
FIG. 72 is a graph showing the same data as FIG. 71 described by taking luminance on the radial direction axis.

[The graphs of FIG. 71 and FIG. 72]

(1) Scanning $\zeta$ in the range from 0° to +360° under the condition of $\beta=60°$.

(2) The graph of FIG. 71 illustrates luminance by taking luminance on the vertical axis by the 1000 nt unit. The graph of FIG. 72 shows the same data by taking luminance on the radial direction axis by the 1000 nt unit.

(3) Description: as will be read readily from both graphs, two clear luminance peaks exist in the vicinity of the direction of $\zeta=+180°\pm90°$ respectively. The luminance levels of the peaks are higher compared with the case of $\beta=30°$, and the differences from the luminance level of the wide bottom portion between both peaks are large.

The graphs of FIG. 69 to FIG. 72 explain the following; this Embodiment II-(5) corresponds to the arrangement in which the sub-prism sheet (the arrangement of the prism vertical angle $\psi=64°$, the grooves inward parallel to the lamp) is added to inside of the main prism sheet in the arrangement of the <Reference Example 2> mentioned above. What is important here is that dual light flux generation is accomplished successfully in this embodiment while no dual light flux generation is observed in the <Reference Example 2>. Especially, it should be noted that the two clear and high peaks appear at the direction of $\beta=60°$, slanting from the frontal direction considerably.

<Embodiment II-(6)>: the sub-prism sheet (an arrangement of the prism vertical angle $\psi=64°$; the grooves inward parallel to the lamp) is added to inside of the main prism sheet (an arrangement of the prism vertical angle $\psi=68°$, the grooves inward and perpendicular to the lamp). The results are shown in the graphs of FIG. 73 to FIG. 76.

Figure 73:
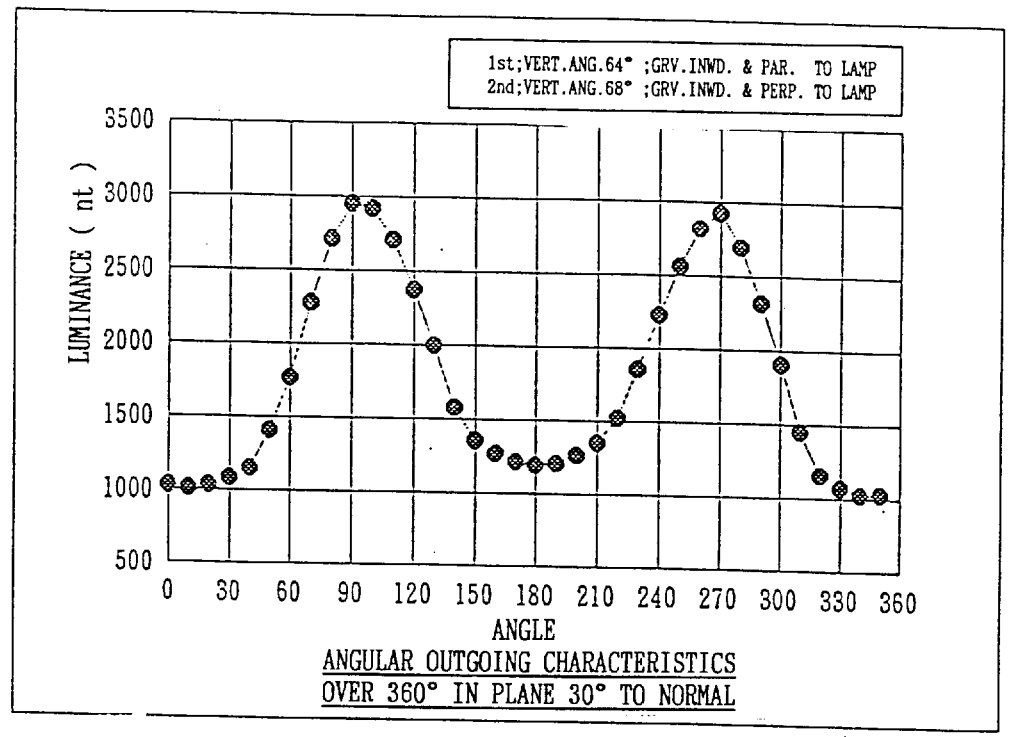
FIG. 73 is a graph showing a luminance change when scanning ζ in the range from 0° to +360° under the condition that the sub-prism sheet (the arrangement of the prism vertical angle ψ=64°; the grooves inward parallel to the lamp) is disposed inside of the main prism sheet (the arrangement of the prism vertical angle ψ=68°; the grooves inward perpendicular to the lamp); β=30° by taking luminance on the vertical axis.
Figure 74:
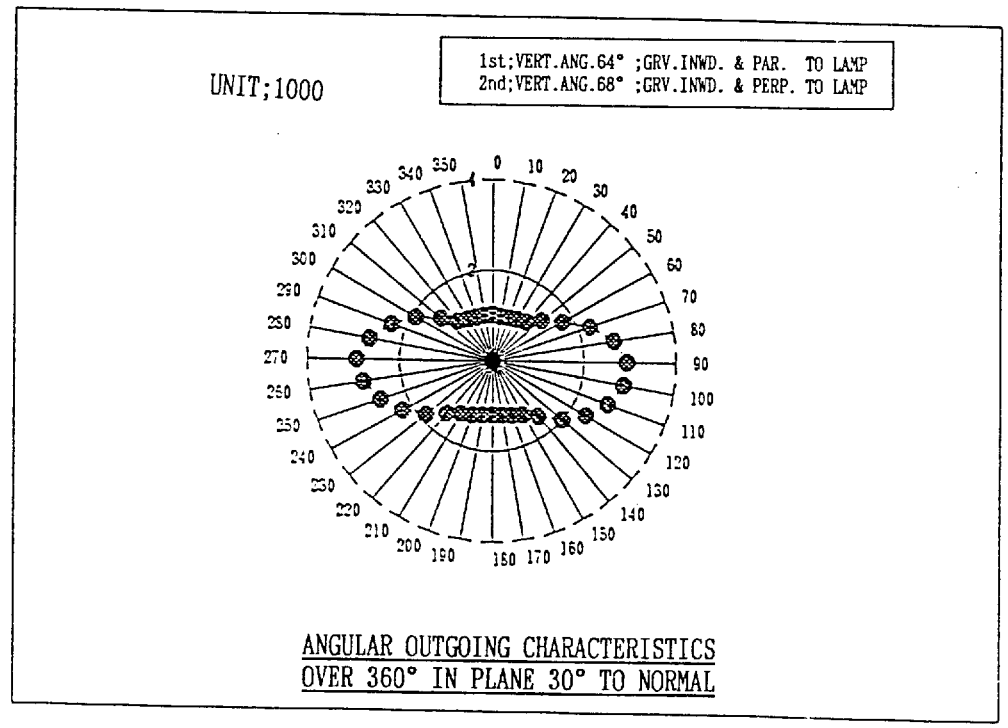
FIG. 74 is a graph showing the same data as FIG. 73 described by taking luminance on the radial direction axis.

[The graphs of FIG. 73 and FIG. 74]

(1) Scanning $\zeta$ in the range from 0° to +360° under the condition of 1=30°.

(2) The graph of FIG. 73 illustrates luminance by taking luminance on the vertical axis by the nt unit. The graph of FIG. 74 shows the same data by taking luminance on the radial direction axis by the 1000 nt unit.

(3) Description: as is seen from both graphs, clear luminance peaks exist in the vicinity of the direction of $\zeta=+180°\pm90°$, respectively. The luminance level of the peaks are not too high (approximately 3000 nt), but the differences from the luminance level of the wide bottom portion between both peaks are large.

Figure 75:
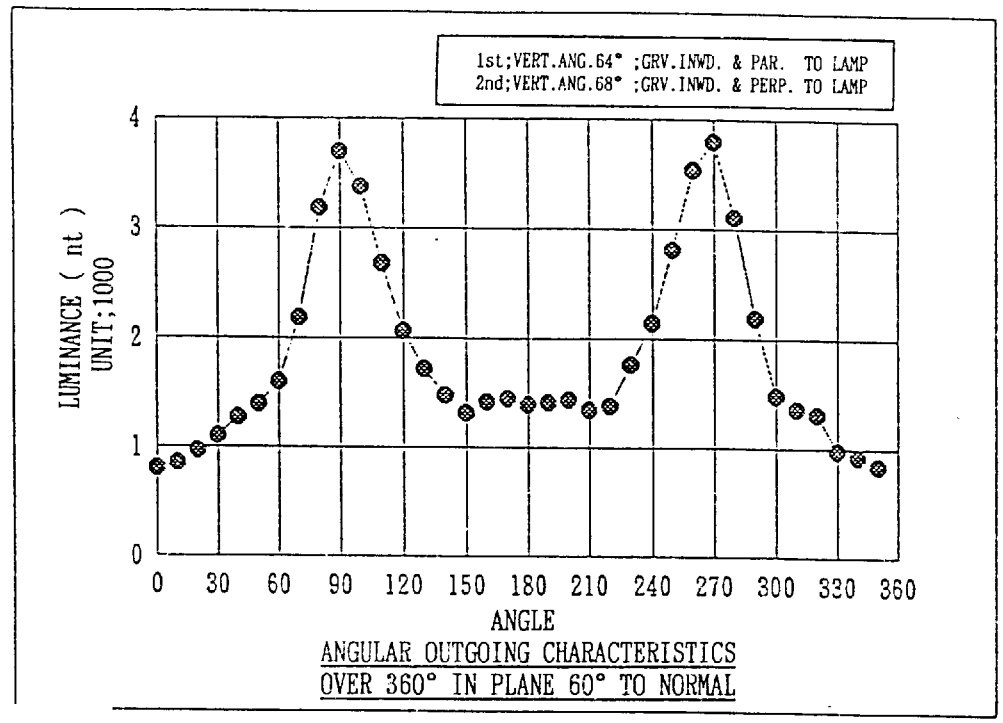
FIG. 75 is a graph showing a luminance change when scanning ζ in the range from 0° to +360° under the condition that the sub-prism sheet (the arrangement of the prism vertical angle ψ=64°; the grooves inward parallel to the lamp) is disposed inside of the main prism sheet (the arrangement of the prism vertical angle ψ=68°; the grooves inward perpendicular to the lamp); β=60° by taking luminance on the vertical axis.
Figure 76:
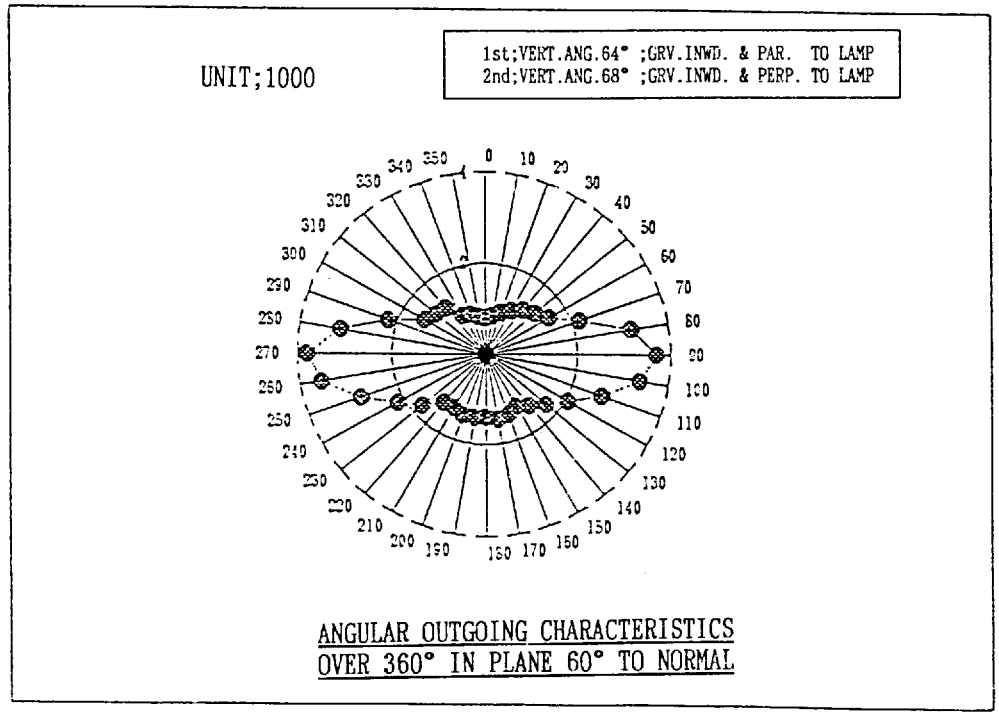
FIG. 76 is a graph showing the same data as FIG. 75 described by taking luminance on the radial direction axis.

[The graphs of FIG. 75 and FIG. 76]

(1) Scanning ζ in the range from 0° to +360° under the condition of β=60°.

(2) The graph of FIG. 75 illustrates luminance by taking luminance on the vertical axis by the 1000 nt unit. The graph of FIG. 76 shows the same data by taking luminance on the radial direction axis by the 1000 nt unit.

(3) Description: as is seen from both graphs, clear luminance peaks exist in the vicinity of the direction of ζ=+180°±90°. The luminance level of the peaks are higher compared with the case of β=30°. But, the differences from the luminance levels of the wide bottom portion between both peaks are large.

The graphs of FIG. 73 to FIG. 76 explain the following; this Embodiment II-(6) corresponds to the arrangement in which the sub-prism sheet (the arrangement of the prism vertical angle ψ=64°, the grooves inward parallel to the lamp) is added to inside of the a main prism sheet in the arrangement of the <Reference Example 3> mentioned above. And, dual light flux generation is accomplished successfully in this embodiment while no dual light flux generation is observed in the <Reference Example 3>. Especially, it must be noted that the clear and high peak is generated at the direction of β=60° which is considerably slanting from the frontal direction.

<Embodiment II-(7)>: The sub-prism sheet (an arrangement of the prism vertical angle ψ=64°; the grooves inward and parallel to the lamp) is added to inside of the main prism sheet (an arrangement of the prism vertical angle ψ=70°, the grooves inward perpendicular to the lamp). The results are shown in the graphs of FIG. 77 to FIG. 80.

Figure 77:
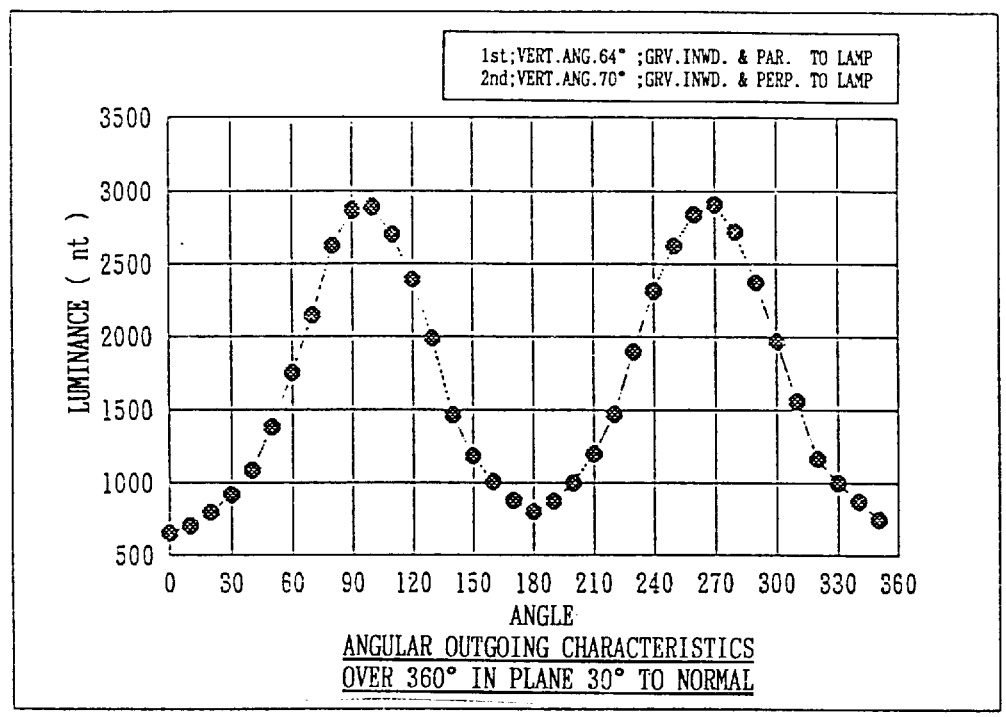
FIG. 77 is a graph showing a luminance change when scanning ζ in the range from 0° to +360° under the condition that the sub-prism sheet (the arrangement of the prism vertical angle ψ=64°; the grooves inward parallel to the lamp) is disposed inside of the main prism sheet (the arrangement of the prism vertical angle ζ=70°; the grooves inward perpendicular to the lamp); β=30° by taking luminance on the vertical axis.
Figure 78:
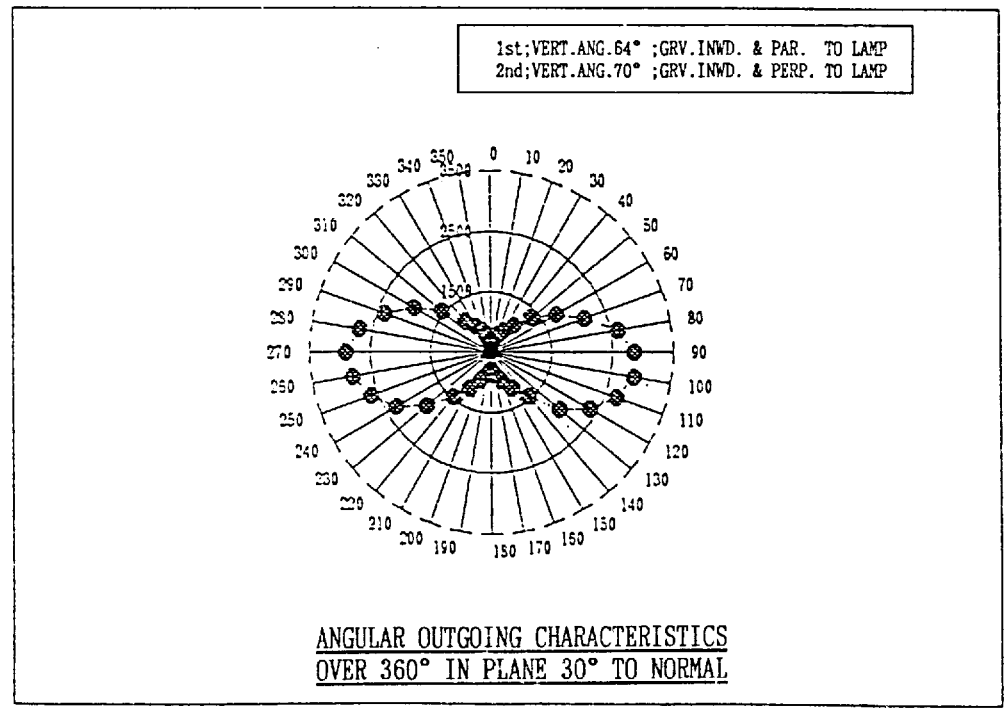
FIG. 78 is a graph showing the same data as FIG. 77 described by taking luminance on the radial direction axis.

[The graphs of FIG. 77 and FIG. 78]

(1) Scanning ζ in the range from 0° to +360° under the condition of β=30°.

(2) The graph of FIG. 77 illustrates luminance by taking luminance on the vertical axis by the nt unit. The graph of FIG. 74 shows the same data by taking luminance on the radial direction axis by the 1000 nt unit.

(3) Description: as is seen from both graphs, clear luminance peaks exist in the vicinity of the direction of ζ=+180°±90° respectively. The luminance level of the peaks are not so high (approximately 3000 nt), but the differences from the luminance level of the wide bottom portion between both peaks are very large.

Figure 79:
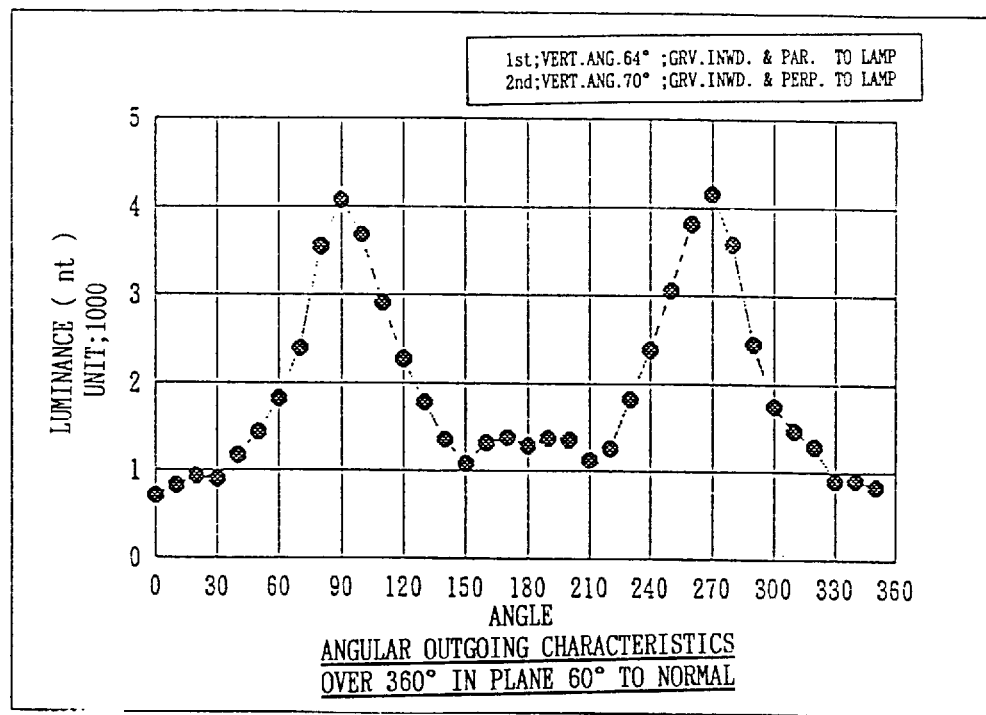
FIG. 79 is a graph showing a luminance change when scanning ζ in the range from 0° to +360° under the condition that the sub-prism sheet (the arrangement of the prism vertical angle ψ=64°; the grooves inward parallel to the lamp) is disposed inside the main prism sheet (the arrangement of the vertical angle ψ=70°; the grooves inward perpendicular to the lamp); β=60° by taking luminance on the vertical axis.
Figure 80:
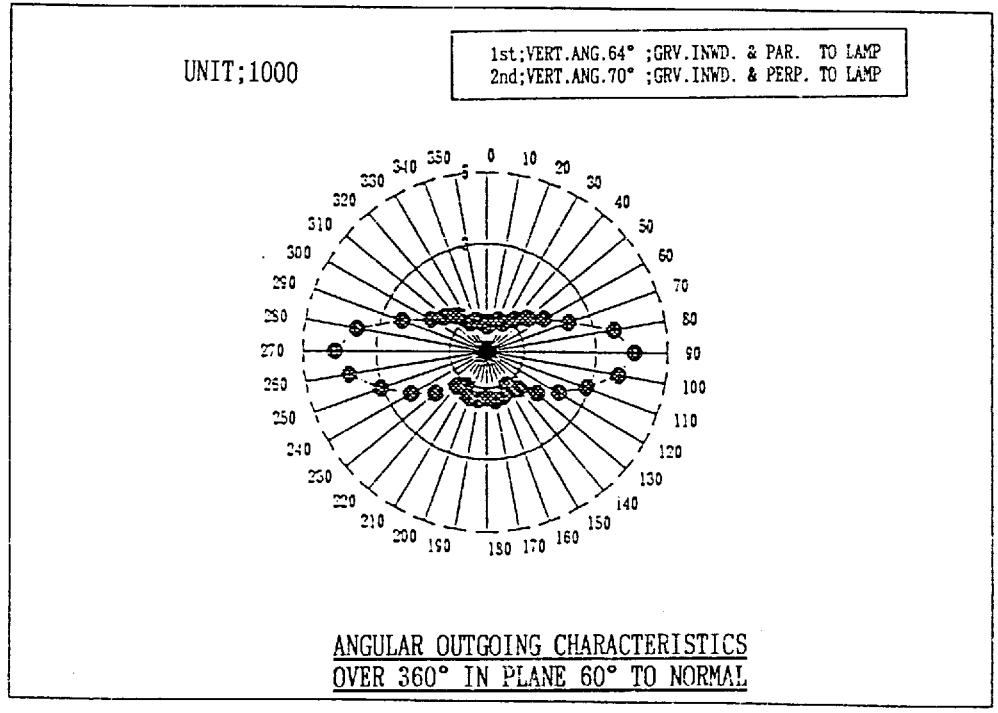
FIG. 80 is a graph showing the same data as FIG. 79 described by taking luminance on the radial direction axis.

[The graphs of FIG. 79 and FIG. 80]

(1) Scanning ζ in the range from 0° to +360° under the condition of β=60°.

(2) The graph of FIG. 79 illustrates luminance by taking luminance on the vertical axis by the 1000 nt unit. The graph of FIG. 80 shows the same data by taking luminance on the radial direction axis by the 1000 nt unit.

(3) Description: as is seen from both graphs, clear luminance peaks exist in the vicinity of the direction of ζ=+180°±90°. The luminance level of the peaks are higher compared with the case of β=30°. Moreover, the differences from the luminance levels of the wide bottom portion between both peaks are very large.

The graphs of FIG. 77 to FIG. 80 explain the following; this Embodiment II-(7) corresponds to the arrangement in which the sub-prism sheet (the arrangement of the prism vertical angle ψ=64°, the grooves inward parallel to the lamp) is added to inside of the a main prism sheet in the arrangement of the <Embodiment I-3> mentioned above. And, dual light flux generation is accomplished successfully in this embodiment while dual light flux generation is barely observed in the <Reference Example 3>.

<Embodiment II-(8)>: The sub-prism sheet (an arrangement of the prism vertical angle ψ=64°; the grooves inward parallel to the lamp) is further disposed inside of the main prism sheet (an arrangement of the prism vertical angle ψ=80°, the grooves inward perpendicular to the lamp). The measured results are shown in the graphs of FIG. 81 to FIG. 84.

Figure 81:
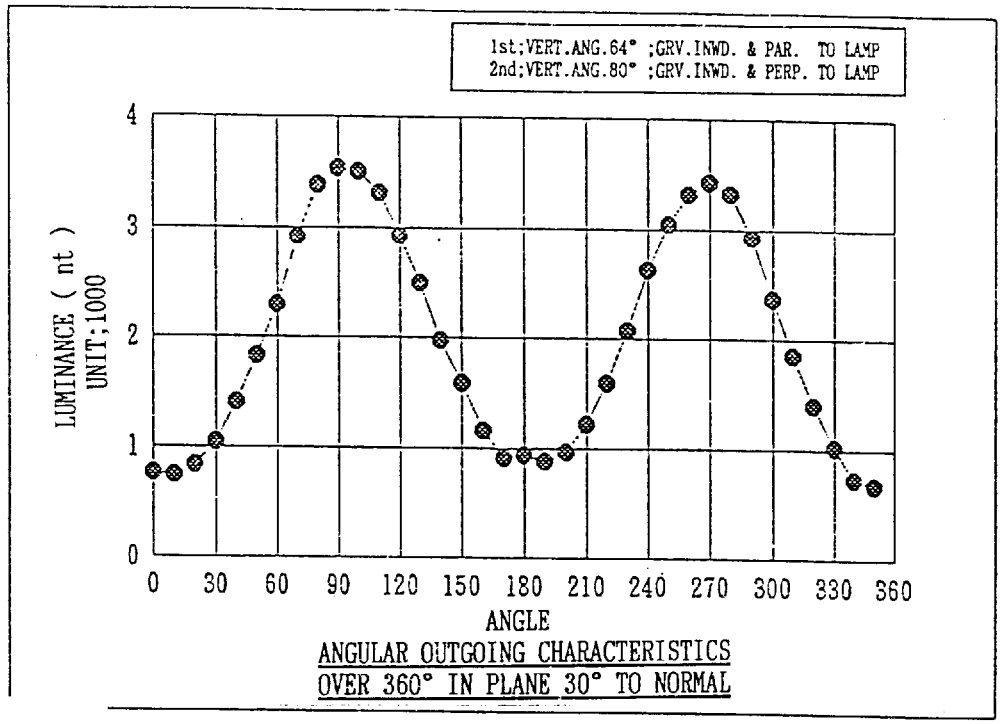
FIG. 81 is a graph showing a luminance change when scanning ζ in the range from 0° to +360° under the condition that the sub-prism sheet (the arrangement of the prism vertical angle ψ=64°; the grooves inward parallel to the lamp) is disposed inside the main prism sheet (the arrangement of the prism vertical angle ψ=80°; the grooves inward perpendicular to the lamp); β=30° by taking luminance on the vertical axis.
Figure 82:
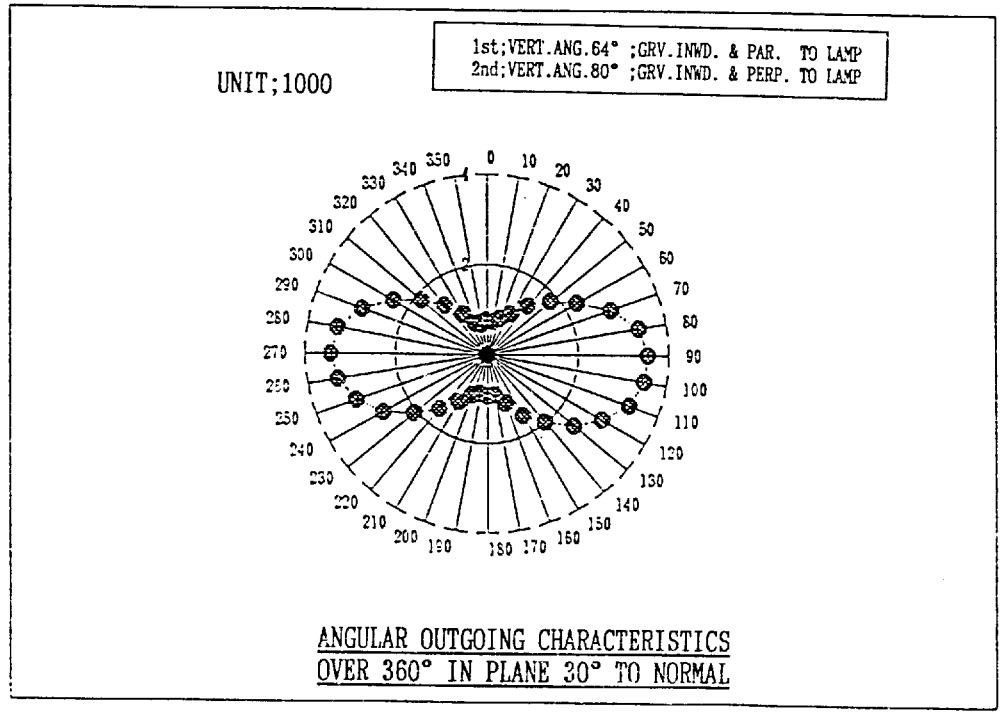
FIG. 82 is a graph showing the same data as FIG. 81 described by taking luminance on the radial direction axis.

[The graphs of FIG. 81 and FIG. 82]

(1) Scanning ζ in the range from 0° to +360° under the condition of β=30°.

(2) The graph of FIG. 81 illustrates luminance by taking luminance on the vertical axis by the 1000 nt unit. The graph of FIG. 82 shows the same data by taking luminance on the radial direction axis by the 1000 nt unit.

(3) Description: as is seen from both graphs, clear luminance peaks exist in the vicinity of the direction of ζ=+180°±90°, respectively. The luminance levels of the peaks are not so high (approximately 3500 nt), but the differences from the luminance level of the wide bottom portion between both peaks are very large.

Figure 83:
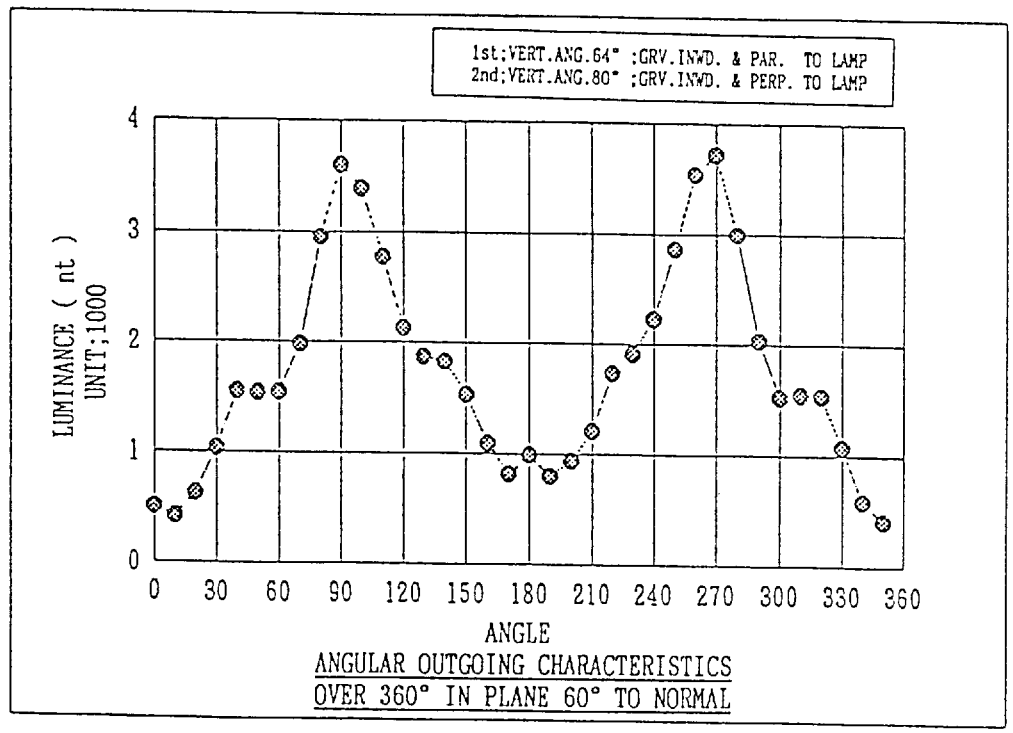
FIG. 83 is a graph showing a luminance change when scanning ζ in the range from 0° to +360° under the condition that the sub-prism sheet (the arrangement of the prism vertical angle ψ=64°; the grooves inward parallel to the lamp) is disposed inside the main prism sheet (the arrangement of the prism vertical angle ψ=80°; the grooves inward perpendicular to the lamp); β=60° by taking luminance on the vertical axis.
Figure 84:
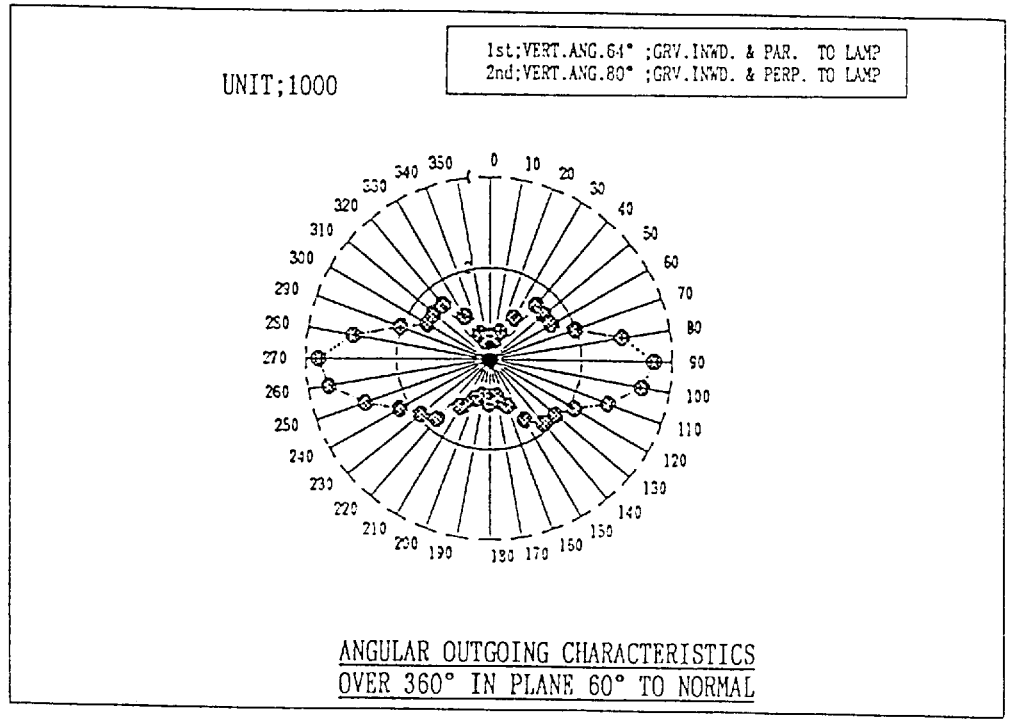
FIG. 84 is a graph showing the same data as FIG. 83 described by taking luminance on the radial direction axis.

[The graphs of FIG. 83 and FIG. 84]

(1) Scanning ζ in the range from 0° to +360° under the condition of β=60°.

(2) The graph of FIG. 83 illustrates luminance by taking luminance on the vertical axis by the 1000 nt unit. The graph of FIG. 84 shows the same data by taking luminance on the radial direction axis by the 1000 nt unit.

(3) Description: as is seen from both graphs, clear luminance peaks exist in the vicinity of the direction ζ=+180°±90°. The luminance level of the peaks are approximately equivalent to the case of β=30°. However, the luminance levels of the peaks are slightly lower than the case where the prism vertical angle ψ=70°. The differences from the luminance level of the wide bottom portion between both peaks are very large.

From the graphs of FIG. 81 to FIG. 84, it is understood that this embodiment accomplishes dual light flux generation as well as <Embodiment II-(5)> to <Embodiment II-(7)>. However, there is only a small difference in the degree of dual light flux generation between the directions of ψ=30° and ψ=60°.

<Embodiment II-(9)>: The sub-prism sheet (an arrangement of the prism vertical angle ψ=64°; the grooves inward parallel to the lamp) is further employed inside of the main prism sheet (an arrangement of the prism vertical angle ψ=100°, the grooves inward perpendicular to the lamp). The measured results are shown in the graphs of FIG. 85 to FIG. 88.

Figure 85:
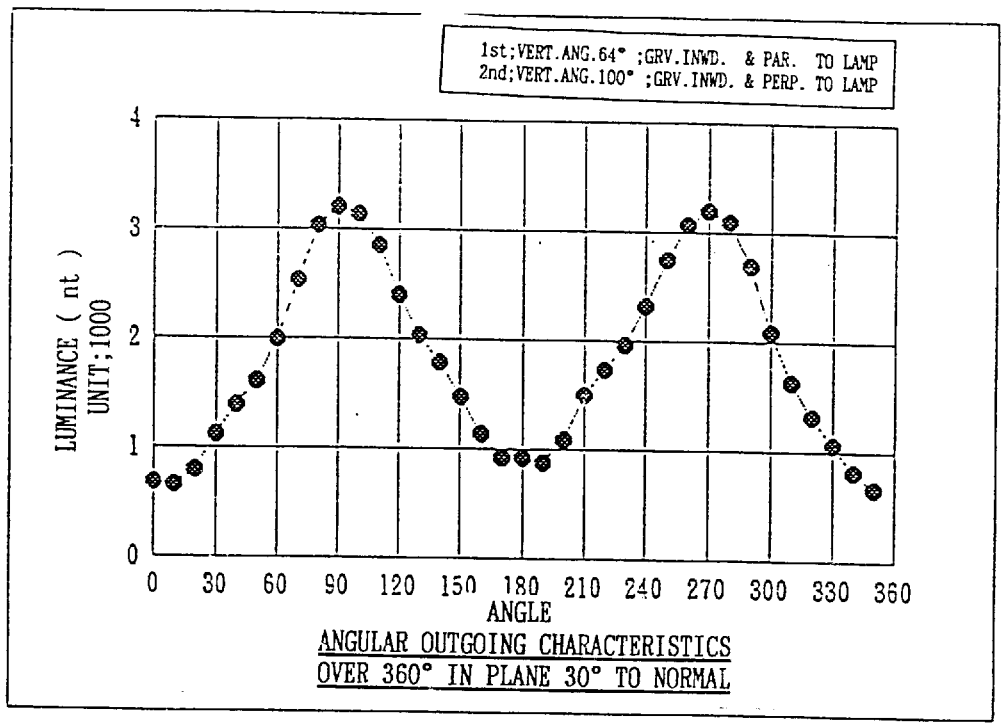
FIG. 85 is a graph showing a luminance change when scanning ζ in the range from 0° to +360° under the condition that the sub-prism sheet (the arrangement of the prism vertical angle ψ=64°; the grooves inward parallel to the lamp) is disposed inside of the main prism sheet (the arrangement of the prism vertical angle ψ=100°; the grooves inward perpendicular to the lamp); β=30° by taking luminance on the vertical axis.
Figure 86:
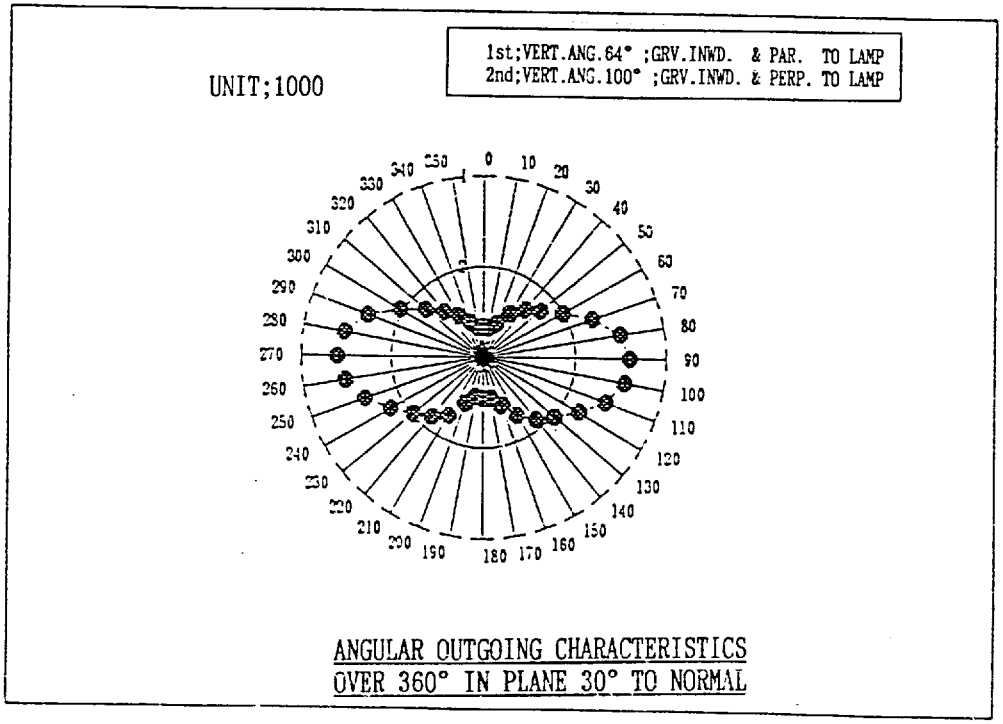
FIG. 86 is a graph showing the same data as FIG. 85 described by taking luminance on the radial direction axis.

[The graphs of FIG. 85 and FIG. 86]

(1) Scanning ζ in the range from 0° to +360° under the condition of β=30°.

(2) The graph of FIG. 85 illustrates luminance by taking luminance on the vertical axis by the 1000 nt unit. The graph of FIG. 86 shows the same data by taking luminance on the radial direction axis by the 1000 nt unit.

(3) Description: as is seen from both graphs, clear luminance peaks exist in the vicinity of the direction of ζ=+180°±90° respectively. The luminance level of the peaks are not so high (approximately 3000 nt). The luminance levels of the wide bottom portion between both peaks are low.

Figure 87:
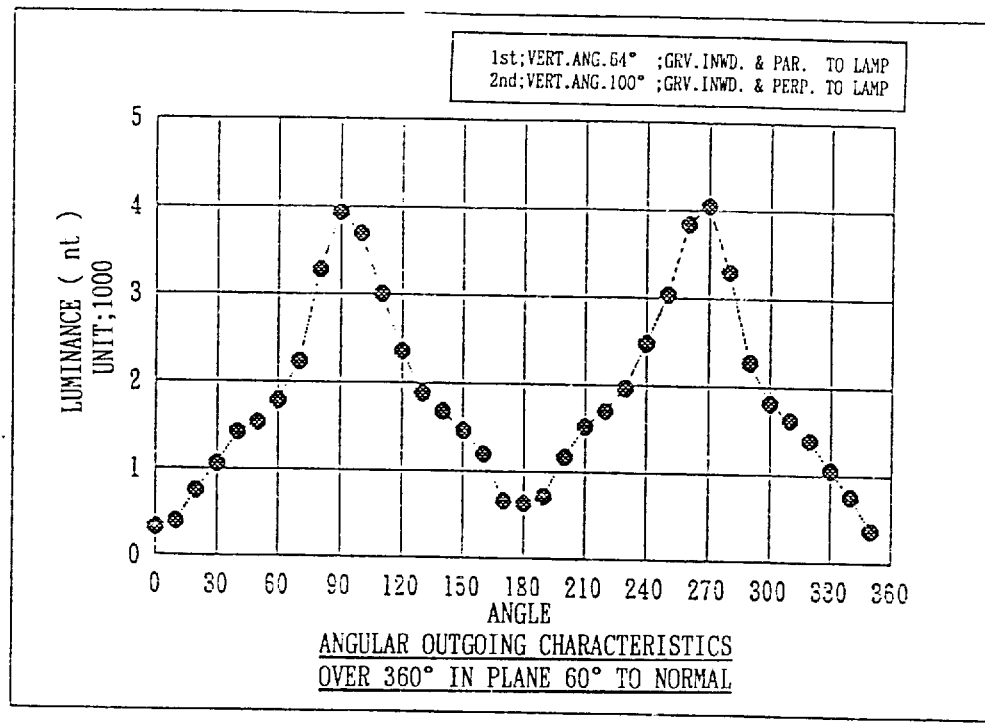
FIG. 87 is a graph showing a luminance change when scanning ζ in the range from 0° to +360° under the condition that the sub-prism sheet (the arrangement of the prism vertical angle ψ=64°; the grooves inward parallel to the lamp) is disposed inside of the main prism sheet (the arrangement of the prism vertical angle ψ=100°; the grooves inward perpendicular to the lamp); β=60° by taking luminance on the vertical axis.
Figure 88:
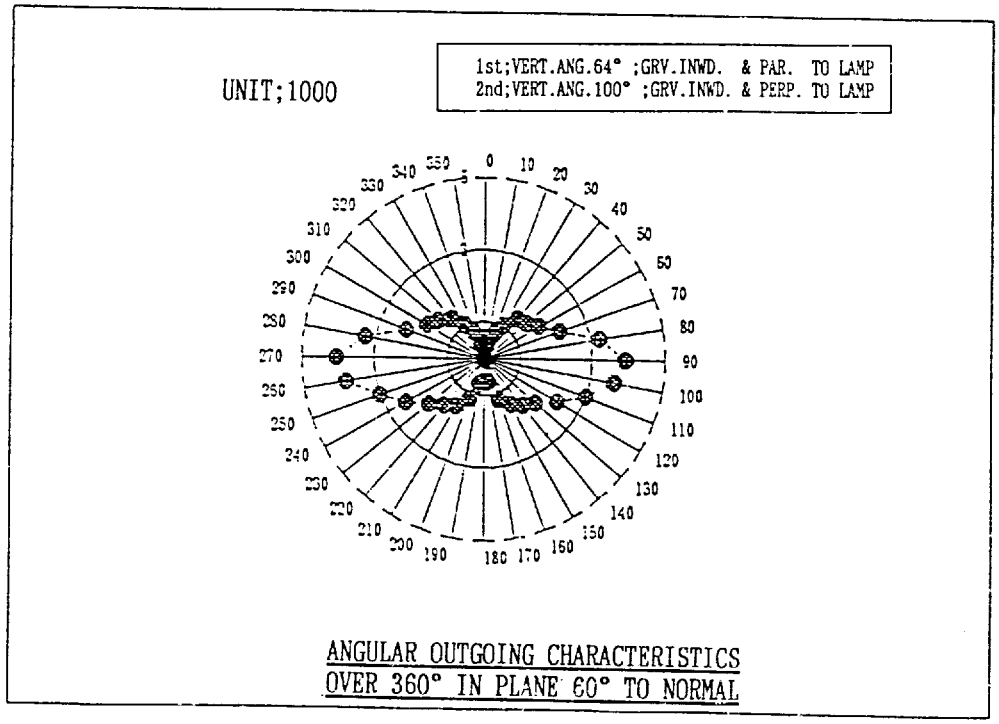
FIG. 88 is a graph showing the same data as FIG. 87 described by taking luminance on the radial direction axis.

[The difference from the graphs of FIG. 87 and FIG. 88]

(1) Scanning ζ in the range from 0° to +360° under the condition of β=60°.

(2) The graph of FIG. 87 illustrates luminance by taking luminance on the vertical axis by 1000 nt unit. FIG. 88 is a graph showing the same data by taking luminance on the radial direction axis by 1000 nt unit.

(3) Description: as will be read readily from the both graphs, clear luminance peaks exist in the vicinity of the direction of $\zeta=+180°\pm90°$. The luminance levels of the peaks are higher than the case using $\beta=30°$. The differences from the luminance level of the wide bottom portion between both peaks are very large.

From the graphs of FIG. 85 to FIG. 88, it is understood that this Embodiment accomplishes the dual light flux generation as well as <Embodiment II-(5)> to <Embodiment II-(8)>.

As described above, the performance of dual light flux generation was verified based on the measurement data for a number of embodiments and the several reference examples. The performances were evaluated comprehensively with respect to typical embodiments, and the results are shown in table 3. In this table 3, the Embodiment/Reference Example number, referred drawings (only obtained by scanning $\zeta$ over 360°) arrangement conditions, the prism vertical angle conditions, peak directions and the peak values are listed together. Summary performance judgements are mentioned in the last column.

Although the performance judgements are based on the measured data, visual judgement is applied, too. The results are denoted by four level symbols (⊚, ○, Δ, x). The meaning of each symbol is as follows;

⊚; striking dual light flux generation was observed.

○; good dual light flex generation was observed, although inferior to "⊚".

Δ; slight dual light flux generation inferior to "○" was observed. This is considered as critical condition for dualization of flux.

x; substantially no dual light flux generation was observed.

However, this does not mean absolute limitation. For example, an arrangement such that long tubular lamps are disposed along both side end surfaces of a flat plate-shaped light scattering guide with the exiting directivity, respectively (so called the two lamp arrangement) may be used. The characteristics of this case are such combining a pair of characteristics obtained by the arrangement of one lamp type respectively in the contrary direction, as a matter of course.

Accordingly, it can be expected that a brighter surface light source device having characteristics similar to shown in FIG. 37 is provided, for example, when the two-lamp type surface light source means is applied to the supplying source of the primary light flux in the arrangement designed for the dual light flux generation at the directions of $\theta=90°$ and $\theta=270°$ (a left and right direction) such as <Embodiment II-(2)>.

In any one of the examples described above, it is needless to say that the liquid crystal display with two preferential directions of clean vision (the directions giving a bright display screen) can be formed, when a liquid crystal display panel is disposed in the path of the light flux dualized by the method or device according to the invention. It is preferred that the characteristics of the dual light flux generation are adapted to the direction from which the liquid crystal display is viewed. Adjustment of the characteristics of dual light flux generation is realized through a suitable selection of the various conditions for main and sub prism sheets (especially, the condition of prism vertical angle of the prism surface of the sub-prism sheet or one prism face of main-sub prism sheet).

Lastly, available materials of prism sheets (the main prism sheet, sub-prism sheet and main-sub prism sheet) and light scattering guides will be described respect to a method of manufacturing.

TABLE 3

| | | | | | (DUAL) PEAK(S) [$\beta = 60°$] | | |
|---|---|---|---|---|---|---|---|
| | NO. | | PRISM SHEET ARANGEMENT | | PEAK | | TOTAL |
| CATE-GORY | EMBODIMENT (E) REFERENCE (R) | NO. FIG. | FIRST SHEET VERT. ANG.; GROOVES | SECOND SHEET VERT. ANG.; GROOVES | DIRECTION(S) ($\zeta$) | LUMINANCE (nt) | ESTI-MATE |
| ONLY MAIN* | R2 | 45–48 | 64°; GRV. INWD. PERP. | NONE | 180° | 6525 | X |
| | R3 | 49–52 | 68°; GRV. INWD. PERP. | NONE | 170° | 5782 | X |
| | EI-(3) | 53–56 | 70°; GRV. INWD. PERP. | NONE | 170°/190° | 5524/5478 | Δ |
| | EI-(4) | 57–60 | 80°; GRV. INWD. PERP. | NONE | 140°/220° | 6849/6562 | ○ |
| | EI-(1) | 16–19 | 90°; GRV. INWD. PERP. | NONE | 140°/220° | 7293/6535 | ⊚ |
| | EI-(5) | 61–64 | 100°; GRV. INWD. PERP. | NONE | 150°/210° | 5819/5824 | ○ |
| | EI-(6) | 65–68 | 110°; GRV. INWD. PERP. | NONE | 160°/200° | 5591/5442 | Δ |
| MAIN AND SUB** | EII-(5) | 69–72 | 64°; GRV. INWD. PAR. | 64°; GRV. INWD. PERP. | 90°/270° | 2359/2495 | ○ |
| | EII-(6) | 73–76 | 64°; GRV. INWD. PAR. | 68°; GRV. INWD. PERP. | 90°/270° | 3697/3801 | ○ |
| | EII-(7) | 77–80 | 64°; GRV. INWD. PAR. | 70°; GRV. INWD. PERP. | 90°/270° | 3912/4001 | ○ |
| | EII-(8) | 81–84 | 64°; GRV. INWD. PAR. | 80°; GRV. INWD. PERP. | 90°/270° | 3602/3720 | ○ |
| | EII-(2) | 36–39 | 64°; GRV. INWD. PAR. | 90°; GRV. INWD. PERP. | 90°/270° | 4623/4774 | ⊚ |
| | EII-(3) | 40–41 | 70°; GRV. INWD. PAR. | 90°; GRV. INWD. PERP. | 110°/250° | 5640/5432 | ⊚ |
| | EII-(4) | 42–43 | 90°; GRV. INWD. PAR. | 90°; GRV. INWD. PERP. | 120°/240° | 5768/5683 | ⊚ |
| | EII-(9) | 85–88 | 64°; GRV. INWD. PAR. | 100°; GRV. INWD. PERP. | 90°/270° | 3932/4052 | ○ |
| ** | EII-(1) | 30–33 | 90°; GRV. INWD. PERP. | 64°; GRV. INWD. PAR. | 130°/240° | 2640/2619 | ⊚ |

*DUAL LIGHT FLUX IS GENERATED BY THE SECOND PRISM SHEET. (MAIN PRISM SHEET)
**DUAL LIGHT FLUX IS GENERATED BY THE FIRST PRISM SHEET (MAIN PRISM SHEET)

The results of the estimation of performance match with what has been described in the foregoing. Validity of the conditions for dual light flux generation (especially, the condition of the prism vertical angle $\psi$) required in the invention is proved well thereby.

As a supplying source of the primary light flux, one lamp type surface light source means and a light scattering guide with exiting directivity (a wedge-shaped type) are preferably employed as shown in the above described embodiments.

PMMA (polymethylacrylate), PSt (polystyrene) and PC (polycarbonate), or the like may be utilized as base material (matrix) of light scattering guides or the prism sheets to be used in the invention, as shown in the table 1 and the table 2.

Because the prism sheet is transparent usually, these materials can be used as it is. Moreover, a conventional plastics film molding can be used to form the of V-shape grooves which give the required the prism vertical angles. Prism sheets may be provided with scattering power.

It is known the material of light scattering guides or prism sheets with scattering power can be manufactured by the following various methods.

One is a method utilizing molding processes including a process of kneading more than two kinds of polymer, e.g. two or more polymers with mutually different refractive indexes. The shapes of the polymers is optional. For example, pellet shaped polymers are available. The blended material is heated and kneaded (a kneading process). A light scattering guide is molded by injecting the kneaded liquid material into the molds of the injection molding machine under high pressure and solidifying by cooling. A light scattering guide with the shape corresponding to the shape of the molds can thus be obtained. A required molding may be obtained by injecting the kneaded material into an extrusion molding machine and extruding in a conventional manner.

Two or more polymers with different refractive indexes are solidified without mixing each other completely in molding processes, whereby the local in equal content (content fluctuation) occurs and is fixed and as a result, a uniform scattering power is provided. A very wide selection of the combination of the polymer and the mixing rate are possible. It is preferred that the difference of the refractive index between each polymer and the characteristics of the refractive index ununiform structure (scattering irradiation parameter E, a correlation distance a or the like) are considered upon the selection. The typical polymer materials to be used are shown in table 1 and the table 2 described above.

Particle like materials with different refractive indexes (the difference of refractive index above 0.001, preferably) are mixed and dispersed uniformly according to an another method of manufacturing material constituting the light scattering guide.

Suspension polymerization is one of the methods capable of utilizing uniform mixing of particle like material. That is, a polymer material in which particle like material is mixed uniformly is obtained by mixing particle like material as a monomer and polymerizing under the condition of suspension in the melt. A light scattering guide with a desired shape is manufactured by molding using this as raw material.

Light scattering guides with various characteristics can be manufactured by carrying out a polymerization reaction under the combination of various kinds of particle like material and monomer (the combination of particle density, particle diameter and refractive index and so forth), preparing a plurality of materials and blending selectively and molding. Furthermore, the particle density can be adjusted readily by blending a polymer containing no particle like material.

A further method capable of utilizing uniform mixing of particle like material is a method of kneading polymer material and particle like materials. Also in this case, the light scattering guide with various characteristics can be obtained by kneading and molding (pelletization) under the combination of various kinds of particle like materials and polymers (combination of the particle density, particle diameter and refractive index or the like), blending them selectively and molding and manufacturing a light scattering guide.

Combining the polymer blending method and the particle like material mixing method described above is possible, too. For example, it can be considered that particle like material is mixed upon blending and kneading polymers with the different refractive index. Because these various methods are well known, the detailed description thereof is be omitted.

As described particularly above, light flux with the dual preferential propagation direction (dual light flux) can be generated readily by utilizing prism sheets under the required conditions according to the invention. Moreover, surface light source devices which generate the illuminating light flux with the dualized light flux are provided by combining the supplying source of the primary light flux utilizing the light scattering guide and the prism sheet.

Furthermore, the invention could succeed in providing a technical means capable of applying fittingly to the backlight of the liquid crystal display of type which is viewed from the two directions preferentially therethrough. This makes it possible that a reasonable direction characteristic to the brightness of a liquid crystal display employed in two-player type game machines, a personal computer for the presentation of information to a customer or the like and the car navigation system accessed from both the driver's seat and the passenger seat or the like. Furthermore, this technical means of the present invention is capable of improving the light utilization efficiency and the electric power saving efficiency which substantially relates to the display.

I claim:

1. A dual light flux generation type surface light source device, comprising:

a plate shape light scattering guide with an exiting directivity;

a light supplying means facing at least one side surface of the light scattering guide; and a first prism sheet disposed along a light exiting surface of the light scattering guide, wherein the first prism sheet has a first prism surface on which an array of V-shape grooves running perpendicular to said side surface is formed to provide a prism vertical angle formed so as to give a dual preferential propagation direction to an illuminating light flux emitted from the first prism sheet, and wherein said first prism surface faces said light scattering guide, thereby illumination dualization being realized to right and left directions as viewed from said side surface.

2. A dual light flux generation type surface light source device according to claim 1, further comprising a second prism sheet for modifying the preferential propagation direction of the light flux emitted from the light exiting surface of the light scattering guide is disposed between said first prism sheet and the light scattering guide.

3. A dual light flux generation type surface light source device according to claim 1, further comprising a second prism sheet for modifying the preferential propagation direction of the light flux with the dual preferential propagation direction emitted from the first prism sheet, said first prism sheet being disposed between said second prism sheet and said light scattering guide.

4. A dual light flux generation type surface light source device according to claim 1, wherein said first prism sheet comprises a second prism surface for modifying the preferential propagation direction of the light flux emitted from the first prism sheet.

5. A dual light flux generation type surface light source device, comprising:

a plate shape light scattering guide with an exiting directivity;

a light supplying means facing at least one side surface of the light scattering guide; and a first prism sheet disposed along a light exiting surface of said light scattering guide, wherein the first prism sheet has a prism surface on which an array of V-shape grooves running perpendicular to said end surface is formed to provide a prism vertical angle within the range of 70° to 110°, and wherein said prism surface faces the light scattering guide, thereby illumination dualization being realized to right and left directions as viewed from said side surface.

6. A dual light flux generation type surface light source device, comprising;

a plate shape light scattering guide with an exiting directivity;

a light supplying means facing at least one side surface of the light scattering guide; and a first prism sheet disposed along a light exiting surface of said light scattering guide, wherein the first prism sheet has a prism surface on which an array of V-shape grooves running perpendicular to said end surface is formed to provide a prism vertical angle within the range of 80° to 100°, and wherein the prism surface faces the light scattering guide, thereby illumination dualization being realized to right and left directions as viewed from said side surface.

7. A dual light flux generation type surface light source device, comprising;

a plate shape light scattering guide with an exiting directivity;

a light supplying means facing at least one side surface of a light scattering guide;

a first prism sheet disposed along a light exiting surface of said light scattering guide, wherein the first prism sheet has a prism surface on which an array of V-shape grooves running perpendicular to said end surface is formed to provide a prism vertical angle within the range of 60° to 70°, and the first prism sheet is disposed with its prism surface facing the light scattering guide; and a second prism sheet for modifying preferential propagation direction of the light flux emitted from the light exiting surface of the light scattering guide is disposed between said first prism sheet and the light scattering guide, thereby illumination dualization being realized to right and left directions as viewed from said side surface.

8. A dual light flux generation type surface light source device, comprising:

a light scattering guide with a side surface and an exiting directivity;

a light source aligned with and facing the side surface; and a first prism sheet disposed along a light exiting surface of the light scattering guide, and including a first prism surface having an array of V-shape grooves running perpendicular to said side surface to provide a prism vertical angle so as to give a dual preferential propagation direction to an illuminating light flux emitted from the first prism sheet, said prism surface facing said light scattering guide, to provide dual illumination in right and left directions as viewed from said side surface.

9. The device according to claim 8, wherein the prism vertical angle is 70° to 100°.

10. The device according to claim 8, wherein the prism vertical angle is 80° to 100°.

11. The device according to claim 8, wherein a second prism sheet for modifying the preferential propagation direction of a light flux emitted from the light exiting surface of the light scattering guide is disposed between said first prism sheet and the light scattering guide.

12. The device according to claim 8, further comprising a second prism sheet for modifying the preferential propagation direction of a light flux with the dual preferential propagation direction emitted, said first prism sheet being disposed between said second prism sheet and said light scattering guide.

13. The device according to claim 8, wherein the first prism sheet further comprises a second prism surface for modifying the preferential propagation direction of the light flux emitted from the first prism sheet.

14. A dual light flux generation type surface light source device, comprising:

a plate shape light scattering guide with a side surface and an exiting directivity;

a light source aligned with and facing the side surface;

a first prism sheet disposed along a light exiting surface of the light scattering guide and including a prism surface having an array of V-shape grooves running perpendicular to said side surface to provide a prism vertical angle within the range of 60° to 70°, the prism surface facing the light scattering guide; and a second prism sheet for modifying preferential propagation direction of the light flux emitted form the light exiting surface disposed between said first prism sheet and the light scattering guide, to provide dual illumination in right and left directions as viewed from said side surface.

* * * * *

UNITED STATES PATENT AND TRADEMARK OFFICE
CERTIFICATE OF CORRECTION

PATENT NO. : 5,833,344
DATED : November 10, 1998
INVENTOR(S) : Arai et al.

It is certified that error appears in the above-identified patent and that said Letters Patent is hereby corrected as shown below:

Column 2, line 67, delete "at".

Column 10, line 1, change "as" to --is--.

Column 16, line 39, after "the" (second occurrence) insert --arrangement of--.

Column 19, line 66, delete "will be read readily" and insert --is seen--.

Column 20, line 60, change "Scanning 0" to --Scanning $\theta$--.

Column 22, line 58, delete "the".

Column 23, line 5, delete "the" (first occurrence).

Column 24, line 36, delete "the".

Column 26, line 35, delete "the".

Column 27, line 51, change "portion" to --portions--.

Column 28, line 66, delete "the".

*Column 29, line 66, after "level" insert --is--.

UNITED STATES PATENT AND TRADEMARK OFFICE
CERTIFICATE OF CORRECTION

PATENT NO. : 5,833,344

DATED : November 10, 1998

INVENTOR(S) : Arai et al.

It is certified that error appears in the above-identified patent and that said Letters Patent is hereby corrected as shown below:

Column 31, line 23, delete "the" (first occurrence).

Column 32, line 20, change "level" to --levels--;
        line 64, change "level" to --levels--.

Column 33, line 10, change "level" to --levels--;
        line 53, change "level" to --levels--.

Column 34, line 55, change "level" to --levels--.

Column 36, line 61, after "as" insert --a--;
        line 66, delete "it".

Column 37, line 3, after "known" insert --that--;
        line 21, change "in equal" to --inequal--;
        line 67, delete "be".

Signed and Sealed this

Thirteenth Day of July, 1999

Attest:

Q. TODD DICKINSON

Attesting Officer    Acting Commissioner of Patents and Trademarks

UNITED STATES PATENT AND TRADEMARK OFFICE
CERTIFICATE OF CORRECTION

PATENT NO. : 5,833,344
DATED : November 10, 1998
INVENTOR(S) : Takayuki ARAI et al.

It is certified that error appears in the above-identified patent and that said Letters Patent is hereby corrected as shown below:

In the Title Page [73], before "Enplas Corporation" insert --Yasuhiro Koike, Yokohama, Japan--.

Signed and Sealed this

Twenty-first Day of March, 2000

Attest:

Attesting Officer

Q. TODD DICKINSON

Commissioner of Patents and Trademarks